US012522862B2

(12) United States Patent
Erber et al.

(10) Patent No.: US 12,522,862 B2
(45) Date of Patent: Jan. 13, 2026

(54) CELL ANALYSIS

(71) Applicant: The University of Western Australia, Nedlands (AU)

(72) Inventors: Wendy Naomi Erber, Crawley (AU); Kathryn Amanda Fuller, Morley (AU); Henry Yeuk Lam Hui, Kallaroo (AU)

(73) Assignee: The University of Western Australia, Nedlands (AU)

( * ) Notice: Subject to any disclaimer, the term of this patent is extended or adjusted under 35 U.S.C. 154(b) by 701 days.

(21) Appl. No.: 16/754,699

(22) PCT Filed: Oct. 23, 2018

(86) PCT No.: PCT/AU2018/051148
§ 371 (c)(1),
(2) Date: Apr. 8, 2020

(87) PCT Pub. No.: WO2019/079851
PCT Pub. Date: May 2, 2019

(65) Prior Publication Data
US 2020/0232019 A1    Jul. 23, 2020

(30) Foreign Application Priority Data
Oct. 23, 2017  (AU) ............................... 2017904274

(51) Int. Cl.
*C12Q 1/6841*  (2018.01)
*C12Q 1/6827*  (2018.01)
(Continued)

(52) U.S. Cl.
CPC ......... *C12Q 1/6841* (2013.01); *C12Q 1/6827* (2013.01); *G01N 21/64* (2013.01); *G01N 33/53* (2013.01)

(58) Field of Classification Search
CPC .... C12Q 1/6841; C12Q 1/6827; G01N 21/64; G01N 33/53; G01N 33/536; G01N 15/14
See application file for complete search history.

(56) References Cited

U.S. PATENT DOCUMENTS

2006/0257884 A1  11/2006  Brawley et al.
2014/0162288 A1  6/2014  Goldman et al.

FOREIGN PATENT DOCUMENTS

JP  2006-503589 A   2/2006
JP  2016-540969 A  12/2016

OTHER PUBLICATIONS

Chan, L. et al. Journal of Immunological Methods 388:25-32 [2013; online Nov. 2012]). (Year: 2012).*
(Continued)

*Primary Examiner* — Diana B Johannsen
(74) *Attorney, Agent, or Firm* — MARSHALL, GERSTEIN & BORUN LLP

(57) ABSTRACT

The present invention provides a method for cell analysis, comprising: preparing a blood sample comprising nucleated cells having surface, cytoplasmic or nuclear antigens (markers); antibody staining the cell markers; fixing and permeabilising the cells; FISH probe hybridising to chromosomes in the cells; performing imaging flow cytometry on the cells; analysing data obtained from performing imaging flow cytometry; and diagnosing, prognosing or monitoring a medical condition based on the data analysis.

22 Claims, 25 Drawing Sheets

(51) Int. Cl.
   G01N 21/64      (2006.01)
   G01N 33/53      (2006.01)

(56) References Cited

OTHER PUBLICATIONS

Erber, W. International Journal of Laboratory Hematology 34(Suppl 1):11-12, Abstract 16. (Year: 2012).*
Giorgi, D. et al. PLOS ONE 8(2):e57994 (13 pages). Feb. 2013. (Year: 2013).*
Fuller et al., Development of a robust immuno-S-FISH protocol using imaging flow cytometry, Cytometry Part A, 89A:720-730 (2016).
Grimwade et al., Applications of imaging flow cytometry in the diagnostic assessment of acute leukaemia, Methods, 112:39-45 (2017).
Hui et al., Imaging flow cytometry to assess chromosomal abnormalities in chronic lymphocytic leukaemia, Methods, 134-135:32-40 (2018).
Maguire et al., Fluorescent In situ hybridization in suspension by imaging flow cytometry, Methods Mol. Biol., 1389:111-126 (2016).
Riddell et al., Multifunctional cytomegalovirus (CMV)-specific CD8+ T cells are not restricted by telomere-related senescence in young or old adults, Immunology, 144:549-560 (2014).
Roura et al., Brilliant violet fluorochromes in simultaneous multicolor flow cytometry-fluorescence in situ hybridization measurement of monocyte subsets and telomere length in heart failure, Laboratory Investigation, 96:1223-1230 (2016).
Sanderson et al., In aged primary T cells, mitochondrial stress contributes to telomere attrition measured by a novel imaging flow cytometry assay, Aging Cell, 16:1234-1243 (2017).
Schmid et al., Simultaneous flow cytometric analysis of two cell surface markers, telomere length, and DNA content, Cytometry, 49:96-105 (2002).
Chinese Application No. 201880068780.X, Office Action and Search Report, mailed Aug. 19, 2022.
Chinese Application No. 201880068780.X, Office Action, mailed Mar. 28, 2023.
European Application No. 18870567.7, Supplementary European search report and Search Opinion, mailed Jun. 30, 2021.
Francis et al., Rapid Single-Step Method for Flow Cytometric Detection of Surface and Intracellular Antigens Using Whole Blood, Cytom., 25:58-70 (1996).
Japanese Application No. 2020-524028, Notice of Reasons for Rejection, mailed May 23, 2023.
Japanese Application No. 2020-524028, Notice of Reasons for Rejection, mailed Sep. 13, 2022.
Law et al., The Importance of Foxp3 Antibody and Fixation/Permeabilization Buffer Combinations in Identifying CD4+CD25+Foxp3+ Regula tory T Cells, Cytom. Part A., 75A:1040-1050 (2009).
Liu et al., Circulating tumor cell detection in hepatocellular carcinoma based on karyoplasmic ratios using imaging flow cytometry, Sci. Rep., 6:39808 (2016).
Shi-Bin et al., Recent advances in fluorescence in situ hybridization, Plant Science Journal 32(2):199-204 (2014). (The paper shows the lead author as "Shi-Bin He et al. and the title as Recent advances in fluorescence in situ hybridization"; however, it is the same citation as Document 9, cited as "Sibin et al., Development of fluorescence in situ hybridization Study and develop, Journal of Plant Sciences, 32(2):199-204 (2014)" in the IDS filed Jun. 30, 2023.).
Amidzadeh et al., Assessment of different permeabilization methods of minimizing damage to the adherent cells for detection of intracellular RNA by flow cytometry, Avicenna J. Med. Biotechnol., 6(1):38-46 (2014).
International Application No. PCT/AU2018/051148, International Search Report and Written Opinion, mailed Dec. 13, 2018.
Minderman et al., Image cytometry-based detection of aneuploidy by fluorescence In situ hybridization in suspension, Cytometry Part A, 81A:776-784 (2012).
Morris et al., Revised estimates of maternal age specific live birth prevalence of down syndrome, J. Medical Screening, 9:2-6 (2002).
Ortyn et al., Sensitivity measurement and compensation in spectral imaging, Cytometry Part A, 69(8):852-862 (2006).

* cited by examiner

A. Panel 1 – CD3-V500c + CD5-AF647 + CD19-BV480 + Vysis CEP12-SO

B
Panel 2 – CD3-AF647 + CD5-BB515 + CD19-BV480 + Vysis CEP12-SO

CELL ANALYSIS

TECHNICAL FIELD

The present invention relates to cell analysis. In a particular non-limiting aspect, the invention relates to diagnostic and prognostic methods for tissue sample and or cell analysis. For example, the invention provides methods of analysis for the diagnosis, prognosis or monitoring of medical conditions or therapeutic conditions.

BACKGROUND ART

The following discussion of the background art is intended to facilitate an understanding of the present invention only. The discussion is not an acknowledgement or admission that any of the material referred to is or was part of the common general knowledge as at the priority date of the application.

Cytogenetic analysis is an integral component in the assessment of many disorders such as malignancies, syndromes with abnormal numbers of chromosomes such as Trisomy 21 (Down syndrome), and chimerism in transplant recipients.

Diagnostic laboratories currently use fluorescence in situ hybridisation (FISH) analysis of cells on a glass slide, either cell smears or tissue sections, to identify specific genomic defects. FISH is based on fluorescently-labelled single-stranded DNA probe annealing to its complementary sequence in a target genome to detect DNA sequences and sub-microscopic genetic changes. The probes are designed to target chromosomal loci (regions) to identify rearrangements, deletions, and gains in both whole cells in interphase and metaphase. As fluorescent microscopy is used to examine the location of the fluorescent probe bound to the chromosomes, this limits the number of cells that are analysed (generally less than 500 per case). Hence the sensitivity of the method is low. Further, while the FISH method for the visualisation of chromosomal abnormalities in cells is important for the diagnostic assessment of malignant diseases (especially haematological malignancies) and non-malignant diseases (e.g. antenatal diagnosis of genetic disease), it is labour intensive and does not specifically identify the cell of interest—only nuclei are visualised and these could be derived from any cell type.

The specificity of slide-based FISH can be increased when combined with phenotypic identification (immunophenotyping) of the cells of interest, i.e. integrated immunofluorescent labelling of cellular antigens plus FISH. This combination is known as 'immunoFISH' or 'Fluorescence immunophenotype and interphase cytogenetics as a tool for investigation of neoplasms' (FICTION). ImmunoFISH/FICTION is a useful tool for the identification of genetic abnormalities in cells based on phenotype which can be performed on cytocentrifuge preparations, cell smears or tissue sections to detect specific genetic abnormalities in cells identified by their phenotype (e.g. CD138 positive plasma cells) (FIG. 1). This also enables primary genetic abnormalities present in all neoplastic cells (e.g. MYC translocations) and secondary changes present in a subpopulation of cells to be differentiated by phenotype (clonal heterogeneity). Although the combination of immunophenotyping and genetic analysis (i.e. FICTION) increases the specificity of FISH detection of chromosomal abnormalities, the method still requires fluorescent microscopy to manually examine the location of the fluorescent probe bound to the chromosomes, thus limiting the number of cells that are analysed (as per FISH). Hence the sensitivity of the method is still low.

In contrast, immunophenotyping by conventional flow cytometry is an automated cell phenotyping method that analyses thousands of cells, providing quantitative population data and allowing the detection of abnormal cell populations. However, until recently, this method has been unable to be applied to detect FISH probe binding (FIG. 1).

More recently, FISH has been performed on cells "in suspension", i.e. 'FISH-IS', 'suspension-FISH' or 'S-FISH' and analysed by flow cytometry. FISH-IS preserves intact cells and addresses the issue of flattening of the originally 3-dimensional (or spherical) interphase nuclei that occurs with the air-drying process for FISH performed on slides. The principle of testing is the same, but the hybridisation procedure differs from the protocol for slides as cells and DNA must be kept intact whilst the stringency of the hybridisation conditions ensures the probe labelling is specific. Interphase FISH-IS-labelled whole cells can be analysed by flow cytometry enabling automated genetic analysis of several log more cells than microscopy-based approaches. However, it is limited in the type of FISH analysis that can be performed.

Imaging flow cytometry has been shown to further improve sensitivity over traditional FISH methods. Automated cell imaging flow cytometry analyses cells in suspension at a rate of 1,000-2,000 cells per second. The technology is able to acquire up to twelve images of each cell, including ten fluorescence images with quality comparable to ×600 microscopy. This multi-parameter approach combines the sensitivity and statistical power of standard flow cytometry with digital microscopy. With this technology it is possible to localise intracellular signals, including bound FISH probe fluorescent signal or "spots", with high precision using extended depth of field imaging. It therefore has the potential to be used to detect specific genetic abnormalities using fluorescent probes. The recent report by Minderman et al. has clearly demonstrated that cells hybridised using FISH-IS can be analysed by imaging flow cytometry (Minderman H, Humphrey K, Arcadi J K, et al. Image Cytometry-Based Detection of Aneuploidy by Fluorescence In Situ Hybridization in Suspension. Cytometry Part A 2012; 81A: 776-784). This analytical method has been successfully used to determine chromosome copy number in leukaemia cells using centromeric probes. This high-throughput automated imaging analytical approach has one significant major advantage over conventional flow cytometry to evaluate FISH-IS: this is the imaging aspect and the ability to visualise and count the hybridisation "spots". It enables quantitative cell population analysis and "spot" counting for large numbers of cells at high throughput, providing a more accurate analysis of chromosomal abnormalities. Despite its advantages, however, FISH-IS is limited in its ability to analyse each sample, leaving substantial room for improvements in terms of sensitivity and variability.

Thus, it would be advantageous to provide a new method, device, and/or system which reduces, limits, overcomes, or ameliorates some of the problems, drawbacks, or disadvantages associated with the prior art, or provides an effective alternative.

SUMMARY OF INVENTION

The inventors have sought to address one or more of the deficiencies of the prior art by developing an improved "immuno-flowFISH" technique of cell analysis for the diagnosis, prognosis and monitoring of medical or therapeutic conditions.

The technique combines immunophenotyping and FISH analysis of cells in suspension using an imaging flow cytometer. Imaging flow cytometry combines high resolution digital images with quantitative information gained from standard flow cytometry in a single platform. Broadly, methods of cell analysis for the diagnosis, prognosis or monitoring of medical or therapeutic conditions according to the invention comprise the steps of:
  a. Selecting a cell population to be analysed based on their antigenic profile using flow cytometry immunophenotyping, and,
  b. The imaging flow cytometry results allowing FISH probe signals to be counted in these specific cells identified by their precise phenotype.

The outcome is that the FISH chromosomal signal is only assessed in the cells of interest (e.g. leukaemia cells) based on their antigen expression pattern or phenotype.

Thus, according to a first form, the invention resides in a method for diagnosing or prognosing or monitoring a condition in a cell population comprising the steps of:
  a. Selecting a cell population to be analysed and analysing the cell population's antigenic profile by immunophenotyping the population using flow cytometry to detect the presence or absence of one or more biological markers or parameters associated with the condition to be measured or assessed, and
  b. Subjecting the population to at least a FISH probe that allows the cells to be visualised and counted permitting specific cells to be identified by their precise phenotype and permitting the identification of genomic aberrations in cells identified by phenotype.

According to the first step in the method, by immunophenotyping the cell population using flow cytometry, multiple fluorescent parameters can be simultaneously assessed. This step also allows visualisation of the cell morphology of the population (cell characteristics), permits immunophenotyping the cells and the identification of the location of the antigen either on the membrane, in the cytoplasm or nuclear. This later result may be achieved by visualising localisation of the markers or by using different markers or measurement parameters that differentiate between membrane, cytoplasmic or nuclear antigens Preferably, the FISH probe produces fluorescent "spots" or another signal to be counted (or measured) in these specific cells identified by their precise phenotype (ie selected in step (a)).

Immuno-flowFISH analysis is complex, requiring a careful balance to preserve cellular integrity, epitopes for antibody binding and probe hybridisation to specific chromosomal loci. Whilst technically challenging, immuno-flowFISH provides significantly more data than conventional slide-based FISH and has greater sensitivity and less variability than the previously described immuno-S-FISH (limited to <80% of cells per sample). Immuno-flowFISH enables automated FISH analysis of large numbers of cells identified by their cell phenotype, even when they only make up a subset of cells in the sample.

Since imaging flow cytometers have multispectral image capabilities, they offer the capacity for "immuno-flow-FISH", i.e. immunoFISH of cells in suspension. Immuno-flowFISH has the capability to provide an integrated automated high-throughput single platform test for the identification of genomic aberrations in cells identified by phenotype, resulting in higher sensitivity.

Combining FISH on cells in suspension (FISH-IS) with cell phenotyping enables locus-specific probes (i.e. probes directed at a specific gene sequence; the sequence may be a normal gene or an abnormal gene depending on the material being studied) to be used to identify the genotype of cells gated ("selected") by phenotype in a single high throughput automated test. This has the ability to add power to slide-based immunoFISH due to the large number of cells that can be analysed, and to flow cytometric FISH-IS due to the ability to identify the cell population of interest based on phenotype in suspension.

The inventors' technology seeks to ameliorate disadvantages attributable to current manual FISH, FISH-IS and FICTION methods or immunophenotyping by conventional flow cytometry. In particular, the inventors believe that immuno-flowFISH achieves at least one of the following differentiators from current FISH and FICTION technology:
  a. enables the holistic evaluation of morphology, phenotype and genotype of whole intact neoplastic cells on a single high-throughput imaging flow cytometry platform;
  b. has greater sensitivity (greater than 1:10,000 cells) than current manual FISH methods (1-3% cells);
  c. is faster than the current manual FICTION method (in particular, it is faster, and more accurate as whole when intact cells are assessed. FICTION can give false results as the immunophenotype and FISH are performed on 3-4 µm sections of tissue. This can give false results as the test does not assess the entire cell, but a "slice" through it;
  d. uses similar sample preparation to immunophenotyping for conventional flow cytometry methods;
  e. provides a means to analyse thousands of cells, compared with a few hundred using current FISH or FICTION methods;
  f. has increased sensitivity over current FISH for the detection of chromosome abnormalities in the cell population of interest, such as neoplastic cells in haematological malignancies; or
  g. uses an antigen-based gating strategy on the imaging flow cytometer, so samples with small numbers of cells of interest can be reliably analysed. Low levels of cells of interest can be detected, and hence could be applied for residual disease assessment (monitoring). This will assist in detection of disease at lower disease burden, allowing the early introduction of high-dose therapies including transplantation with predicted improvements in patient outcome.

In a second aspect, the invention provides a method for cell analysis, comprising:
  a. preparing a single cell suspension comprising nucleated cells expressing cellular antigens (also known as cell markers), present on a cell surface membrane, in the cytoplasm or in the cell nucleus;
  b. antibody staining the cell antigens;
  c. fixing the cells;
  d. performing a cytogenetic technique (as herein described) on the cells for detecting chromosomes regions/loci/features thereof in the nucleus of the cell;
  e. performing imaging flow cytometry on the cells.

Preferably the cytogenetic technique involves hybridising the cells with a probe preferably with a FISH probe suitable for detecting chromosomes regions/loci/features thereof in the nucleus of the cell. This may be achieved by denaturing the cellular DNA, blocking non-specific probe DNA binding and FISH probe hybridisation with nuclear material in the cells under examination. Desirably, the cells are quenched in ice-cold phosphate buffered saline (PBS) after hybridisation and then centrifuged.

Preferably, when blocking is used, non-specific probe DNA is blocked from binding to FISH probe hybridisation. This may be achieved by exposing the sample to PBS/BSA and then washing the cells. The resultant supernatant can then be removed, and the cells resuspended in a hybridisation buffer for FISH probe analysis. In this form of the invention the cells are then heated to denature DNA and/or facilitate probe annealing. This step is preferably carried out in an automated thermocycler. The cells may then be washed in a stringency solution at least once and resuspended. Nuclear DNA staining of the cells is then undertaken.

In a form of the invention, the method further comprises the step of: analysing data obtained from imaging flow cytometry.

Data is analysed in imaging flow cytometry software such as IDEAS (AMNIS Merck, Seattle, USA) and like software, to determine sample information such as immunophenotype of cell populations, number of cells in populations, presence/location of probes and the number of probe spots present in each cell (i.e. cytogenetics).

Alternatively, single stained cells may be analysed in the absence of brightfield techniques, and a compensation matrix may be calculated.

Preferably imaging flow cytometry on cells involves the use of excitation lasers with the emissions being captured. The excitation lasers may comprise 100 mW 405 nm, and/or 50 mW 488 nm, and/or 150 mW 561 nm, and/or 150 mW 592 nm and/or 120 mW 642 nm lasers. In this respect, in performing imaging flow cytometry on the cells, cells are analysed on an imaging flow cytometer (e.g AMNIS ImageStreamX markII; AMNIS, Seattle, USA) and data recorded such as brightfield (morphology) images and fluorescent images and fluorescence intensity.

Performing imaging cytometry preferably involves capturing images with at least 40× objective. The images may be captured with a 30× to 70× objective range. Desirably, the images are captured with around a 60× objective.

Performing imaging cytometry may also comprise identifying cells in a scatter plot. Desirably, around 10,000-20,000 cells are recorded in the sample.

In a further or alternate form of the invention, the method comprises the step of: diagnosing, prognosing or monitoring a medical or therapeutic condition based on the data analysis.

According to a form of the invention, in the imaging flow cytometry step immuno-flowFISH data analysis is performed using image analysis software. Data analysis may comprise selecting focused images by measuring the sharpness or quality of an image. Desirably, the data is prepared in a scatter plot. The scatter plot in in one preferable form of the Aspect Ratio versus Brightfield Area.

The analysis can also include identifying nucleated non-dividing cells in a fluorescence intensity histogram by excluding cells with high fluorescence intensity. Such data analysis will ideally comprise gating cell populations of interest based on the fluorescence intensity of markers such as normal and neoplastic cells (e.g. lymphocytes, leukaemic cells) depending on the application and cell markers used.

Preferably, the data analysis comprises determining co-localisation of FISH probe signal with a nuclear stain using a measure of the degree to which two images are linearly correlated within a masked region. Data analysis may comprise counting the number of FISH probe spots per cell using a Peak, Spot or Intensity mask. This may involve examining the connectivity of each pixel based on whether it is connected to a particular spot or the background. Preferably, the spot counts are verified by single parameter histograms comparing the measured fluorescence intensity of FISH signals for each of the spot count populations to confirm 1-spot, 2-spot and 3 or more spot counts, or overlapping spots when there has been a chromosomal translocation. Comparison of the spot count between cell populations may occur to determine the presence of the cytogenetics related to the FISH probe. A ratio of the number of "spots" in the nuclei of abnormal compared with normal cells may be calculated e.g. spots in the nuclei of leukaemic cells compared with normal lymphocytes to give a spot ratio.

In a third aspect, the invention provides a diagnostic method for cell analysis comprising the steps of:
a. preparing a single cell suspension from a cell sample;
b. antibody staining the suspension to detect one or more cell markers;
c. fixing the cells;
d. denaturing cellular DNA in the suspension;
e. hybridising at least a FISH probe to the cell DNA from step (d);
f. performing imaging flow cytometry on the cells to acquire data as to brightfield images, fluorescence images and intensity measurements of immunophenotyping markers and FISH probes; and
g. analysing the data to diagnose, prognose or monitor the presence or absence of medical conditions.

Preferably the above method is performed on control and sample cells so that a clear demarcation can be identified.

In a fourth aspect, the invention provides a diagnostic kit comprising one or more of the components of the method of the invention with instructions on how to use the kit in the method.

In particular, the invention extends to kit comprising (a) at least a marker detection system suitable for standard flow cytometry, (b) one or more FISH probes of the invention, each of (a) and (b) being in one or more container(s) and combined with an instruction manual or information brochure providing instructions and/or information with respect to the use of (a) and (b) in the method of the invention.

Further, the kit may also comprise: one or more buffers suitable for use in the method of the invention, in one or more container(s).

Preferably the marker detection system present in the kit is an antibody suitable for immunophenotyping a cell sample.

Uses to which this technology may be put without limitation include: Non-malignant disease identification such as antenatal applications including antenatal diagnosis of disease with chromosomal defects or difference from maternal blood, identification of foetal cells (e.g. nucleated red cells, trophoblasts or lymphocytes) in the maternal circulation, identifying nucleated red cells of foetal origin, immunophenotyping to identify nucleated red cells with antibodies to HbF (foetal haemoglobin inside the cell), CD71 (transferrin receptor on the surface of the cell), HLA-G to identify trophoblasts, Probe identification for disease of interest, e.g. CEP21 for trisomy 21 in Down syndrome; Identification of foetal lymphocytes of male origin (Y chromosome FISH probe) in maternal blood: Immunophenotype analysis: including identification by CD45, HbF, HLA-G, CD71; Identification of Chimerism including post-transplantation gender-mismatched transplant and Immunophenotyping to identify lymphocytes by CD45.

Alternatively, it can be used for identification of Malignant Diseases such as haematological malignancies (blood cancers) or other types of cancer; Detection of chromosomal aberrations in neoplastic cells identified by phenotype. Disease classification based on WHO classification utilising phenotype and chromosomes, Numeric abnormalities ("aneuploidy"): monosomies, trisomies, tetrasomies, hyperdiploidy, hypodiploidy (Examples: acute leukaemia, chronic leukaemia, plasma cell myeloma, myelodysplastic syndrome, non-Hodgkin lymphoma); Structural abnormalities: deletions, translocations, duplications, amplifications (Examples: acute leukaemia, chronic leukaemia, plasma cell myeloma, myelodysplastic syndrome, chronic eosinophilic leukaemia, non-Hodgkin lymphoma). Detection of chromosomal abnormalities, both numeric and structural in other types of cancer in blood also called "liquid biopsies" (i.e. blood samples to identify circulating tumour cells) or cancer cells obtained from tissue samples. In particular, the method can be used on disaggregated tissue samples from any body site (e.g. lymph node, breast, skin) to detect chromosome abnormalities.

Alternatively, it can be used for non-human genotype assessment such as intracellular virus detection: Detection of viral genomic DNA sequences integrated into human cells identified by phenotype. Epstein-Barr virus (EBV) infects B-cells and is a known oncovirus that deregulates cell replication and apoptosis (e.g. hijacking of MYC and BCL2L11 genes). As classified by WHO, haematological malignancies such as non-Hodgkin lymphoma (e.g. diffuse large B-cell lymphoma or Burkitt's lymphoma) and Hodgkin lymphoma are strongly linked to EBV infections. Commercial probes for the detection of EBV DNA or related transcripts (e.g. peptide nucleic acid probes) are available as well as the ability to synthesise specific oligonucleotide probes conjugated to various types fluorophores for specific detection of the EBV genome.

It can be used to inform treatment decisions: Treatment choice based on presence of a chromosomal defect in specific diseases identified by phenotype (e.g. chronic lymphocytic leukaemia and del(17p); myelodysplastic syndrome with del(5q).

It can be used to inform prognosis: diseases stratified by chromosomal abnormalities such as for chronic lymphocytic leukaemia, plasma cell myeloma, myelodysplastic syndrome, acute myeloid leukaemia and acute lymphoblastic leukaemia, EBV-positive lymphoma.

It can be used to inform on residual disease including minimal residual disease burden based on chromosomal defect in specific cells identified by their phenotype. Alternatively it can be used to inform of acquisition of new clone based on new chromosomal defects or disease eradication prior to harvesting for autologous transplantation.

It can be used to inform on non-haemopoietic cell diagnosis and classification such as primary tumour: differential diagnosis of tissue: cells extracted from tissue. Numeric abnormalities: aneuploidy (e.g. differential diagnosis of melanoma vs atypical naevus) and structural abnormalities: deletions, fusions.

It can be used to inform on treatment choice based on presence of chromosomal defect in specific diseases identified by phenotype. This includes detection of abnormal foetal cells in the maternal blood during pregnancy.

It can be used to identify by surface or intracellular non-haemopoietic antigens characteristic of the neoplastic cell including circulating tumour cells Examples: breast; melanoma and bone marrow metastatic cells.

It can also be used to identify CAR-T cell persistence by a probe to a transgene vector sequence. In particular, it can be used to for detection of an engineered introduced nucleic acid sequence and its expression in a cell.

Further features of the present invention are more fully described in the following description of several non-limiting embodiments thereof. This description is included solely for the purposes of exemplifying the present invention. It should not be understood as a restriction on the broad summary, disclosure or description of the invention as set out above.

BRIEF DESCRIPTION OF THE DRAWINGS

The description will be made with reference to the accompanying drawings in which.

The overlay image is a merge of the CEP4 probe and nuclear SYTOX AADvanced images. (B) Cell 1853 is an ALL cell with the ETV6-RUNX1 translocation where one copy of ETV6 (green spot) and one copy of RUNX1 (orange spot) are collocated as seen by the overlapping spots in the ETV6-SG/RUNX1-SO overlay image. Abbreviations: BF and BF1—Brightfield, CEP4—Chromosome 4 enumeration probe, SG—SpectrumGreen, SO—SpectrumOrange, SYTOX AADv—SYTOX AADvanced.

Figure 6A:
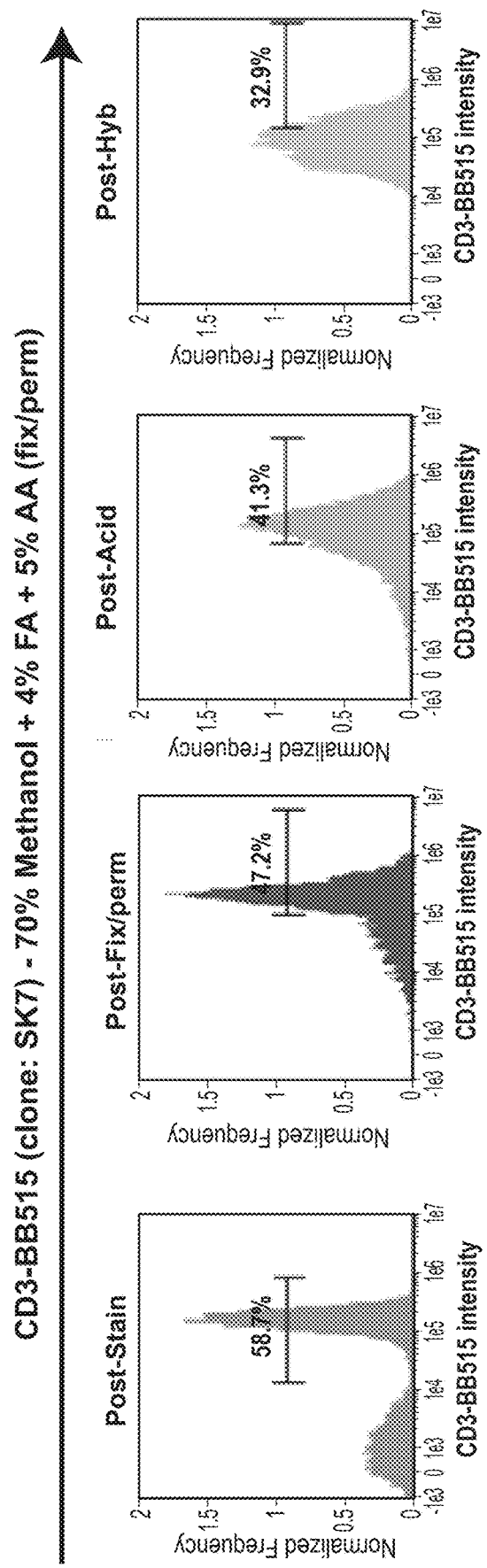
Figure 6:
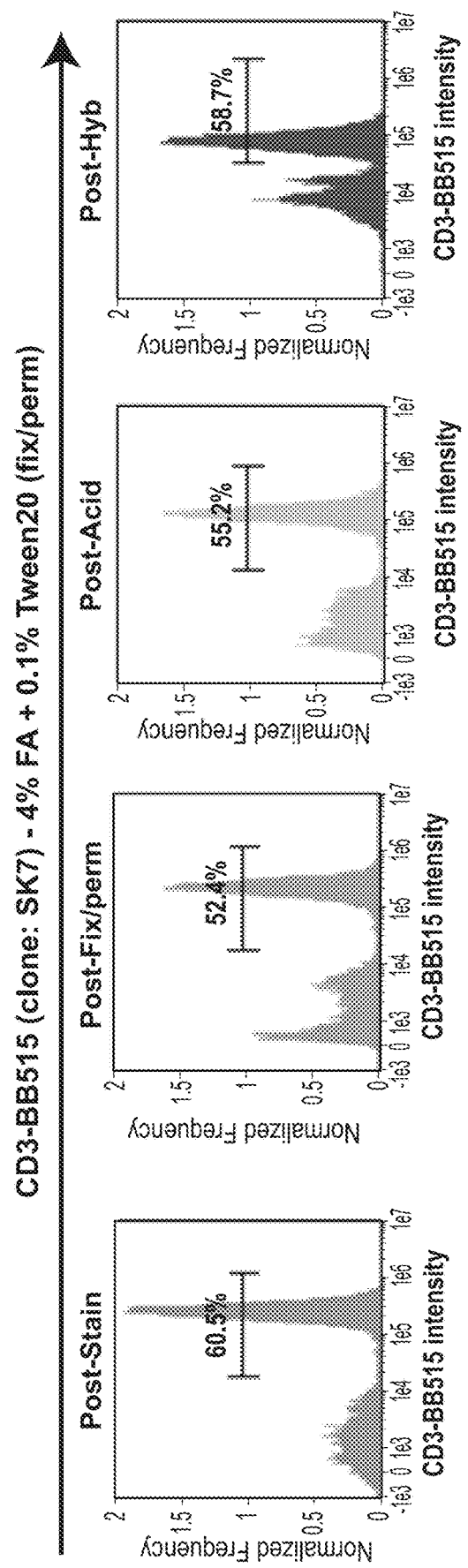

FIG. 6 shows the effect of fixation and permeabilisation solutions on immunophenotyping performance according to a suitable embodiment of the invention. Healthy peripheral blood mononuclear cells (PBMCs) stained with CD3 clone SK7 conjugated with BB515 were used to test different fixation and permeabilisation methods. Aliquots from both protocols were removed for analysis on an AMNIS ISX MKII after cell surface staining (Post-Stain), fixation and permeabilisation (Post-Fix/perm), 1M hydrochloric acid denaturation (Post-Acid) and fluorescence in situ hybridisation (FISH; Post-Hyb). Data from this representative experiment demonstrated increasing loss of CD3-BB515 positively stained cells and relative fluorescence intensity after fixation and permeabilisation with (A) 70% methanol+4% formaldehyde (FA)+5% acetic acid (AA) and preservation in the resolution of CD3-BB515 positively stained cells after fixation and permeabilisation with (B) 4% FA+0.1% Tween20. Reduction of signal resolution of positively stain populations throughout the protocol was also caused by increased autofluorescence of negative populations detected in the 480-560 nm range (Ch02).

Figure 7:
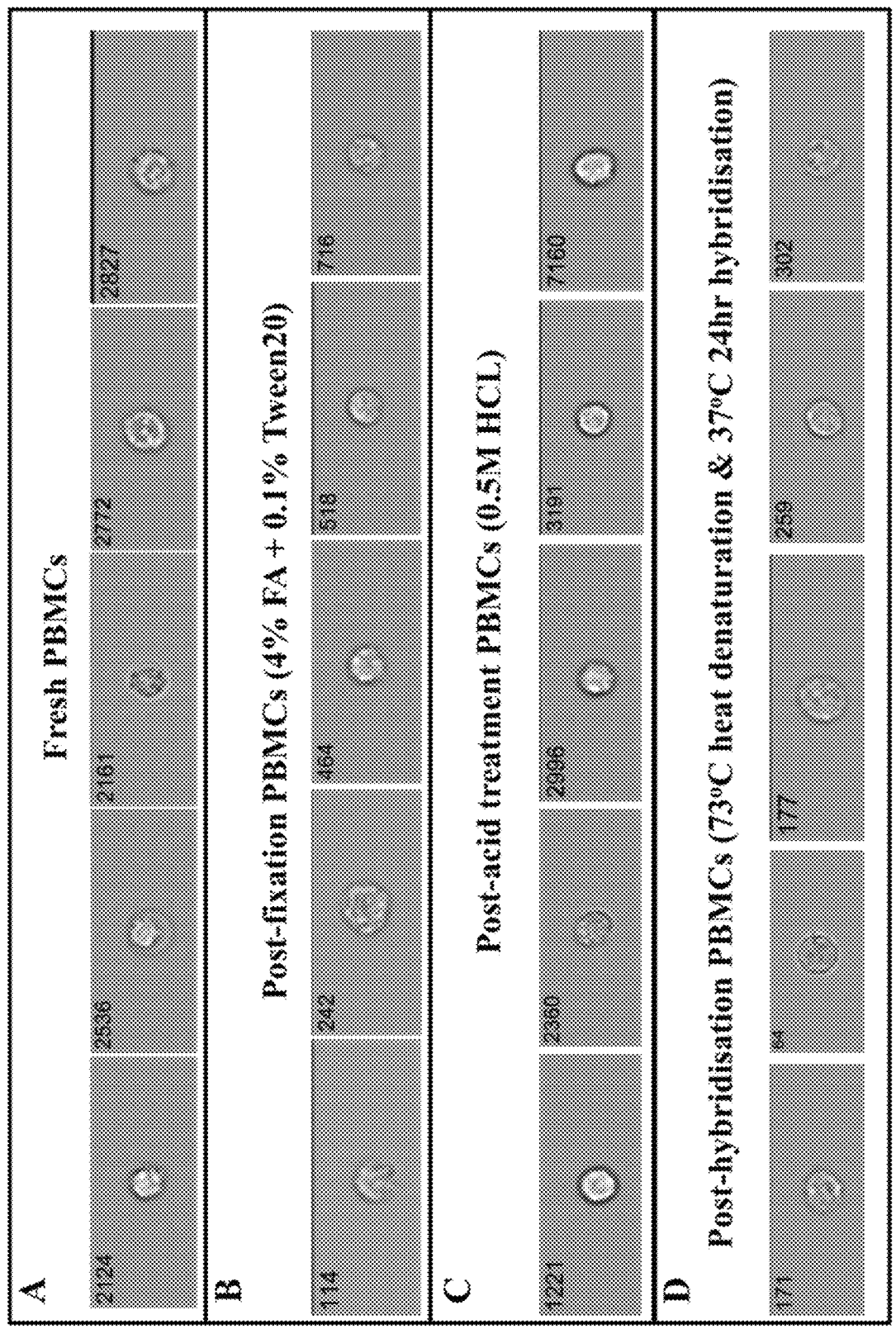

FIG. 7 shows assessment of a representative healthy blood sample for progressive changes to cell appearance using a method of cell analysis according to a suitable embodiment of the invention. Images were generated at on an AMNIS ISX MKII with 40× magnification. (A) Fresh peripheral blood mononuclear cells (PBMCs) immediately after isolation. (B) Cells remained intact and relatively well preserved after 4% formaldehyde (FA)+0.1% Tween20 fixation and permeabilisation. (C) Cells become more monotonous in appearance after acid denaturation. (D) After overnight probe hybridisation cells continue to look monotonous as evidence of consistent and marked changes to the cell membrane, cytoplasm and nucleus throughout processing, and appear larger and rounder.

Figure 8:
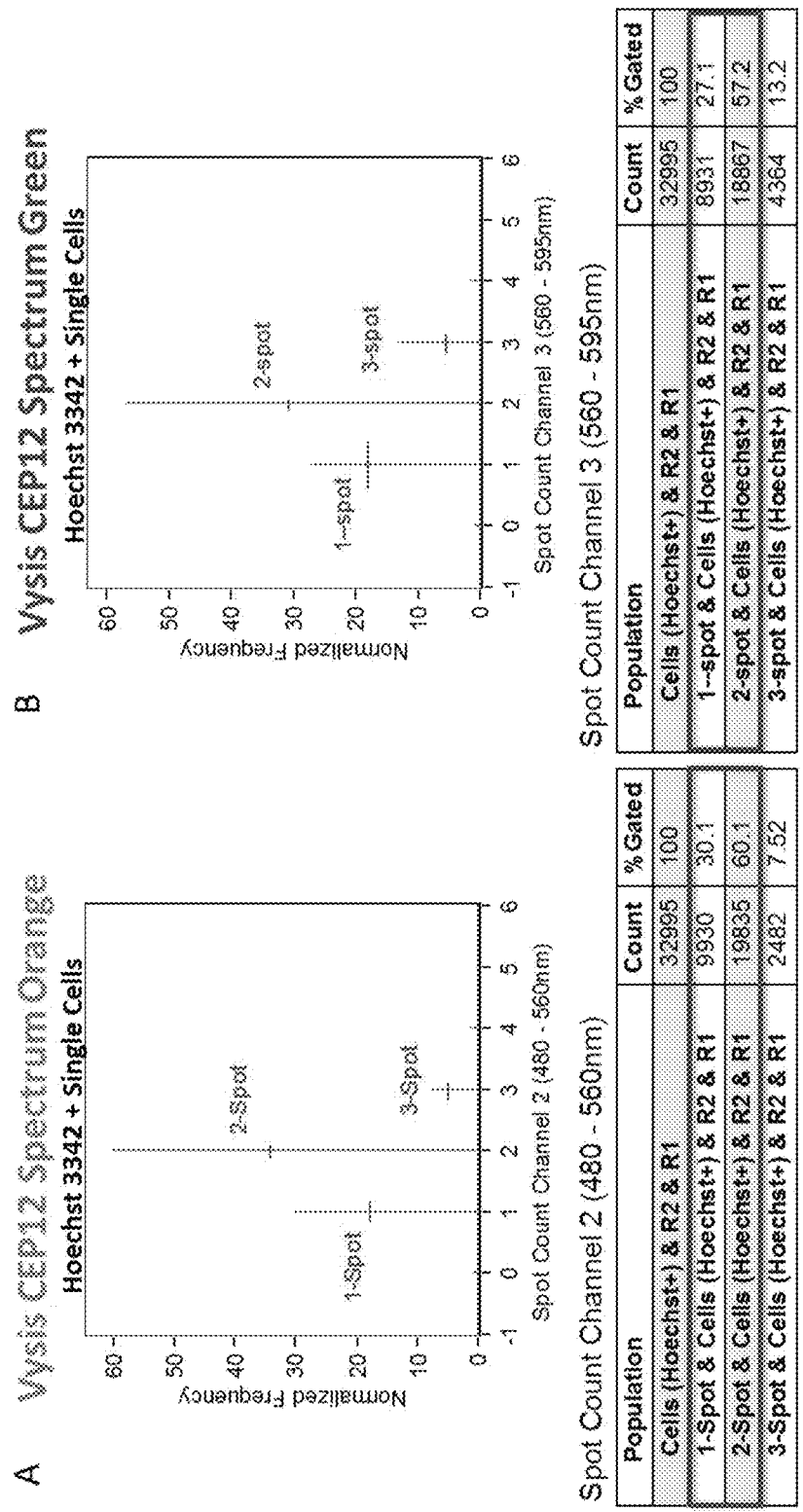

FIG. 8 shows a comparison of SpectrumOrange and SpectrumGreen fluorescent FISH probe conjugates. Data from this representative CLL patient demonstrated that the number of FISH "spots" counted with a Vysis CEP12-SpectrumOrange conjugated probe (A) was equivalent to that counted with a Vysis CEP12-SpectrumGreen conjugated probe (B).

Figure 9:
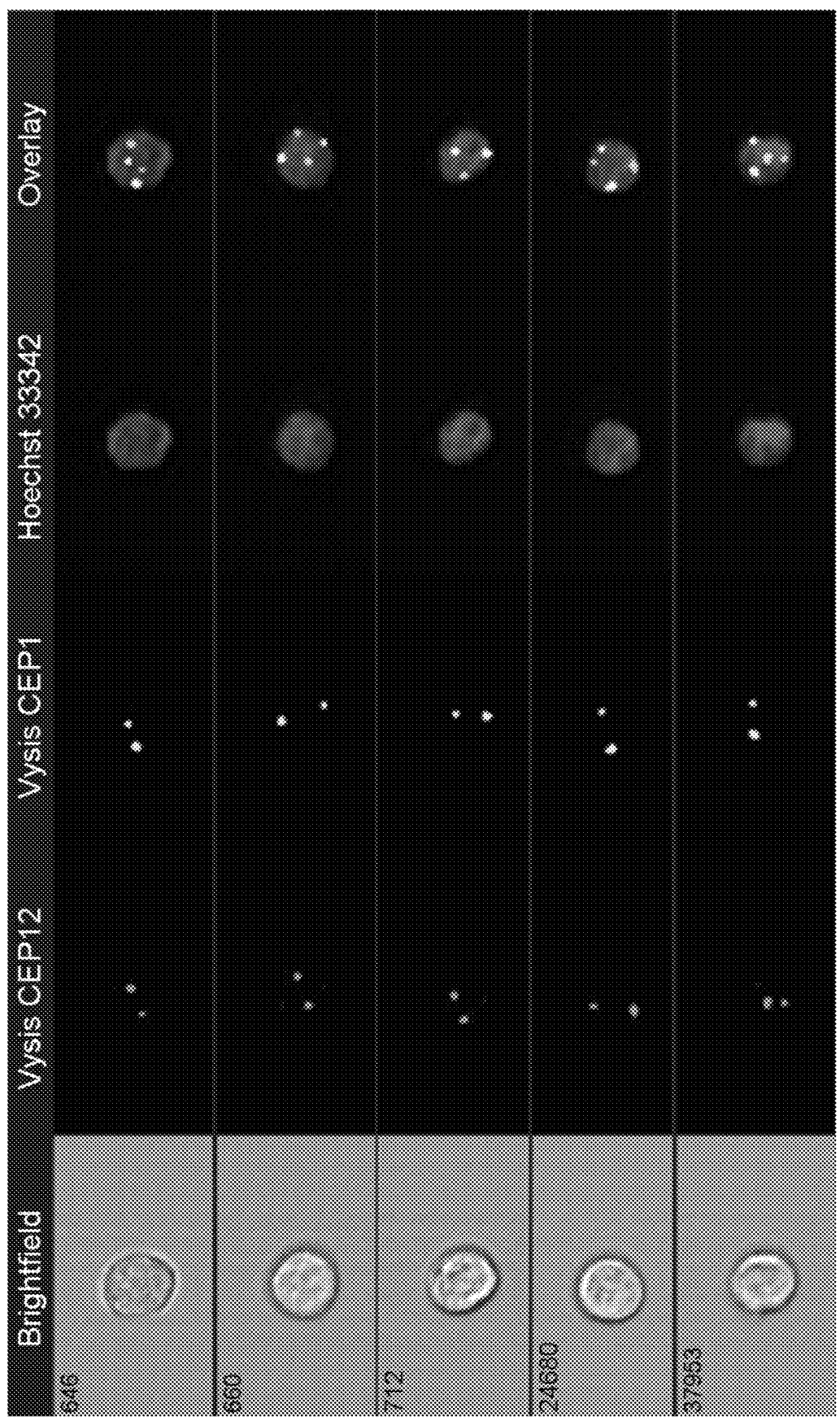

FIG. 9 shows Dual FISH probe analysis by immuno-flowFISH. Data from this representative experiment demonstrated that two FISH probes can by hybridised to cells simultaneously. Cells hybridised with Vysis CEP12-SG and CEP1-SO probes with a Hoechst 33342 nuclear stain to confirm accurate hybridisation of nuclear DNA.

Figure 10:
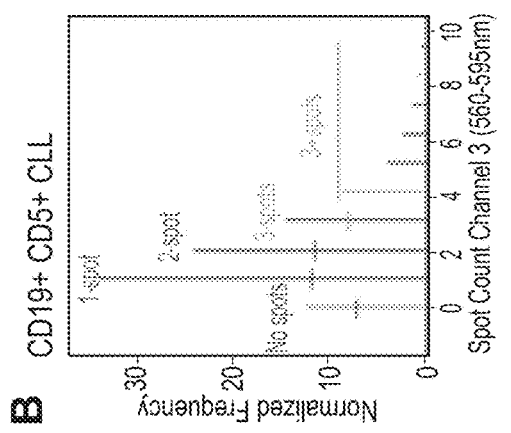
Figure 10:
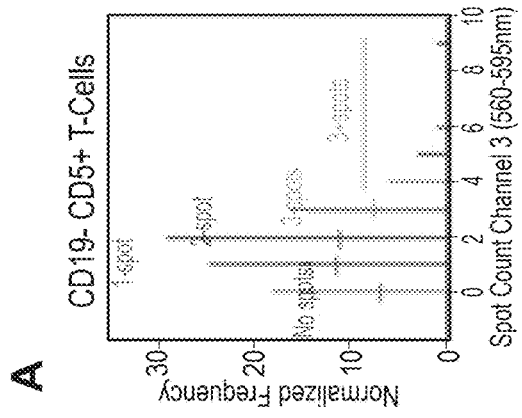

FIG. 10 shows assessment of a representative CLL blood sample with deletion of loci in 17p using a method of cell analysis according to a suitable embodiment of the invention. (A) "Spot count" or number of SureFISH 17p PMP FISH probe hybridisation spots in each CD3+ T cell. (B) "Spot count" or number of SureFISH 17p PMP FISH probe hybridisation spots in each CD19+ B cell. Gated populations can also be viewed in image galleries (C). Cells 166 and 641 are CD19-BV480 positive, CD3-V500c negative, CD5-AF647 positive, 17p monosomy B cells (del17p), cell 724 is a CD19-BV480 positive, CD3-V500c negative, CD5-AF647 positive, 17p disomy B cell, and cells 1610 and 2845 are CD19-BV480 negative, CD3-V500c positive, CD5-AF647 positive, 17p disomy T cells. The overlay image is a merge of the immunophenotyping, 17p probe and nuclear SYTOX AADvanced images.

Figure 11:
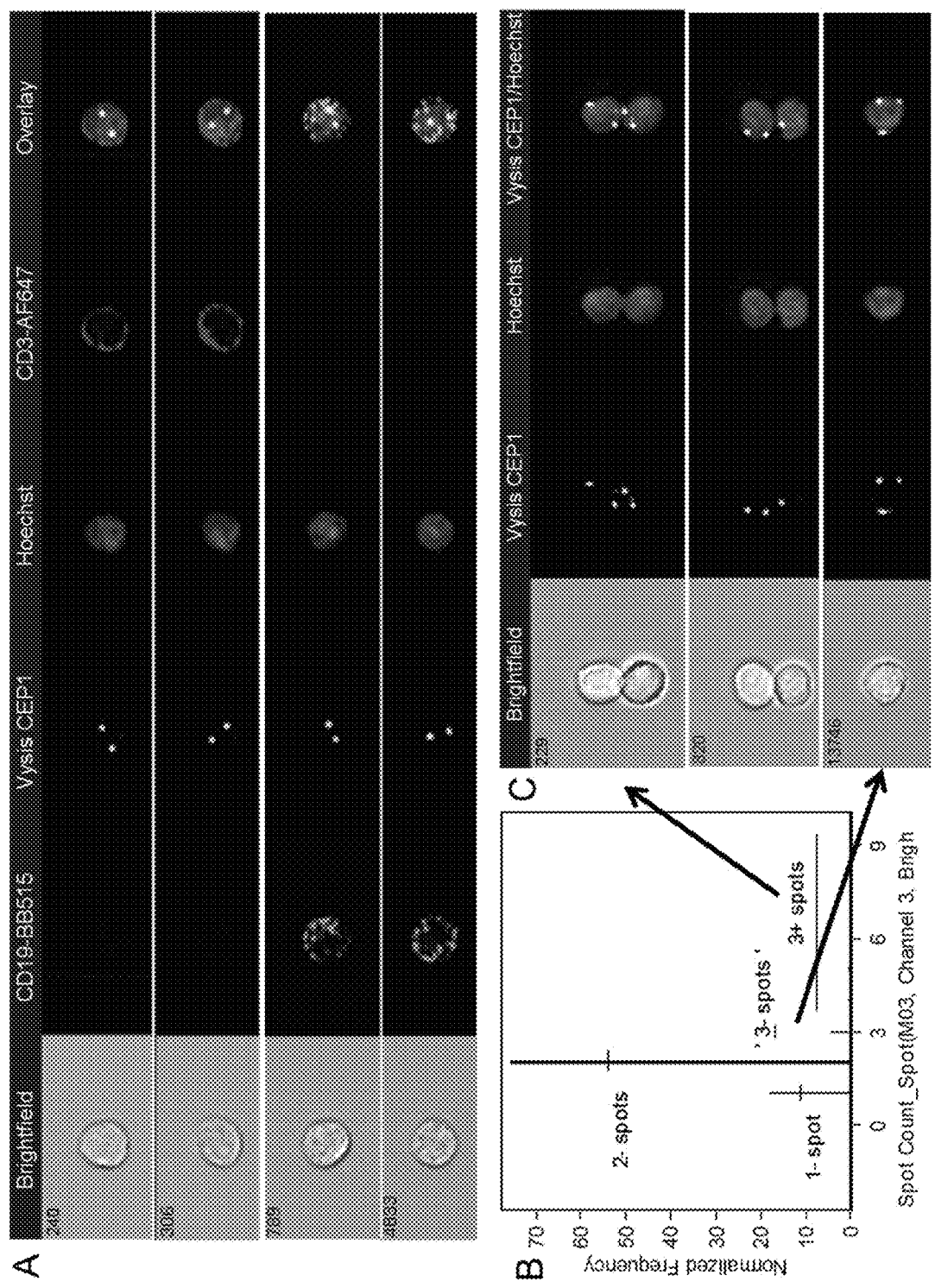

FIG. 11 shows protocol for a method of cell analysis according to a suitable embodiment of the invention. A: Cell populations are gated based on expression of a combination of immunophenotypic markers and viewed in image galleries. B: "Spot count" or number of Vysis CEP1 FISH probe hybridisation spots visible in each cell. C: Accuracy of the FISH probe spot counting was increased by also analysing co-localisation of the Vysis CEP1 FISH probe signal with the nuclear marker Hoechst 33342. This excludes doublets (cells 229 and 820) and probe signal outside the nucleus (cell 13746). Suitably, these cells are excluded for accurate aneuploidy analysis.

Figure 12:
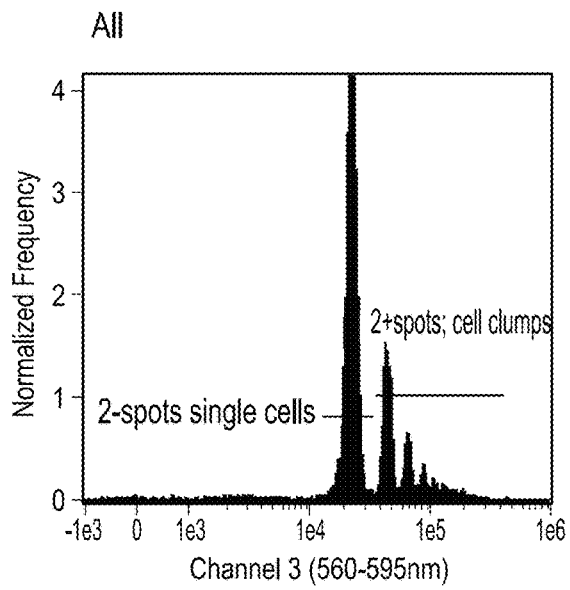
Figure 12:
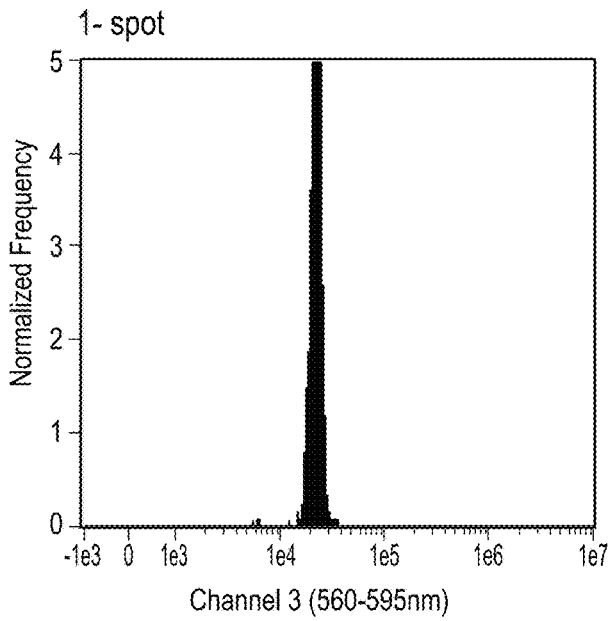
Figure 12:
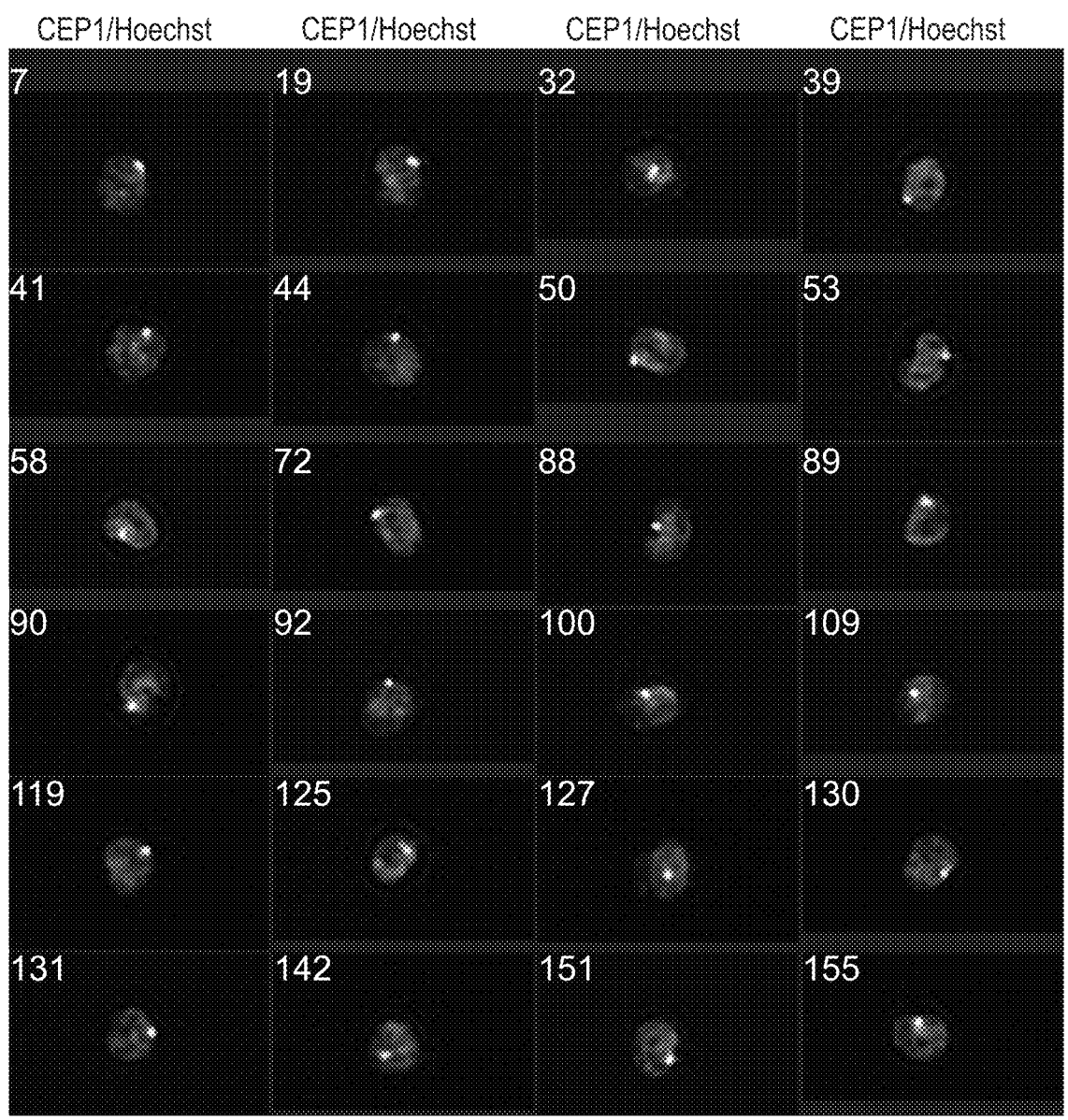
Figure 12:
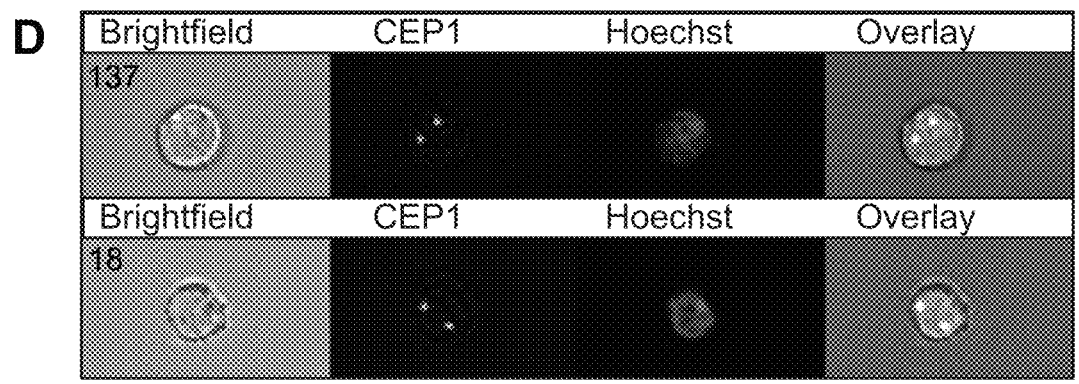
Figure 12:
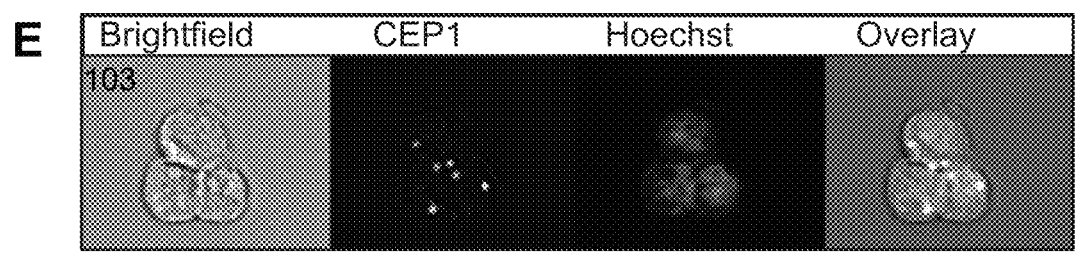

FIG. 12 shows a spot count adjustment based on mean fluorescence intensity of probe spots. (A) Mean fluorescence intensity (MFI) for the 2-spot populations was 22266 fluorescence units and 3 or spots have an MFI of 61511. (B) MFI for the 1-spot population was 22343 fluorescence units, almost identical to the 2-spot population. (C) Hoechst and CEP12-SpectrumOrange overlay image gallery of 1-spot cells from B. (D) Image gallery of 2-spot single cells from A. (E) Image gallery of cell clumps with 2 or more spots from A.

Figure 13:
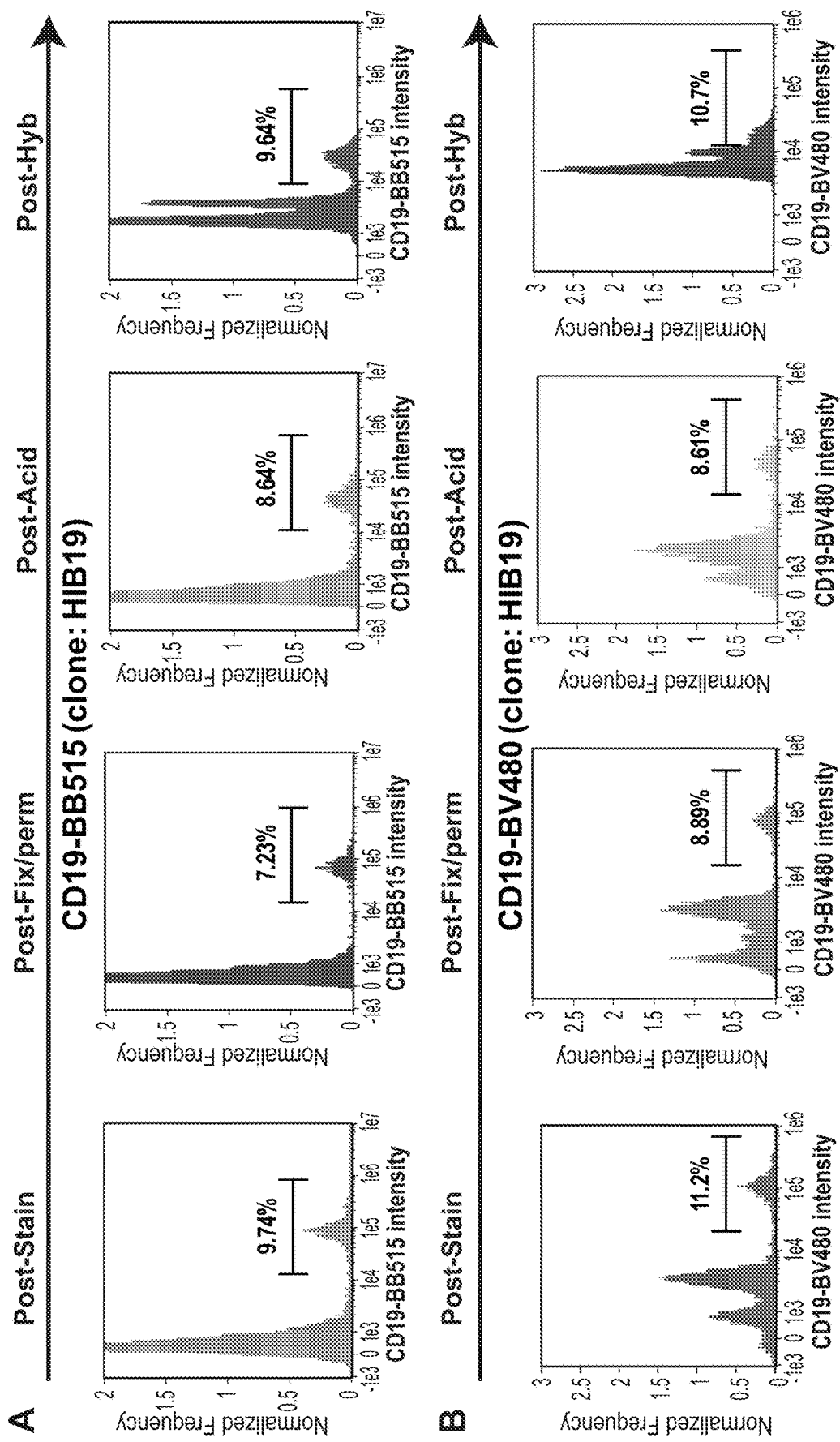
Figure 13:
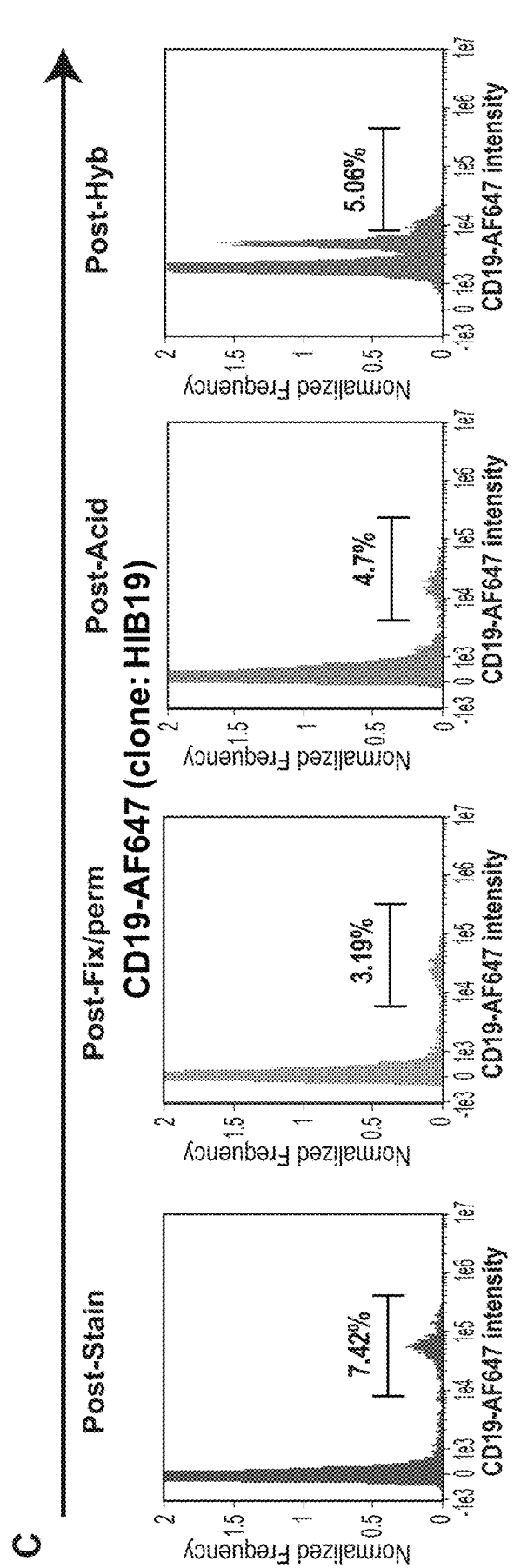

FIG. 13 shows decrease in fluorescence intensity during processing when performing a method of cell analysis according to an embodiment of the invention. Immuno-flowFISH was performed on peripheral blood mononuclear cells (PBMCs) stained with CD19 clone HIB19 conjugated with (A) BB515, (B) BV480 and (C) AF647. Aliquots were removed for analysis on an AMNIS ISX MKII after cell surface antibody staining (post-stain), 4% formaldehyde (FA)+0.1% Tween20 fixation and permeabilisation (post-fix/perm), 1M hydrochloric acid (HCl) acid denaturation (post-acid) and fluorescence in situ hybridisation (FISH) (post-hyb). Data from this representative experiment demonstrated (A) greatest preservation in the resolution of CD19-BB515 positive cells throughout immuno-flowFISH, (B) adequate preservation of CD19-BV480 fluorescence in positive cells and (C) significant loss of CD19-AF647 positive cells post-hyb. There was a decrease in the MFI across all positive populations stained by CD19 clone HIB19 antibodies post acid and in particular post-hyb with signal resolution of positive populations dependent on fluorophore. The lost in signal resolution of positive populations with all markers was attributed to both decreases in fluorescence intensity and an increase in the background/autofluorescence of negative populations after post-hyb, which was significantly detected in Ch07 (430-505 nm) range compared to Ch02 (480-560 nm) and Ch11 (670-745 nm) ranges after the full protocol.

Figure 14:
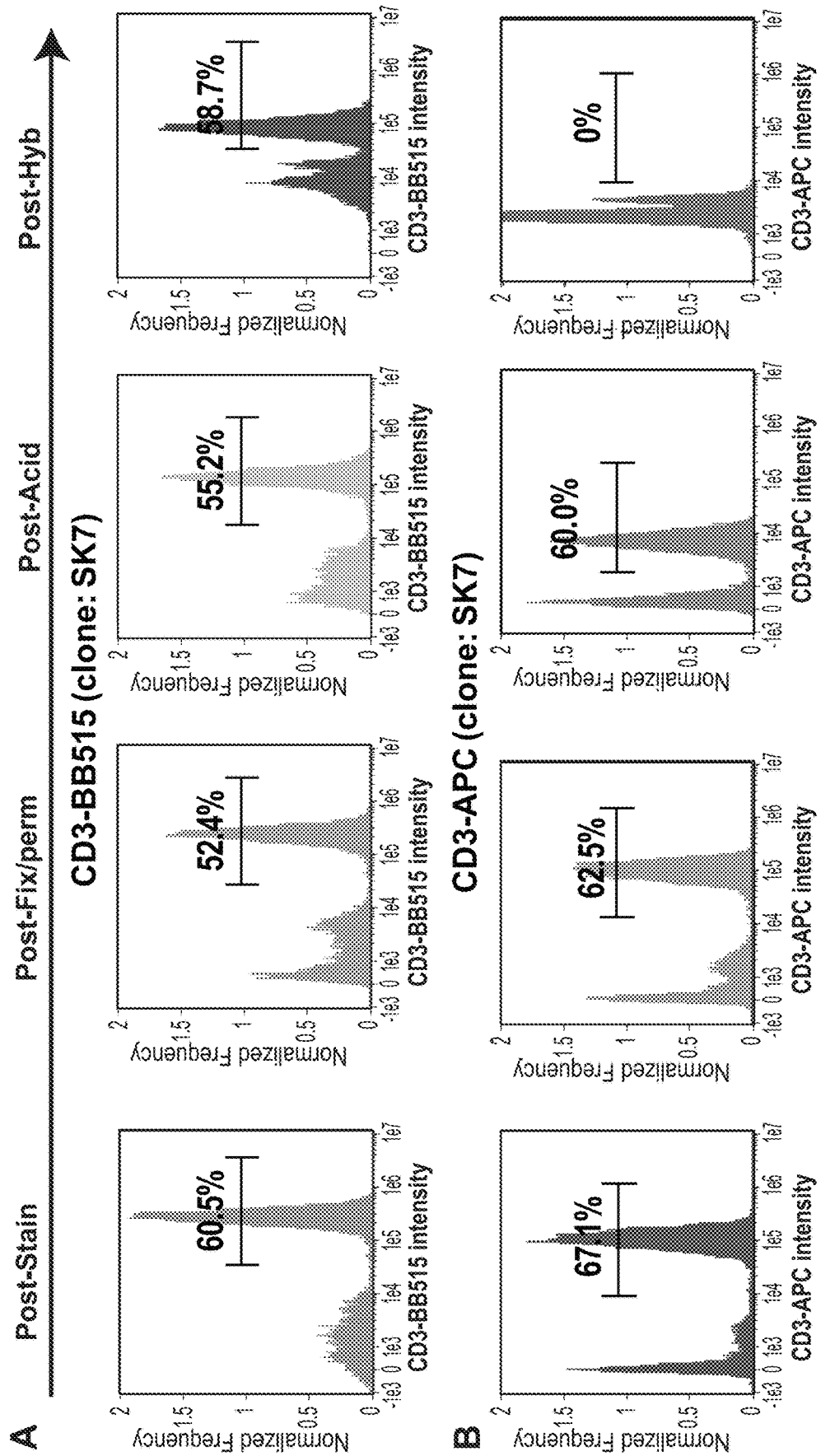
Figure 14:
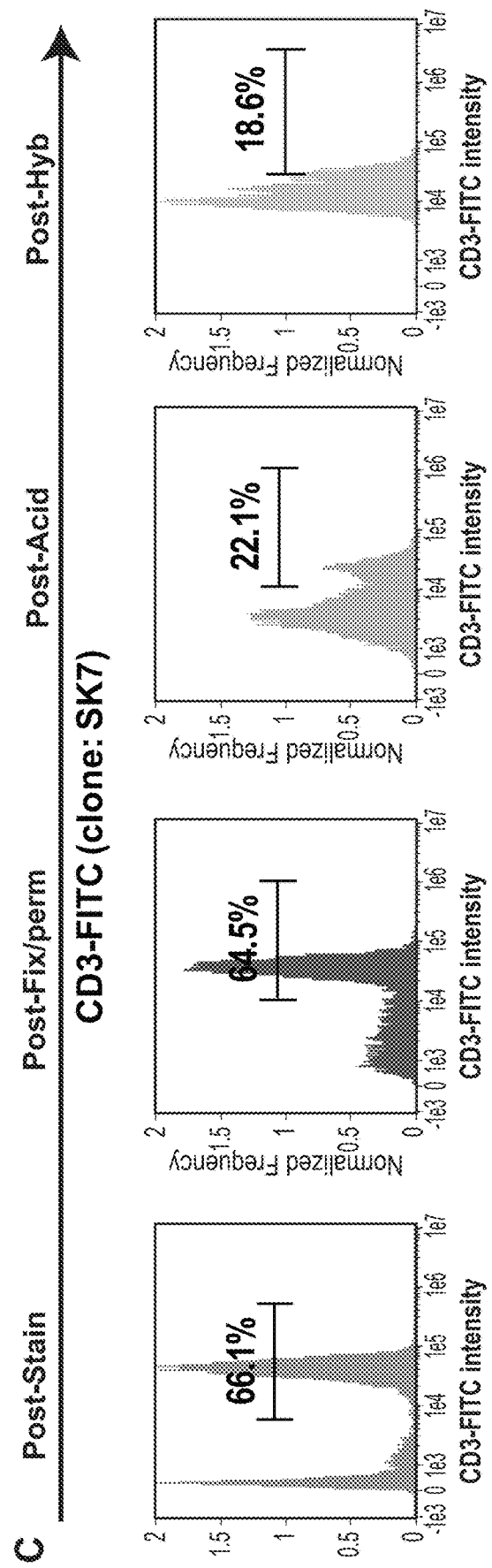
Figure 15:
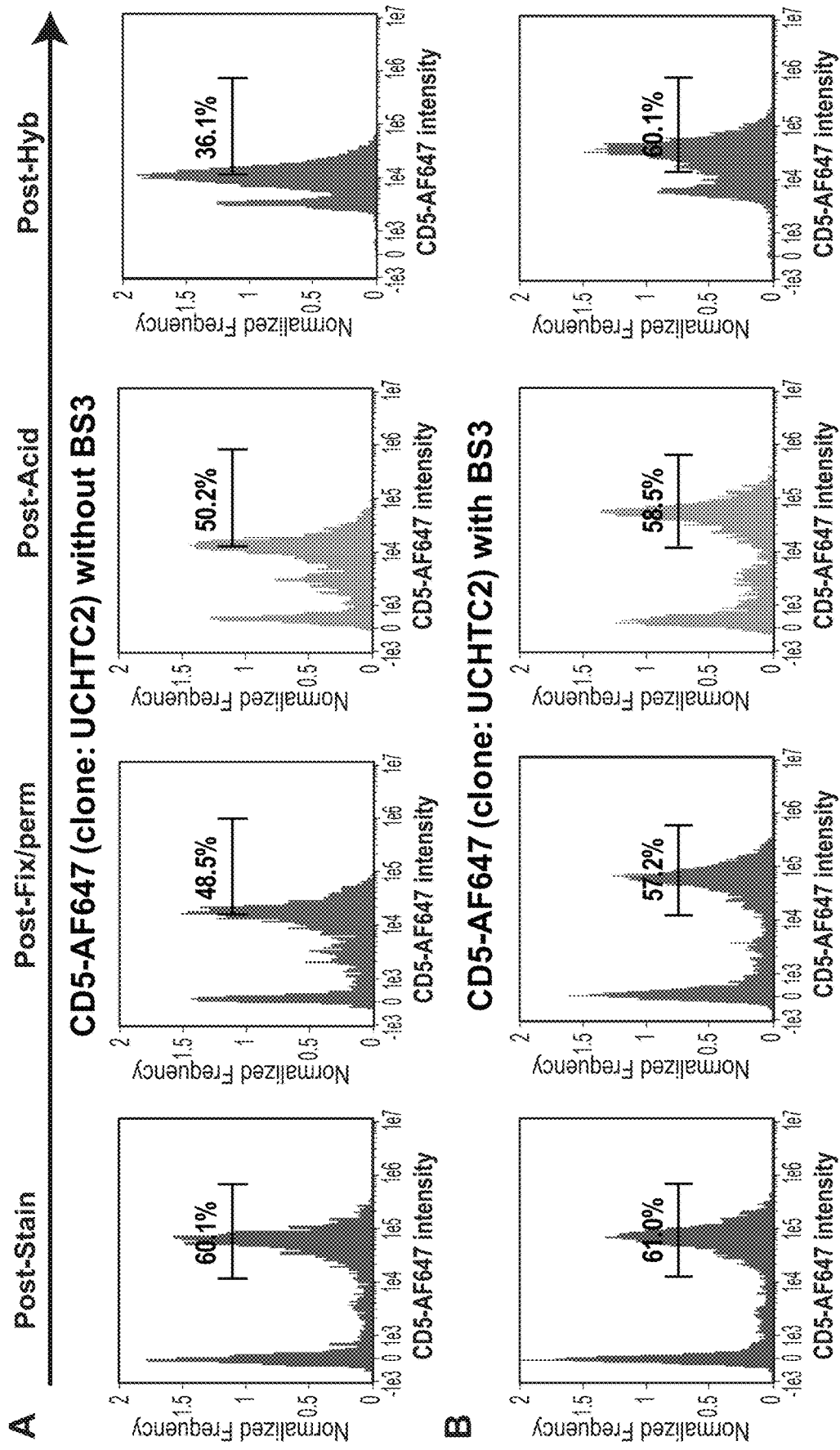

FIG. 14 shows loss of APC fluorescence during processing when performing a method of cell analysis according to an embodiment of the invention. The method of cell analysis was performed on peripheral blood nucleated cells stained with CD3 clone SK7 conjugated with BB515, APC and FITC. Aliquots were removed for analysis on an AMNIS ISX MKII after cell surface staining (Post-Stain), 4% formaldehyde (FA)+0.1% Tween20 fixation and permeabilisation (Post-Fix/perm), 1M hydrochloric acid denaturation (Post-Acid) and fluorescence in situ hybridisation (FISH; Post-Hyb). Data from this representative experiment demonstrated: (A) preservation of the resolution of CD3-BB515 positive cells; (B) complete loss of CD3-APC positive cells post-hyb; and (C) significant loss of CD3-FITC positive cells post-acid populations regardless of fluorophore. In addition autofluorescence of the negative populations increased post-hyb in the 480-560 nm wavelengths (Ch02) which also decreased resolution of positively stained subpopulations conjugated with BB515 or FITC. Abbreviations: APC-Allophycocyanin fluorophore, BB515-Brilliant Blue 515 fluorophore, Ch-channel, FITC-Fluorescein isothiocyanate fluorophore, ISX MKII-ImageStreamX MarkII FIG. 15 shows preservation of fluorescence intensity during processing with Bis(sulfosuccinimidyl)suberate (BS3) cross-linking when performing a method of cell analysis according to an embodiment of the invention. The method of cell analysis was performed on peripheral blood nucleated cells stained with CD5 clone UCTHC2 conjugated with AF647 both (A) without and (B) with BS3 cross-linking after staining. Aliquots were removed for analysis on an AMNIS ISX MKII after cell surface staining and cross-linking (Post-Stain), 4% formaldehyde (FA)+0.1% Tween20 fixation and permeabilisation (Post-Fix/perm), 1M hydrochloric acid denaturation (Post-Acid) and fluorescence in situ hybridisation (FISH; Post-Hyb). Data from this representative experiment demonstrated that the number and the fluorescence intensity of CD3-AF647 positively stained cells were preserved with BS3 cross-linking during the immuno-flowFISH protocol. Abbreviations: AF—Alexa Fluor.

Figure 16:
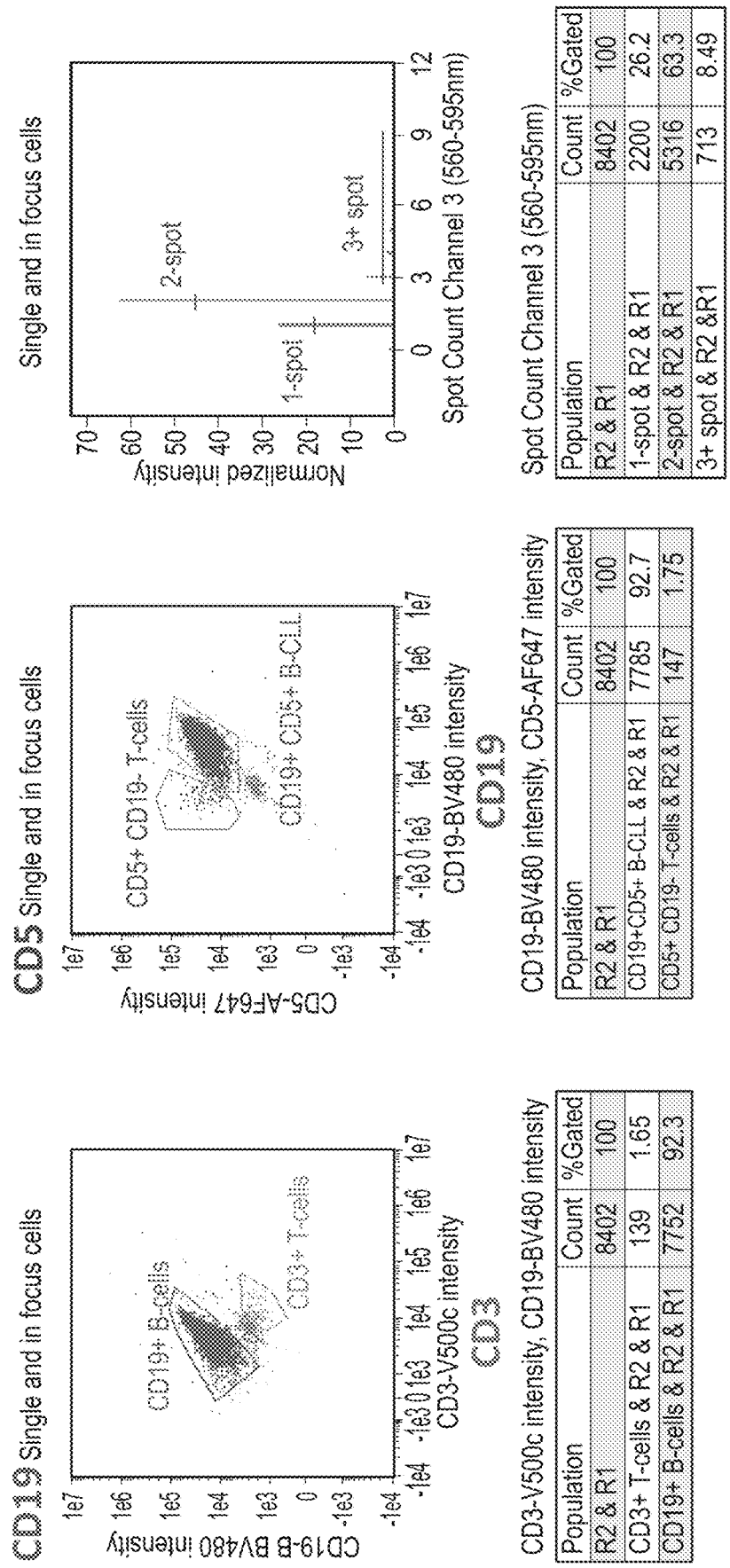
Figure 16:
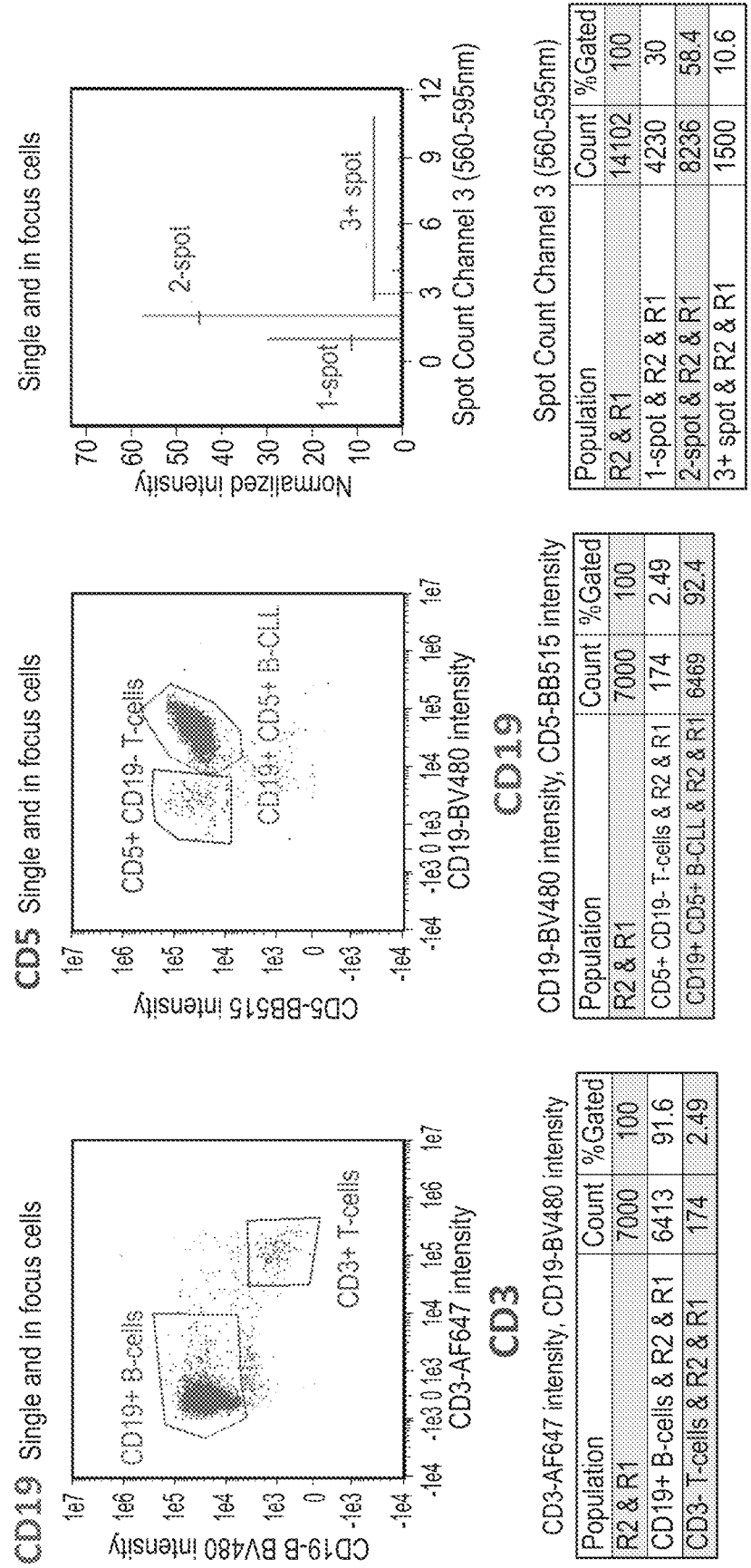
Figure 16:
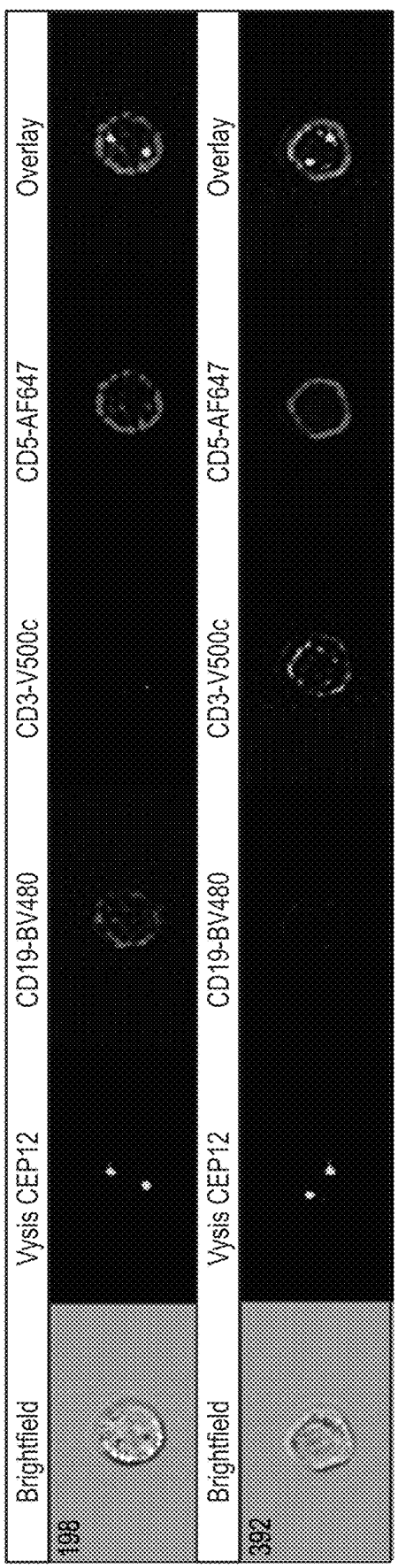
Figure 16:
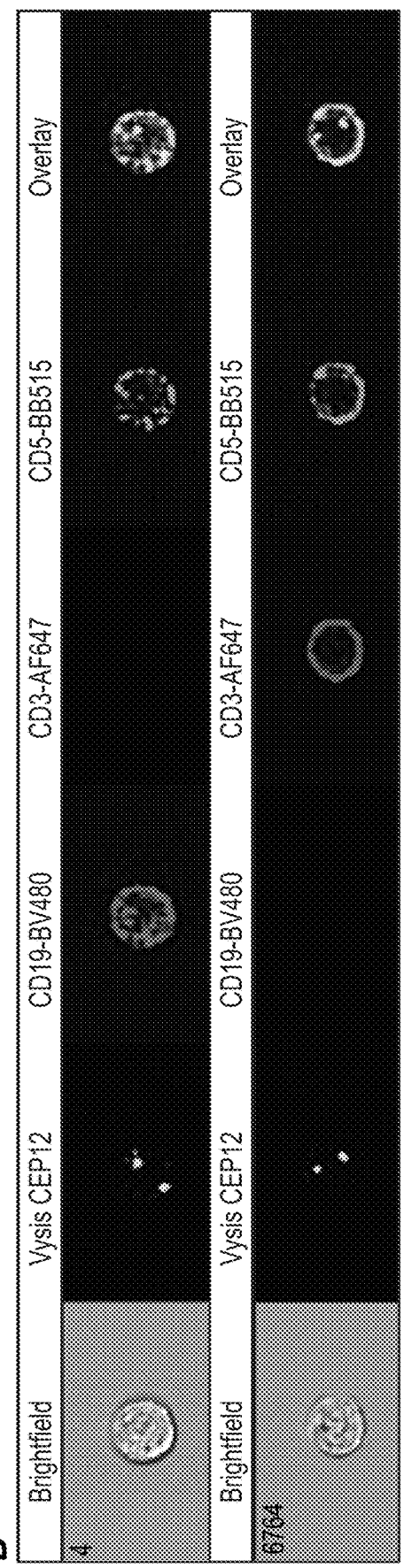

FIG. 16 shows comparison of two immunophenotyping panels for assessment of CLL samples when performing a method of cell analysis according to a suitable embodiment of the invention. Representative CLL patient sample assessment of CD3, CD5 and CD19 populations and CEP12 spot count with immunophenotyping panel 1 (A), panel 2 (B) demonstrates equivalent population density and FISH spot count. Gated populations can be viewed in image galleries. (C). In immunophenotyping panel 1 cell 198 is a CD19-BV480 positive, CD3-V500c negative, CD5-AF647 positive, CEP12 disomy B CLL cell and cell 392 is a CD19-BV480 negative, CD3-V500c positive, CD5-AF647 positive, CEP12 disomy T lymphocyte. (D) In panel 2 cell 4 is a CD19-BV480 positive, CD3-AF647 negative, CD5-BB515 positive, CEP12 disomy B CLL cell and cell 6764 is a CD19-BV480 negative, CD3-AF647 positive, CD5-BB515 positive, CEP12 disomy T lymphocyte. The overlay image is a merge of the immunophenotyping and CEP12 probe images.

DESCRIPTION OF EMBODIMENTS

For convenience, the following sections outline the various meanings of the terms used herein. Following this discussion, general aspects regarding compositions, use of medicaments and methods of the invention are discussed, followed by specific examples demonstrating the properties of various embodiments of the invention and how they can be employed.

Definitions

Future patent applications may be filed in Australia or overseas on the basis of, or claiming priority from, the present application. It is to be understood that the appended claims are provided by way of example only and are not intended to limit the scope of what may be claimed in any such future application. Features may be added to or omitted from the provisional claims at a later date so as to further define or re-define the invention or inventions.

The meaning of certain terms and phrases used in the specification, examples, and appended provisional claims, are provided below. If there is an apparent discrepancy between the usage of a term in the art and its definition provided herein, the definition provided within the specification shall prevail.

Those skilled in the art will appreciate that the invention described herein is susceptible to variations and modifications other than those specifically described. The invention includes all such variations and modifications. The invention also includes all of the steps, features, formulations and compounds referred to or indicated in the specification, individually or collectively and any and all combinations or any two or more of the steps or features.

Each document, reference, patent application or patent cited in this text is expressly incorporated herein in their entirety by reference, which means that it should be read and considered by the reader as part of this text. That the document, reference, patent application or patent cited in this text is not repeated in this text is merely for reasons of conciseness. None of the cited material or the information contained in that material should, however be understood to be common general knowledge.

Manufacturer's instructions, descriptions, product specifications, and product sheets for any products mentioned herein or in any document incorporated by reference herein, are hereby incorporated herein by reference, and may be employed in the practice of the invention.

The present invention is not to be limited in scope by any of the specific embodiments described herein. These embodiments are intended for the purpose of exemplification only. Functionally equivalent products, formulations and methods are clearly within the scope of the invention as described herein.

Other than in the operating examples, or where otherwise indicated, all numbers expressing quantities of ingredients or reaction conditions used herein should be understood as modified in all instances by the terms "around" or "about." The terms "around" or "about" when used in connection with percentages can mean±1%.

The invention described herein may include one or more range of values (e.g. size, concentration etc.). A range of values will be understood to include all values within the range, including the values defining the range, and values adjacent to the range which lead to the same or substantially the same outcome as the values immediately adjacent to that value which defines the boundary to the range. For example, a person skilled in the field will understand that a 10% variation in upper or lower limits of a range can be totally appropriate and is encompassed by the invention. More particularly, the variation in upper or lower limits of a range will be 5% or as is recognised in the art, whichever is greater.

In this application, the use of the singular includes the plural unless specifically stated otherwise. In this application, the use of "or" means "and/or" unless stated otherwise. Furthermore, the use of the term "including", as well as other forms, such as "includes" and "included", is not limiting. Also, terms such as "element" or "component" encompass both elements and components comprising one unit and elements and components that comprise more than one subunit unless specifically stated otherwise. Also, the use of the term "portion" can include part of a moiety or the entire moiety.

Throughout this specification, unless the context requires otherwise, the word "comprise" or variations such as "comprises" or "comprising", will be understood to imply the inclusion of a stated integer or group of integers but not the exclusion of any other integer or group of integers.

Other definitions for selected terms used herein may be found within the detailed description of the invention and apply throughout. Unless otherwise defined, all other scientific and technical terms used herein have the same meaning as commonly understood to one of ordinary skill in the art to which the invention belongs.

Features of the invention will now be discussed with reference to the following non-limiting description and examples.

ILLUSTRATIVE EMBODIMENTS

According to a first form, the invention resides in a method for diagnosing or prognosing a condition in a cell population comprising the steps of:
- a. Selecting a cell population to be analysed and analysing a cell population's antigenic profile by immunophenotyping the population using flow cytometry to detect the presence or absence of one or more biological markers or parameters associated with a condition to be measured or assessed, and,
- b. Subjecting the population to at least a FISH probe that allows the cells to be visualised and counted permitting specific cells to be identified by their precise phenotype permitting the identification of genomic aberrations in cells identified by phenotype.

According to the first step in the method, by immunophenotyping the cell population using flow cytometry, multiple fluorescent parameters can be simultaneously assessed. This step also allows visualisation of the cell morphology of the population (cell characteristics), permits immunophenotyping the cells and the identification of the location of the antigen either on the membrane; cytoplasm; nuclear.

Preferably, in the second step the FISH probe produces fluorescent "spots" or another signal to be counted in these specific cells identified by their precise phenotype.

Both sets of data (from step 1 and 2) can then be used to determine, using imaging flow cytometry, the presence or absence of a particular medical or therapeutic condition.

According to the invention, example methods described herein have been optimised for the assessment of haematological malignancies and have the potential in the detection of aneuploidy as well as deletions, translocations or fusions in phenotypically identified cells. Preferably, the method of the invention can be used for:
- a. Diagnosis, classification and staging of malignancies;
- b. Assessment of post-treatment residual disease monitoring. This will assist in detection of disease at lower disease burden, allowing the early introduction of high-dose therapies including transplantation with predicted improvements in patient outcome;
- c. Prognostic determination; and/or
- d. Treatment decisions.

In a non-limiting preferred form of the invention, the immuno-flowFISH method is used for the detection of genetic differences in sub-populations of neoplastic cells. For example, differences in cell kinetics (i.e. ploidy, apoptosis and cell cycle) of neoplastic cells with different genetic abnormalities as well as genomic drift or clonal evolution (i.e. acquisition of new chromosomal aberrations) with disease progression could be studied. These biological characteristics can be utilised to modify timing and choice of therapy (e.g. specific targeted therapies) with the potential to improve clinical outcome.

In addition to cancer related analyses, the immuno-flow-FISH protocol may be used for the investigation of non-malignant diseases, including antenatal diagnosis by detecting chromosomal defects in foetal cells that are present in maternal blood or blood chimerism, which is the presence of genetically distinct cells that originated from one individual in the blood of another. This occurrence has been demonstrated in a number of clinical settings including foetal-maternal trafficking, twin studies, solid organ or allogeneic haemopoietic transplantation and non-leucocyte blood transfusion. Therefore, there are a number of non-malignant applications of the immuno-flowFISH method.

Preferably the method of the invention is used for the investigation of one or more of the following possible applications of the example method:
- a. Non-malignant disease applications such as:
  - i. Antenatal applications
    1. Antenatal diagnosis of disease with chromosomal defect or difference from maternal blood: identify fetal cells (nucleated red blood cells or trophoblasts) in maternal circulation
       - a. Nucleated cells of fetal origin:
         - i. Immunophenotype to identify nucleated red blood cells with antibodies to HbF (intracellular), CD71 (transferrin receptor), or trophoblasts with antibodies to HLA-G (and negative for CD45)
         - ii. Probes for disease of interest,
           1. Numeric: e.g. CEP21 Down syndrome
           2. Structural: less common
       - b. Fetal lymphocytes of male origin in maternal blood:
         - i. Immunophenotype: identify by CD45 (won't discriminate maternal from fetal)
         - ii. Probe: male gender with Y chromosome
  - ii. Chimerism:
    1. Post-transplantation gender-mismatched transplant
       - a. Immunophenotype: identify lymphocytes by CD45 (won't discriminate recipient and donor)
       - b. Probe: X and Y chromosome
- b. Malignant Diseases:
  - i. Haematological malignancies: Detection of chromosomal aberrations in neoplastic cells identified by phenotype. Limitation is only having appropriate antibody-fluorochrome combination and probe
    1. Classification: disease diagnosis and classification based on WHO classification utilising phenotype and chromosomes.
       - a. Numeric abnormalities ("aneuploidy"): monosomies, trisomies, tetrasomies, hyperdiploidy, hypodipoidy
         - i. Examples: acute leukaemia, chronic leukaemia, plasma cell myeloma, myelodysplastic syndrome, lymphoma
       - b. Structural abnormalities: deletions, fusions
         - i. Examples: acute leukaemia, chronic leukaemia, plasma cell myeloma, myelodysplastic syndrome, chronic eosinophilic leukaemia, lymphoma
    2. Treatment decisions: Treatment choice based on presence of a chromosomal defect in specific diseases identified by phenotype (e.g. chronic lymphocytic leukaemia and del(17p); myelodysplastic syndrome with del(5q)
       - a. High sensitivity
       - b. Low clonal burden can be detected 3. Prognosis: Diseases stratified by chromosomal abnormalities, for example
   a. Chronic lymphocytic leukaemia
   b. Plasma cell myeloma
   c. Myelodysplastic syndrome
   d. Acute myeloid leukaemia
   e. Acute lymphoblastic leukaemia
   f. Lymphoma
4. Residual disease:
   a. Minimal residual disease burden based on chromosomal defect
   b. Acquisition of new clone based on chromosomal defect
   c. Disease eradication prior to harvesting for autologous transplantation
   d. Sensitivity issues: sensitivity 1:105
      i. More sensitive than morphology
      ii. More sensitive than FISH (1-5 cells/100)
      iii. More sensitive than flow MRD
      iv. May be less sensitive than RT-PCR (1:105)
ii. Non-haemopoietic cells: diagnosis and classification
   1. Primary tumour: differential diagnosis of
      a. Tissue: cells extracted from tissue.
         i. Numeric abnormalities: aneuploidy (e.g. differential diagnosis melanoma vs atypical naevus)
         ii. Structural abnormalities: deletions, fusions (e.g. non Hodgkin lymphoma)
      b. Treatment decisions: Treatment choice based on presence of chromosomal defect in specific diseases identified by phenotype
   2. Metastatic disease: identify by surface or intracellular non-haemopoietic antigens characteristic of the neoplastic cell.
      a. Blood: Circulating tumour cells (CTC)
      b. Examples: breast; melanoma
      c. Bone marrow: metastatic cells
c. Other applications include:
   i. DNA: BAK probes for specific genetic regions
   ii. RNA probes: detection of transcript
   iii. Scientific applications:
      1. Cell ploidy (e.g. megakaryocyte)
d. Non-Human Genotype Assessment:
   i. Intracellular virus detection: Detection of viral genomic DNA sequences integrated into human cells identified by phenotype.
      1. Epstein-Barr virus (EBV): infects B-cells and is a known oncovirus by deregulating cell replication and apoptosis (e.g. hijacking of MYC and BCL2L11 genes).
         a. As classified by WHO, haematological malignancies such as non-Hodgkin's lymphoma (i.e. Burkitt's lymphoma) and Hodgkin's lymphomas are strongly linked to latent EBV infections
      2. Commercial probes for the detection of EBV DNA or related transcripts (e.g. peptide nucleic acid probes) are available as well as the ability to synthesise specific oligonucleotide probes conjugated to various types fluorophores for specific detection of the EBV genome It can also be used to identify CAR-T cell persistence by a probe to a transgene vector sequence. In particular, it can be used to for detection of an engineered introduced nucleic acid sequence and its expression in a cell.

One of the major non-malignant applications where this inventive technology has particular use is antenatal (or prenatal) diagnosis of disease in a foetus, and especially Down syndrome. Down syndrome, for example, first described in 1959, is the most common chromosomal condition in newborn babies affecting 1 in 1,000 babies in Australia and 1 in 800 babies in the USA. People with Down syndrome usually have distinctive facial features, some intellectual disability, heart or digestive tract problems and visual or hearing impairments. Down syndrome results from the presence of 3, instead of 2, copies of chromosome 21 ("trisomy 21"). Older mothers are more likely to have errors in the number of chromosomes within their eggs and the chance of having a live-born baby with Down syndrome increases to 1 in 259 in mothers over the age of 35 years (Morris J K, Mutton D E, Alberman E. Revised estimates of maternal age specific live birth prevalence of Down syndrome. Journal of Medical Screening. 2002; 9:2-6). Currently prenatal screening tests are offered including first-trimester risk assessment, maternal serum analyte screening and ultrasound analysis of foetal structures. These only predict risk; confirmatory diagnostic tests are invasive tests (amniocentesis or chorionic villus sampling) and carry a significant risk of foetal injury or miscarriage. Diagnosis requires the detection of the number of copies of chromosome 21 and is performed by whole chromosomal analysis (karyotyping) or FISH to specifically "tag and identify" chromosome 21. In 1969, it was first reported that small numbers of nucleated foetal red blood cells (1 per 10,000 maternal blood cells) are present in the maternal circulation. This raised the possibility that these could be isolated and used for non-invasive prenatal testing. A number of isolation, enrichment and assessment methods were developed but none have been translated to clinical practice due to their complexity, low cell yields and inconsistent results. However, the immuno-flowFISH method can enable the number of copies of chromosome 21 in foetal cells to be determined in the maternal circulation, without the need for isolation or enrichment or invasive tests.

It will be appreciated by the skilled artisan that the Applicant's immuno-flowFISH protocol may be applied to the investigation of many different samples requiring high throughput FISH analysis of immunophenotyped samples, and as such it may be of great use to international/national diagnostic pathology laboratories and research laboratories.

In second aspect, the invention provides an immuno-flowFISH method for cell analysis, comprising:
   a. preparing a single cell suspension comprising nucleated cells having cell surface, cytoplasmic or nuclear markers (antigens);
   b. antibody staining for the cell markers to phenotype the cells;
   c. fixing and permeabilising the cells in the same step;
   d. performing a cytogenetic technique (as herein described) on the cells for detecting cell chromosomes (normal or abnormal);
   e. staining the cellular DNA; and
   f. performing imaging flow cytometry on the cells.

In a form of the invention, the method further comprises the step of:
   a. analysing data obtained from imaging flow cytometry to detect the presence or absence of a medical or therapeutic condition based on the data analysis.

Preferably, in performing the invention, the samples are protected from light throughout the protocol.

In preparing the cell sample, a sample is collected from subjects suspected of suffering an ailment or disorder. The sample may comprise peripheral blood or bone marrow or a sample of tissue. Where the sample is taken of for example peripheral blood that contains nucleated cells then the nucleated cells in the sample may comprise malignant cells (e.g. CLL cells) and lymphocytes which can be used in the analysis as a healthy control with normal chromosomes (e.g. T lymphocytes).

Preferably, the sample used in the method will have between $1 \times 10^6$ nucleated cells and $5 \times 10^6$ nucleated cells or any number in between these cell numbers.

Initially, if the sample is blood or bone marrow then a single cell suspension is prepared, preferably by lysing the red blood cells. This can be achieved by incubating the sample preferably in the presence of a hypotonic buffer such as ammonium chloride, or a commercial lysis solution such as ammonium chloride potassium, or treatment with 0.1% Triton X-100, NP-40 or Brij-58. A single cell suspension may also be prepared by density gradient centrifugation, magnetic cell separation or enzymatic digest. The conditions for centrifugation will be those conditions sufficient to separate the cells while not damaging the cells. Such conditions will be recognised by those of ordinary skill in the field.

If the sample is a tissue biopsy then a single cell suspension of nucleated cells is prepared by incubating the sample with enzyme containing buffers to cleave tissue matrix and cell-to-cell adhesion ("digestion") such as collagenase, protease and DNaseI.

If the sample is cryopreserved (e.g. biobank) then a cell suspension of nucleated cells may be prepared by thawing and washing samples in Roswell Park Memorial Institute (RPMI) medium containing magnesium chloride and DNaseI enzyme or a like medium.

The cell sample preparation step can also include a centrifugation step (which involves centrifugation at, for example, 200×g for 5 minutes or any like separation speed) followed by removal of the supernatant to separate the lysed or digested cell material from the nucleated cells.

Preferably the step also includes a washing step comprising for example centrifugation at 200×g for 5 minutes with 5 ml PBS. The conditions for centrifugation will include those conditions sufficient to separate the cells while not damaging the cells and will be recognised by those of ordinary skill in the field.

According to the invention, the antibody staining of cell markers preferably comprises staining the nucleated cells with an immunophenotyping antibody mixture of antibodies purchased from companies such as BD Bioscience or BioLegend that are suitable immunophenotyping of the population of interest (For example: anti-human CD19, CD5, and CD3 for Chronic Lymphocytic Leukaemia [CLL] analysis). Such immunophenotyping antibodies are commercially available and include the following antibodies FITC-CD3, FITC-CD4, BB515-CD3, BB515-CD4, BB515-CD5, BB515-CD19, BB700-CD4, PE-CD3, PE-CD4, PECy5-CD4, PECF594-CD4, PECy7-CD4, PECy7-CD19, PerCPCy5.5-CD4, BV421-CD4, BV480-CD3, BV480-CD4, BV480-CD5, BV480-CD19, BV510-CD4, V500c-CD3, BV605-CD4, BV650-CD4, BV650-CD19, BV711-CD3, APC-CD3, APC-CD4, APC-CD19, AF647-CD3, AF647-CD5, AF647-CD19, APCCy7-CD4, APCH7-CD3, APCH7-CD19, AF700-CD3, AF700-CD4, APCR700-CD4, APCeFlour780-CD3, APCeFlour780-CD19 or APCFire750-CD3.

Antibody staining may further comprise incubating the cells to allow sufficient time for the antibodies to bind their cellular antigen or ligand. For example, the cells may be incubated for around thirty minutes at around four degrees Celsius. The conditions for antibody staining will be those conditions sufficient to facilitate antibody antigen interaction while not damaging the cells. Such conditions will be recognised by those of ordinary skill in the field.

Antibody staining may also comprise a washing step to remove excess unbound antibody. Such a step can be conducted with 800 uL 2% FCS/PBS and centrifugation of the cells at 950×g for 3 minutes. Although, the conditions for washing in such circumstances will be those conditions sufficient to remove unbound antibody while note removing bound antibody and will be recognised by those of ordinary skill in the field.

According to the invention, the fixing of cells step preferably comprises adding formaldehyde to the sample. The optimal regimen is around four percent formaldehyde incubated with cell suspensions. Alternate cell fixation include: 0.5-3% formaldehyde; Carnoy's fixative (methanol 3:1 acetic acid); methanol 50-100%; 70% methanol+4% formaldehyde+5% acetic acid; 50% methanol+4% formaldehyde+5% acetic acid; 70% methanol+4% formaldehyde; 70% methanol+5-25% acetic acid; formaldehyde 4%+0.1% Tween20 and 70% acetone. Furthermore, this four percent formaldehyde fixation step can include addition of non-ionic detergents at around point one percent non-ionic detergent. Non-ionic detergents are required for cell permeabilisation to enable probe access to target DNA for FISH. Combining formaldehyde and non-ionic detergents enables cells to be fixed and permeabilised in one single step, which is more economical, reduces time and handling in the protocol. For example, the non-ionic detergent can be Tween20, which is usually utilised for cell permeabilisation for both flow cytometry, or FISH applications for the detection of intracellular antigens or target DNA respectively. Desirably, the sample is also subjected to incubation, washing and or centrifugation in that order for fixation and permeabilisation with formaldehyde and tween20.

Samples are then resuspended in a phosphate buffered saline with foetal calf/bovine serum for storage at say 4° C. for 3-5 days following fixation during which time they may be transported or "batched" with other samples prior to hybridisation and analysis.

Performing the cytogenetic technique requires hybridising the cells with a probe preferably with a FISH probe. In this respect, the cytogenetic technique step can also include a step of denaturing DNA, blocking non-specific probe DNA binding and FISH probe hybridisation with nuclear material in the cells under examination.

An acid may be used to denature DNA. Where acid is used for the denaturation the acid is preferably a hydrochloric acid at around a concentration of 0.5M-1M. Alternate DNA denaturation conditions tested include: 0.5-4M hydrochloric acid; 5-25% acetic acid; 5-15% dimethyl sulfoxide (DMSO); 70% acetone and 0.1 ug/ml proteinase K.

In a preferred form of the cytogenetic technique step, the cells are quenched in 3 ml ice-cold phosphate buffered saline (PBS). The quenched cells are then centrifuged at 600×g for 10 minutes and supernatant removed.

Preferably during the blocking step, non-specific probe DNA is blocked from binding to FISH probe hybridisation. This may be achieved by exposing the sample to PBS/BSA and then washing the cells. (eg centrifuge at 950×g for 3 minutes with 1 ml PBS/BSA). The resultant supernatant can then be removed, and the cells are resuspended in a hybridisation buffer such as 50% formamide, 10% dextran sulphate, 0.1% Tween20 in 2× standard sodium citrate for FISH probe analysis. In this form of the invention the cells are then heated to 73-74° C. to denature DNA and/or facilitate probe annealing. This step is preferably carried out in an automated thermocycler. The cells may then be washed in a stringency solution such as 0.1-0.3% Igepal CA-630 in 0.4-2× standard sodium citrate buffer at least once and resuspended. Igepal CA-630 is a non-ionic detergent that provides solubilisation of membranous components and non-specific probe binding and standard sodium citrate is a salt that also provides destabilises non-specific probe binding in a concentration dependent manner (i.e. lower salt equals higher stringency) whilst keeping cells in suspension. Nuclear DNA staining of the cells is then undertaken and can include Hoechst (1:1000 or 1 ug/ml) or SYTOX AAD-vanced (1:5000 or 0.2 uM) for 20 minutes at room temperature.

According to the invention, the step of performing imaging cytometry on cells involves using excitation lasers and capturing brightfield images, fluorescent emissions and images in the wavelength range 515-810 nm. The excitation lasers may comprise 100 mW 405 nm, and/or 50 mW 488 nm, and/or 150 mW 561 nm, and/or 150 mW 592 nm and/or 120 mW 642 nm lasers. Performing imaging cytometry preferably involves capturing images with at least 40× objective. The images may be captured with a 30× to 70× objective range. Desirably, the images are captured with around a 60× objective.

Performing imaging cytometry may also comprise identifying cells in a scatter plot. Suitably, a minimum of 10,000 cells are recorded in the sample, preferably 100,000-1,000,000 cells are recorded in total. Further, single stained cells may be analysed in the absence of brightfield and the 785 nm "scatter" laser, and a compensation matrix may be calculated.

According to the invention, in the imaging flow cytometry step immuno-flowFISH data analysis is performed using image analysis software such as IDEAS (AMNIS Merck, Seattle, USA), CellProfiler (Broad Institute, Massachusetts, USA) and FCS Express v6 Image Cytometry (De Novo Software, California, USA). Data analysis may comprise selecting focused images by measuring the sharpness or quality of an image (e.g. Gradient Root Mean Square or GRMS), which will increase the accuracy of probe spot counts for FISH analysis. Preferably, the data is prepared in a scatter plot of the Aspect Ratio versus Brightfield Area to identify single cells and remove doublets or cell clumps which may provide false positive FISH results e.g. hyperploidy.

The analysis may also include identifying nucleated non-dividing cells in a fluorescence intensity histogram by excluding cells with high fluorescence intensity. Such data analysis will ideally comprise gating cell populations of interest based on the fluorescence intensity of markers such as normal lymphocytes (i.e. T-lymphocytes, B-lymphocytes) and malignant cells (e.g. CLL, acute myeloid leukaemia, plasma cell myeloma), depending on the application and cell markers used.

Preferably, the data analysis comprises determining co-localisation of FISH probe signal with a nuclear stain using a measure of the degree to which two images are linearly correlated within a masked region. Data analysis can comprise counting the number of FISH probe spots per cell using a Peak, Spot or Intensity mask. This can involve examining the connectivity of each pixel based on whether it is connected to a particular spot or the background. Preferably, the spot counts are verified by single parameter histograms comparing the measured fluorescence intensity of FISH signals for each of the spot count populations.

In a third aspect, the invention provides a diagnostic method for cell analysis comprising the steps of:

a. preparing nucleated single cell suspension;
b. antibody staining of cell surface, cytoplasmic or nuclear markers from the suspension produced in (a) and detecting the stained antibody;
c. fixing and permeabilising cells in the suspension in the same step;
d. denaturing DNA, blocking non-specific probe DNA binding and FISH probe hybridisation with nuclear material in the cells under examination;
e. performing imaging flow cytometry on the cells; and
f. analysing the data from step (e) to diagnose the presence or absence of medical conditions based on the results from step (b) and (e).

In a particular form of the third aspect of the invention the method includes the following steps a. Isolating nucleated cells and preparing a cell suspension;
b. Staining cell surface, cytoplasmic or nuclear antigens by forming an antigen-antibody complex using immunophenotyping antibodies that recognise cell markers particular for the condition being examined,
c. the full antigen antibody reaction including stabilisation is performed and quenched in 80 minutes
d. cells are then fixed and permeabilised, in the same step,
e. DNA from the cells is then denature and quenched with a low concentration of hydrochloric acid;
f. non-specific probe DNA binding is then blocked, preferably with BSA;
g. At least a FISH probe is then added and anneal to the DNA and allowed to hybridise;
h. The sample is then washed under stringent conditions to remove excess FISH probe;
i. DNA is then stained to visualise the nucleus and the sample is examined using flow cytometry;
j. data from steps (b) and (i) is then analysed using ImageStreamX to determine the presence or absence of medical conditions such as trisomy 12 (increased number of chromosomes) or deletion 17p (loss of part of a chromosome) in CLL.

Notably this protocol differs from previous prior art protocols in certain important respects (see table 1). For example, in blood and bone marrow samples initially red blood cells are lysed. This may be performed by incubating the sample with a hypotonic solution such as ammonium chloride or a commercial solution like BD PharmLyse (BD Bioscience, Sydney, Australia). Next, cell fixation and permeabilisation are carried out in the same step, which leads to a more efficient permeabilisation. Thirdly, removal of a wash step after the antibody antigen cross-link quench reduces cell damage and leads to better yield at end of protocol. Next, reduced acid concentration significantly improves cell yield at end of protocol (limitation in the immuno-S-FISH protocol). Next, during the DNA and FISH probe hybridising step the method includes a blocking step with BSA for non-specific probe DNA binding. Next, the order of the stringency washing is reversed compared to probe manufacturer (e.g. Abbott Molecular for Vysis CEP probe) recommendations and results in better removal of unbound and non-specific FISH probe binding.

In a fourth aspect, the invention provides a diagnostic kit comprising one or more of the components of the method of the invention with instructions on how to use the kit in the method.

In particular, the invention extends to kit comprising (a) at least a marker detection system suitable for standard flow cytometry, (b) one or more FISH probes of the invention, each of (a) and (b) being in one or more container(s) and combined with an instruction manual or information brochure providing instructions and/or information with respect to the use of (a) and (b) in the method of the invention.

Further, the kit may also comprise: one or more buffers suitable for use in the method of the invention, in one or more container(s).

Preferably the marker detection system present in the kit is an antibody suitable for immunophenotyping a cell sample

TABLE 1

Comparison of manual FISH and FICTION analysis with automated immunophenotyping by flow cytometry and immuno-flowFISH.

| | FISH (manual) | FICTION (manual) | Immunophenotyping (automated flow cytometry) | Immuno-flowFISH (automated) |
|---|---|---|---|---|
| Method | Slide based | Slide Based | Cells in suspension | Cells in suspension |
| Automated method | No | No | Yes | Yes |
| Assess multiple fluorescent parameters simultaneously | No | No | Yes | Yes |
| Visualise cell morphology (cell characteristics) | No | Limited | No | Yes |
| Immunophenotype cells | No | Yes | Yes | Yes |
| Antigen localisation: membrane; cytoplasm; nuclear | No | Limited | No | Yes |
| Chromosome label detection by FISH | Yes | Yes | No | Yes |
| Number of cells analysed | –<500 | –<500 | >10,000 | >10,000 |
| Limit of detection/cutoff | 3-7/100 | 1/100 | N/A | 1/10,000 |
| Accurate enumeration of FISH signals | Yes but limited | Yes but limited | No | Yes |
| Genotype based on cell phenotype | No | Yes | No | Yes |
| Return any residual sample after you have finished acquiring | No | No | Yes | Yes |
| Automated data analysis software available | No | No | Yes | Yes |
| High throughput analysis, i.e. >100 cells per second | No | No | Yes | Yes |
| In Vitro Diagnostic (IVD) compliant | Yes | | Yes | Pending |

Illustrative Exemplification of the Method

The present invention will now be described having regard to the following particular and non-limiting example of the present invention.

In a highly preferred example of the invention the immuno-flowFISH protocol includes without limitation the following steps which, although set out as separately, the steps may be grouped together in common stages:
  a. Collect cell sample and prepare a single cell suspension, e.g. lyse the red blood cells (RBCs) in blood/bone marrow, incubate with enzymes to remove tissue matrix in tissue biopsies or thaw cryopreserved samples;
  b. Incubate cells with fluorescently conjugated antibodies to detect cellular antigens as per manufacturer's instructions for 30 min at 4° C.;
  c. Wash cells in PBS/2% FCS;
  d. Incubate in 1 mM BS3 for 30 min at 4° C. (do not wash cells);
  e. Incubate with 100 mM Tris-HCL pH7.4/150 mM NaCl and quench 20 min at 4° C. (preferably without aspiration);
  f. Add 4% formaldehyde with 0.1% Tween20, gently aspirate to mix and incubate for 10 min room temp;
  g. Wash cells in PBS/2% FCS;
  h. Incubate in 0.5M HCL (acid) for 20 min a room temp;
  i. Add ice-cold PBS, centrifuge at 600×g for 10 min and remove supernatant;
  j. Block sample in PBS/1% BSA;
  k. Wash and remove supernatant;
  l. Resuspend in 0.1% NP-40 in 2×SSC-transfer cells to 0.2 ml microfuge tube;
  m. Centrifuge at 950×g for 3 min and remove all excess buffer;
  n. Resuspend in CEP hybridisation buffer with FISH probe;
  o. Denature at 73-74° C. for 5 min;
  p. Hybridise at 37° C. for 16-20 hours;
  q. Wash with 0.1% NP-40 in 2×SSC and remove supernatant;
  r. Resuspend in 0.3% NP-40 in 0.4×SSC (pre-warmed to 42° C.) and incubate for 5 min at 42° C.;
  s. Wash cells in PBS/2% FCS;
  t. Resuspend in DNA stain (e.g. SYTOX AADvanced 1:5 in PBS) and incubate for 20 min at room temperature; and
  u. Analyse on an AMNIS ImageStreamX using 60× magnification and EDF.

In this method, the following abbreviations are used
  a. BSA-Bovine serum albumin
  b. CEP-Chromosome enumeration probe
  c. DAPI-DAPI (4',6-diamidino-2-phenylindole)
  d. EDF-Extended depth of field
  e. FBS/FCS-Foetal bovine serum aka FCS or Foetal calf serum
  f. PBS-Phosphate buffered saline
  g. SSC-Saline-Sodium Citrate Preferably, as noted above, samples are protected from light throughout the protocol.

Preferably the cells analysed in the immuno-flowFISH protocol are nucleated cells, and in particular the protocol enables the analysis of chromosomes, such as chromosomes 1, 12 and 17, and/or parts of chromosomes, loci or genes, such as genes on short arm of chromosome 17.

Such cells and genetic material can be analysed to identify cytogenetic abnormalities or congenital disorders that arise from the gain or loss of genes or chromosomes.

Figure 1:
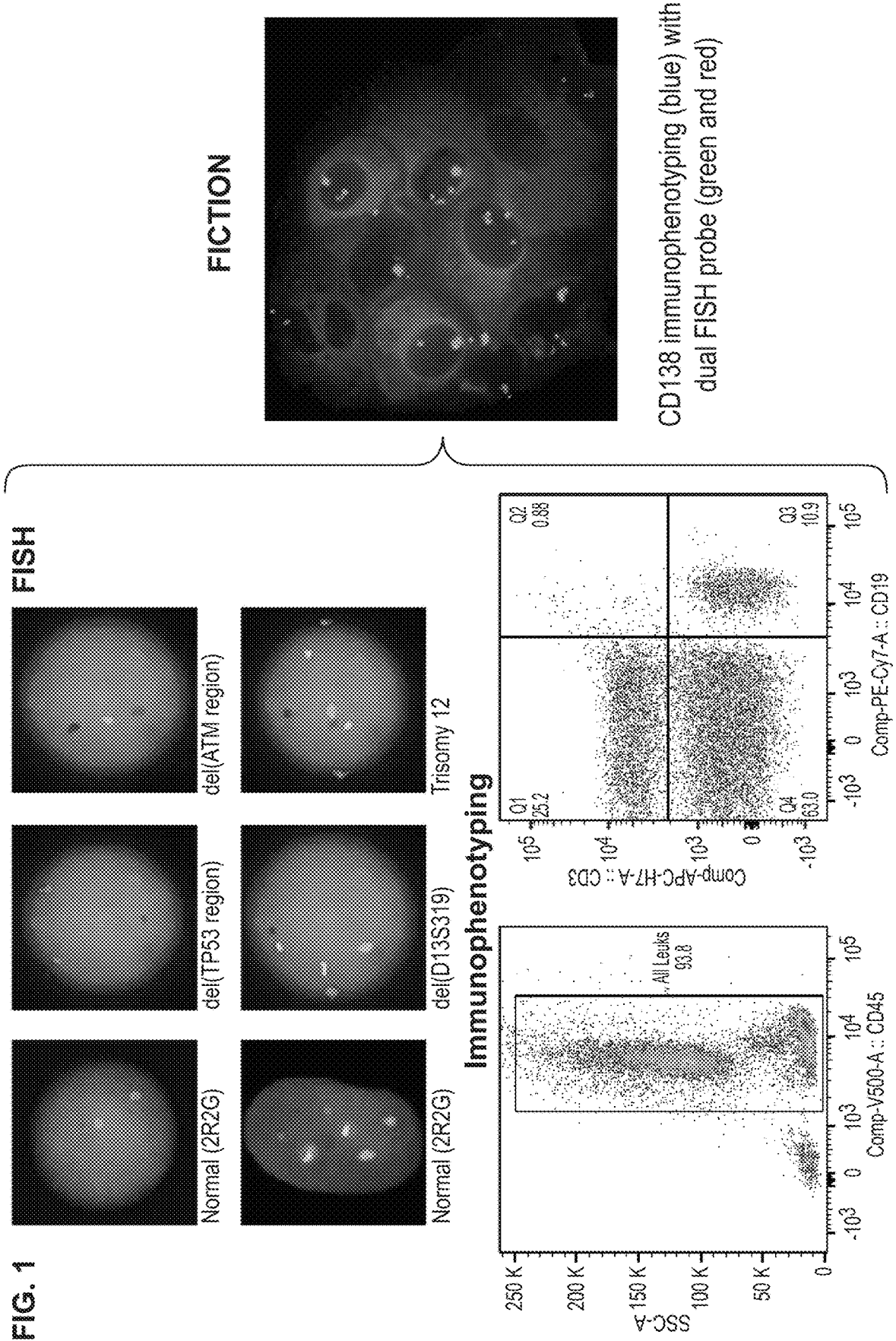
FIG. 1 shows current diagnostic methods for cell analysis including manual FISH (Vysis CLL probe kit with nuclear blue counterstain), immunophenotyping by automated flow cytometry (which is unable to perform FISH), and manual FICTION methods which combine immunophenotyping with FISH on cells on slides.
Figure 2:
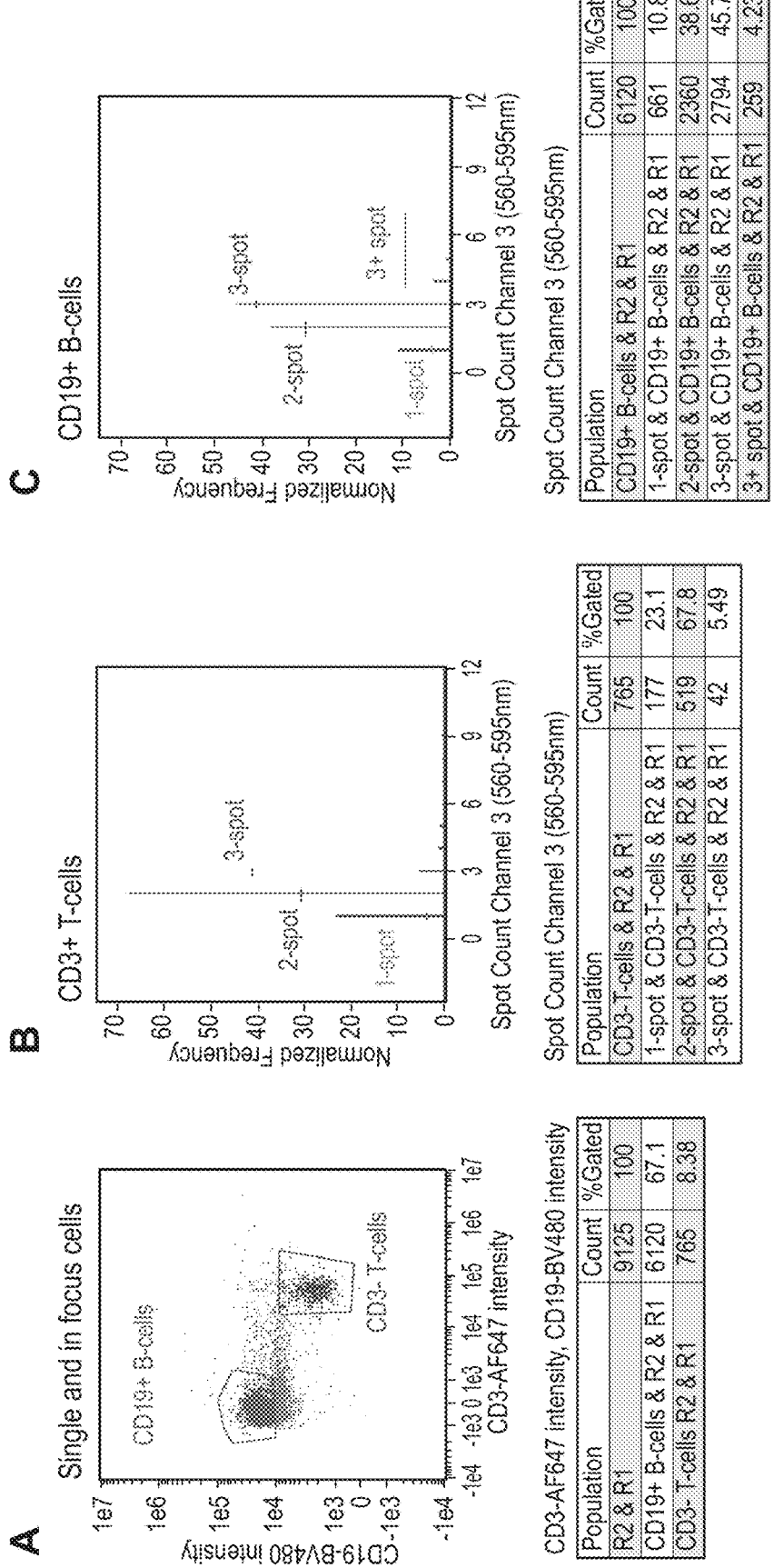
FIG. 2 shows assessment of a representative CLL blood sample for chromosome 12 copy number using a method of cell analysis according to a suitable embodiment of the invention. (A) Cell populations are gated based on expression of a combination of immunophenotypic markers. (B) "Spot count" or number of Vysis CEP12 FISH probe hybridisation spots in each CD3+ T cell. (C) "Spot count" or number of Vysis CEP12 FISH probe hybridisation spots in each CD19+ B cell. Gated populations can also be viewed in image galleries (D). Cell 639 is a CD19-BV480 negative, CD3-AF647 positive, CD5-BB515 positive, CEP12 disomy T cell, cell 326 is a CD19-BV480 positive, CD3-AF647 negative, CD5-BB515 positive, CEP12 disomy B cell and cell 164 is a CD19-BV480 positive, CD3-AF647 negative, CD5-BB515 positive, CEP12 trisomy B CLL cell. The overlay image is a merge of the immunophenotyping, CEP12 probe and nuclear SYTOX AADvanced images.
Figure 2:
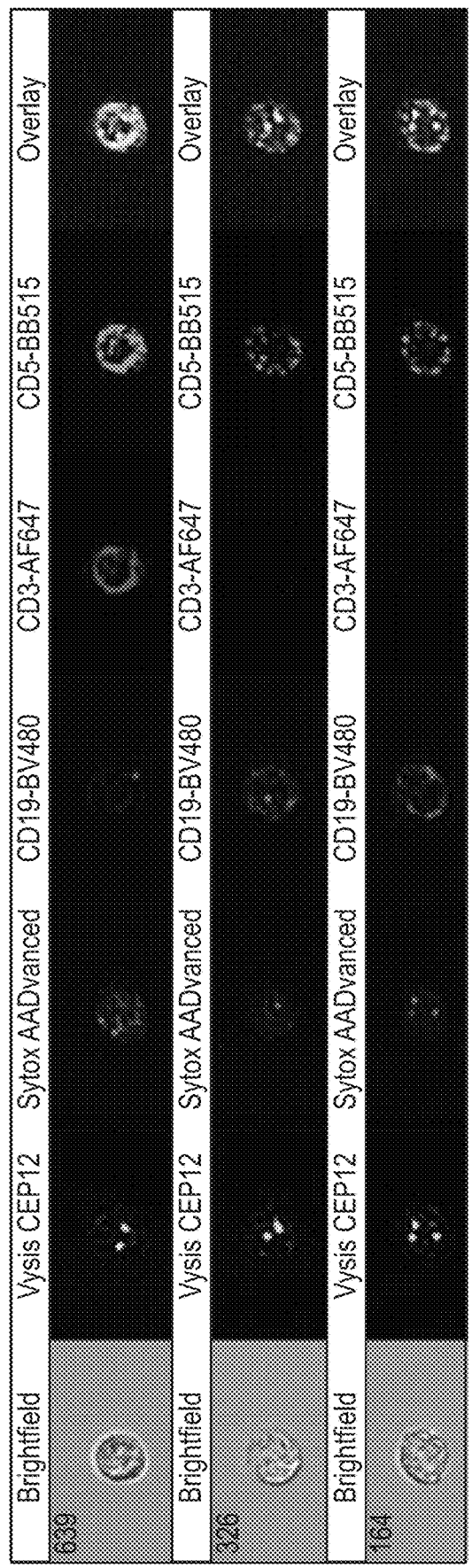

In a particular aspect, the immuno-flowFISH protocol can be used to examine medical conditions such as Chronic Lymphocytic Leukaemia (CLL) for chromosome changes such as trisomy 12 or deletion of 17p (del17p). To facilitate description of the invention by way of example the immuno-flowFISH protocol is described in the context of normal blood B and T lymphocyte population analysis, in an examination of Chronic Lymphocytic Leukaemia (CLL) for chromosome 12 copy number and deletion of 17p (del17p). Accordingly, these examples illustrate the application of the method to numeric chromosome analysis with chromosome 1 and 12 disomy analysis in normal healthy B and T cell populations, and chromosome 12 trisomy analysis in CLL (FIG. 2), as well as structural mutations such as deletion of loci on chromosome 17p.

Viability Staining

Dead cells are "sticky" and can produce false-positive results by binding non-specifically to antibodies used for immunophenotyping. It is routine practice in conventional flow cytometry immunophenotyping assays to determine the relative proportion of live and dead cells. This result is often achieved by viability staining, i.e. staining live (unfixed) cells with cell impermeant dyes such as propidium iodide, 7AAD or DRAQ7, which only stain nucleic acids in cells with compromised/permeabilised membranes. This DNA staining occurs when there is equilibrium between the fluorescent stain and the DNA, so the stain will dissociate from the DNA during subsequent processing, eventually staining all cells in the sample.

According to the present protocol it is preferable to use a fixable viability marker such as the BioLegend Zombie Dyes, eBioscience Fixable Viability Dye (FVD) eFluor780 or the LIVE/DEAD Fixable Viability Dyes from Thermo Fisher which are amine-reactive dyes that show weak positive fluorescence with viable cells (surface amine staining only) versus strong positive staining of dead cells (surface and intracellular amine staining). The optimal amount of fixable viability dye may need to be determined by preliminary titration experiments.

Preparation of Nucleated Single Cell Suspension

Preferably, the first step in the immuno-flowFISH protocol involves isolating a sample from a patient, said sample containing around $5 \times 10^6$ cells. Such a sample will allow at least 200,000 events to be analysed by the imaging flow cytometry.

Preferably in the construction of the protocol there will also be a positive control with the known chromosomal abnormality (such as a CLL patient known to have trisomy 12 or a cell culture) and a negative control (such as a CLL patient who does not have trisomy 12 or healthy donor blood).

In the example protocol, the step of preparing a nucleated single cell suspension from blood can comprise:

a. Collecting blood from healthy volunteers and CLL patients by antecubital venepuncture into VACUETTE EDTA vacuum tubes (Greiner Bio-One Preanalytics, Frickenhausen, Germany);

b. Preparing peripheral blood nucleated cells by incubating whole blood with a 1:40 volume of BD PharmLyse (BD Bioscience, Sydney, Australia) (e.g. 250 μL blood with 10 mL PharmLyse), a buffered ammonium chloride-based lysing reagent at pH7.1-7.4, for 10 min to lyse red blood cells, cryopreserved samples can be quick thawed and washed with RPMI medium with 5 mM magnesium chloride and 10U/mL DNaseI enzyme; and c. Centrifuging cells at 200 g for 5 min and removing the supernatant.

Additionally, this step in the method can include a washing of the cells (preferably 2 times) with phosphate buffered saline (PBS, without foetal bovine serum [FBS] or EDTA) and centrifugation at 200 g for 5 min. Optionally, the wash buffer has (throughout protocol) PBS/2-6% FBS, PBS/0.5-1% BSA, PBS/2% FBS/1-5 mM EDTA, PBS/1 mM EDTA. The optimum wash buffer being PBS/2% FBS for freshly collected samples and PBS/1 mM EDTA for cryopreserved samples.

Antibody Staining of Surface Markers (Immunophenotyping)

The next step in the protocol is to stain for cell antigens. In one illustration of the invention this involves antibody-based staining of cellular markers. The protocol may also include "isotype controls" which differentiate between specific antibody-antigen binding and non-specific binding of the antibody to cells. This is achieved by staining with isotype control antibodies.

In addition, when performing multiparametric analysis, the protocol may also include "fluorescence minus one (FMO)" controls, which allow for the precise identification of cells that exhibit fluorescence above background levels. Preferably, an unstained sample is also included to determine the background level or autofluorescence of cells during data analysis. Isotype and FMO controls may only require $1 \times 10^6$ cells per sample as they do not progress through the full protocol. Table 2 shows sample and control set-up for assessment of copy number for chromosome 12 in a case of CLL.

TABLE 2

Example of assessment of CLL for chromosome 12 copy number: diagnostic assessment and control samples.

| Tube # | Sample type | PBMC source | Immunophenotyping antibodies | | | Nuclear marker | Probe |
|---|---|---|---|---|---|---|---|
| 1 | Test sample | Patient blood | CD3-AF647 | CD5-BB515 | CD19-BV480 | SYTOX AADvanced | CEP12 |
| 2 | Autofluorescence | Patient blood | — | — | — | — | — |

TABLE 2-continued

Example of assessment of CLL for chromosome 12 copy number: diagnostic assessment and control samples.

| Tube # | Sample type | PBMC source | Immunophenotyping antibodies | | | Nuclear marker | Probe |
|---|---|---|---|---|---|---|---|
| 3 | Isotype control | Patient blood | Isotype-AF647 | Isotype-BB515 | Isotype-BV480 | SYTOX AADvanced | — |
| 4 | FMO 1 | Patient blood | — | CD5-BB515 | CD19-BV480 | SYTOX AADvanced | — |
| 5 | FMO 2 | Patient blood | CD3-AF647 | — | CD19-BV480 | SYTOX AADvanced | — |
| 6 | FMO 3 | Patient blood | CD3-AF647 | CD5-BB515 | — | SYTOX AADvanced | — |
| 7 | Positive control | CLL trisomy 12 case blood | CD3-AF647 | CD5-BB515 | CD19-BV480 | SYTOX AADvanced | CEP12 |
| 8 | Negative control | Donor blood | CD3-AF647 | CD5-BB515 | CD19-BV480 | SYTOX AADvanced | CEP12 |

Figure 3:
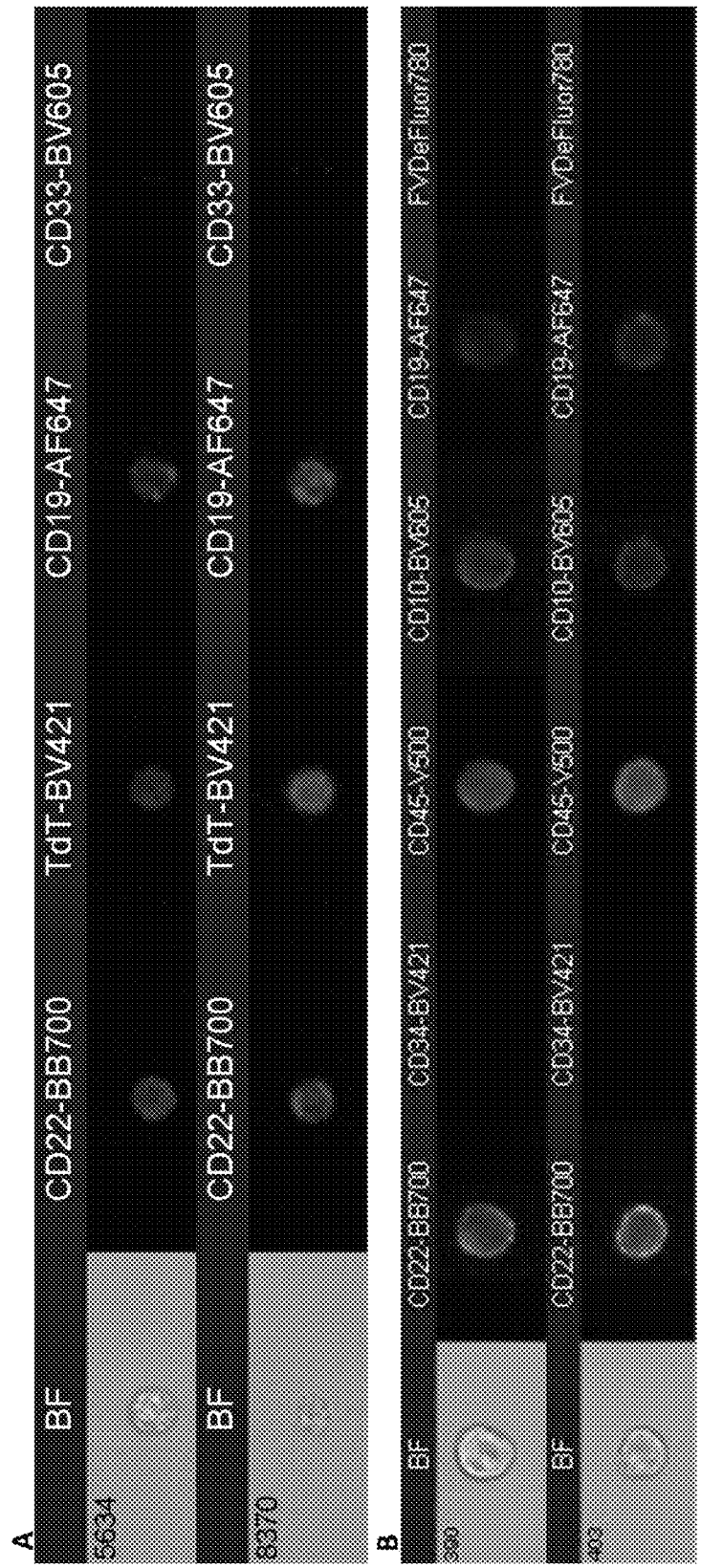
FIG. 3 shows image galleries demonstrating examples of immunophenotyping of a representative Acute Lymphoblastic Leukaemia (ALL) bone marrow sample and Reh (ALL) cell line using a method of cell analysis according to a suitable embodiment of the invention. (A) ALL cells 5634 and 8370 are CD22-BB700 positive, TdT-BV421 positive, CD19-AF647 positive and CD33-BV605 negative. (B) Reh cells 390 and 403 are CD22-BB700 positive, CD34-BV421 negative, CD45-V500c positive, CD10-BV605 positive, CD19-AF647 positive and FVDeFluor780 negative indicating that they were live cells at the time of immunophenotypic assessment. Abbreviations: AF—Alexa Fluor, BB—Brilliant Blue fluor, BF—Brightfield, BV—Brilliant Violet fluor, FVD—Fixable viability dye.
Figure 4:
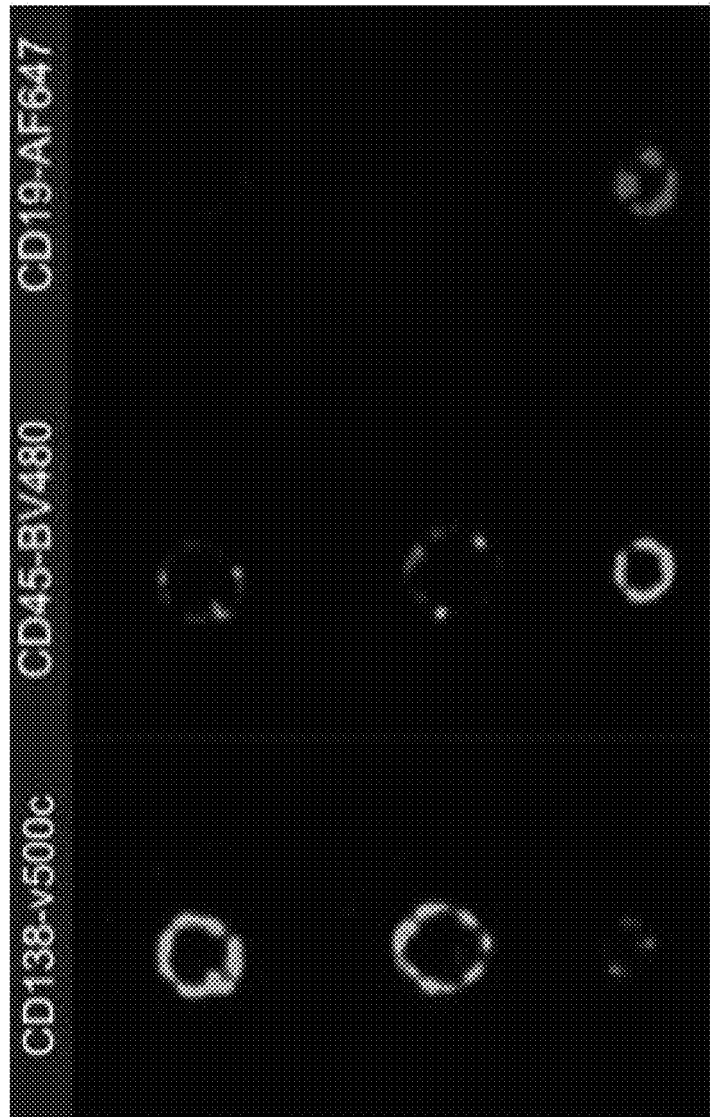
FIG. 4 shows image galleries demonstrating examples of immunophenotyping of a representative plasma cell myeloma bone marrow sample using a method of cell analysis according to a suitable embodiment of the invention. The top and middle cells are CD138-V500c positive, CD45-BV480 negative, CD19-AF647 negative plasma myeloma cells and the bottom cell is a CD138-V500c negative, CD45-BV480 positive, CD19-AF647 positive normal plasma cell. Abbreviations: AF—Alexa Fluor, FVD—Fixable viability dye.

AF647—Alexa Fluor 647 fluorophore, BB515—Brilliant Blue 515 fluorophore, CLL—chronic lymphocytic leukaemia, PBMC—peripheral blood mononuclear cells, CEP—chromosome enumeration probe, FMO—fluorescence minus one In an illustrative form of the invention, the step of antibody staining of cellular markers (immunophenotyping) comprises the steps of:

a. Staining nucleated cells with an immunophenotyping antibody cocktail containing:
  i. AF647 conjugated mouse anti-human CD3 (clone SK7, Australian Biosearch), BD Horizon BB515 conjugated CD5 (clone UCHTC2, BD Biosciences), and BD Horizon BV480 conjugated mouse anti-human CD19 (clone SJ25C1, BD Biosciences) for CLL assessment (FIG. 2, Table 3a); or
  ii. BD Horizon V500c conjugated mouse anti-human CD3 (clone SK7, BD Biosciences), AF647 conjugated CD5 (clone UCHTC2, Australian Biosearch), and BD Horizon BV480 conjugated mouse anti-human CD19 (clone SJ25C1, BD Biosciences) for CLL assessment (Table 3a); or
  iii. BD Horizon BB700 conjugated mouse anti-human CD22 (clone HIB22, BD Biosciences), BV421 conjugated mouse anti-human CD34 (clone 581, BD Biosciences), V500c conjugated mouse anti-human CD45 (clone 2D1, BD Biosciences), BV605 conjugated mouse anti-human CD10 (clone HI10A, BD Biosciences), AF647 conjugated CD19 (clone HIB19, Australian Biosearch), and Fixable Viability Dye eFluor780 (ThermoFisher Scientific) for Acute Lymphoblastic Leukaemia assessment (FIG. 3, Table 3b); or
  iv. BD Horizon BV480 conjugated mouse anti-human CD38 (clone HIT2, BD Biosciences), V500c conjugated mouse anti-human CD138 (clone MI15, BD Biosciences), BV605 conjugated mouse anti-human CD45 (clone HI30, BD Biosciences), AF647 conjugated CD19 (clone HIB19, Australian Biosearch), and Fixable Viability Dye eFluor780 (ThermoFisher Scientific) for Multiple Myeloma assessment (FIG. 4, Table 3b); or
  v. Appropriate isotypic control as per manufacturers recommendations (Table 3);
b. Incubating $5 \times 10^6$ cells for 30 min at 4° C.;
c. Washing cells with PBS/2% FBS; and
d. Centrifuging cells at 950 g for 3 min.

TABLE 3a

Examples of immuno-flowFISH immunophenotype-genotype (chromosome) panels for CLL detection on AMNIS ImageStreamX mark II.

| | AMNIS ISX | Emission | | CLL biomarker | | | |
|---|---|---|---|---|---|---|---|
| Excitation laser (nm) | MKII channel * | wavelength (nm) | Fluorophore | Trisomy 12 panel 1 | Trisomy 12 panel 2 | Del(17p) panel 1 | Del(17p) panel 2 |
| N/A | Ch01 | BF | N/A | Cell morphology | Cell morphology | Cell morphology | Cell morphology |
| 488 | Ch02 | 480-560 | BB515, SG | CD5-BB515** | CEP12-SG | CD5-BB515 | CEP17-SG |
| 488/561/592 | Ch03 | 560-595 | SO, OR | CEP12-SO | | 17p12-OR | 17p12-OR |
| 488/561/592 | Ch05 | 640-745 | SYTOX AAD | Nuclear DNA | Nuclear DNA | Nuclear DNA | Nuclear DNA |
| 405 | Ch07 | 430-505 | BV480 | CD19** | CD19** | CD19** | CD19** |
| 405 | Ch08 | 505-570 | V500c | | CD3** | | CD3** |
| 647 | Ch11 | 640-745 | AF647 | CD3** | CD5** | CD3** | CD5** |

* Only channels relevant to the fluorophores tested are listed.

**CD3 clone SK7, CD5 clone UCHTC2, CD19 clone SJ25C1.

Abbreviations: AF647—Alexa Fluor 647 fluorophore, BF—Brightfield, BB515—Brilliant Blue 515 fluorophore, BV480—Brilliant Violet 480 fluorophore, CEP—Chromosome enumeration probe, Ch—Channel, Del—Deletion, SG—SpectrumGreen, SO—SpectrumOrange, OR—OrangeRed TABLE 3b Examples of immuno-flowFISH immunophenotype-genotype (chromosome) panels for ALL and plasma cell myeloma (Myeloma) detection on AMNIS ImageStreamX mark II.

| Excitation laser (nm) | AMNIS ISX MKII channel * | Emission wavelength (nm) | Fluorophore | Biomarker | | | |
|---|---|---|---|---|---|---|---|
| | | | | ALL panel | Myeloma 1 | Myeloma 2 | Myeloma 3 |
| N/A | Ch01 | BF | N/A | Cell morphology | Cell morphology | Cell morphology | Cell morphology |
| 488 | Ch02 | 480-560 | BB515 or SG | ETV6-SG | IGH-G | IGH-G | IGH-G |
| 488/561/592 | Ch03 | 560-595 | SO, OR | RUNX1-SO | | | |
| 488/561/592 | Ch04 | 595-642 | SYTO80, R | Nuclear DNA | MYEOV-R | FGFR3-R | CCND1-R |
| 488/561/592 | Ch05 | 640-745 | SYTOX AAD, BB700 | CD22-BB700 | Nuclear DNA | Nuclear DNA | Nuclear DNA |
| 405 | Ch07 | 430-505 | BV421, BV480 | CD34-BV421 | CD38-BV480 | CD38-BV480 | CD38-BV480 |
| 405 | Ch08 | 505-570 | V500C | CD45 | CD138 | CD138 | CD138 |
| 405 | Ch10 | 595-642 | BV605 | CD10 | CD45 | CD45 | CD45 |
| 647 | Ch11 | 640-745 | AF647 | CD19 | CD19 | CD19 | CD19 |
| 647 | Ch12 | 745-780 | eFluor780 | Fixable Viability Dye | Fixable Viability Dye | Fixable Viability Dye | Fixable Viability Dye |

* Only channels relevant to the fluorophores tested are listed.
Abbreviations: AF647—Alexa Fluor 647 fluorophore, ALL—Acute Lymphoblastic Leukaemia, BF—Brightfield, BB515—Brilliant Blue 515 fluorophore, BB700—Brilliant Blue 700 fluorophore, BV421—Brilliant Violet 421 fluorophore, BV480—Brilliant Violet 480 fluorophore, Ch—Channel, G—Green fluorophore, R—Red fluorophore, SG—SpectrumGreen, SO—SpectrumOrange To improve the stability of fluorophore-conjugated antibody binding to cellular antigens during acid denaturation, cells are incubated for 30 min in 1 mM bis(sulfosuccinimidyl)suberate (BS3) in MilliQ water, an amine-to-amine cross-linking agent (Thermo Scientific, Sydney, Australia) at 4° C., as per manufacturer's recommendations, before quenching in 5 volumes of 100 mM Tris-HCL pH7.4/150 mM NaCl for 20 min at 4° C.

Fixation and Permeabilisation

In an illustrative form of the invention the fixation step comprises:
 a. Adding fresh 4% formaldehyde with 0.1% Tween20 to the cell solution and mixing by gentle aspiration; and
 b. Incubating the cell solution for 10 min at RT to fix cell proteins and permeabilise the cell membrane.

In an alternate form of the invention step (a) may include 1-4.2% formaldehyde fixation and 0.05-2.5% Tween 20, where the optimum amount of formaldehyde is 4% and Tween20 is 0.05 to 0.1%.

Formaldehyde is a common fixative used in flow cytometry which cross-links cellular proteins and anchors soluble proteins to the cytoskeleton to preserve cell structure. Formaldehyde fixation maintains cell morphology and enables robust FISH signals. In an alternative form alcohols can be used to fix cells by protein precipitation/denaturation and can be used in combination with acetic acid (e.g. Carnoy's fixative) to better preserve morphology and DNA integrity. Whilst Carnoy's fixative is routinely used for slide FISH related protocols it cannot be used in this protocol as it damages most commercial fluorophores resulting in a loss of fluorescence and immunophenotyping during the fixation step. The inventors have identified that whilst methanol based fixation provided adequate fixation of cells, formaldehyde fixation is preferable in the immuno-flowFISH protocol with methanol free formaldehyde providing optimal results.

This step also facilitates sufficient permeabilisation of intact cells (permitting probes to access the nucleus). That is cell permeabilisation can be achieved when formaldehyde is used in combination with plasma membrane solubilising reagents such as non-ionic detergents (e.g. Tween20). There are however a variety of permeabilisation kits and protocols available for flow cytometry. The applied method usually depends upon the cell type under investigation and subsequent analysis, e.g. intracellular staining of cytokines or nuclear membrane proteins. For example, Saponin selectively removes membrane cholesterol resulting in holes in the cell membrane however many cell types are resistant to saponin activity. TritonX-100 is another example of a widely used non-ionic surfactant for cell permeabilisation protocols however this is a fast acting "strong" detergent that rapidly disrupts the cell membrane and has been seen to reduce subsequent nucleic acid fluorescent analysis after incubations as short as 10 minutes (Amidzadeh Z, Behbahani A B, Erfani N, et al. Assessment of different permeabilization methods of minimizing damage to the adherent cells for detection of intracellular RNA by flow cytometry. Avicenna J Med Biotechnol. 2014; 6 (1): 38-46). Tween20 (preferred in the present protocol) is a more hydrophilic non-ionic detergent, and therefore a weaker dissociating agent that permeabilises cell membranes more slowly and gently. An advantage of using a weak surfactant like Tween20 is that small variations in chemical purity are less likely to affect its action when compared to a fast acting agent such as TritonX-100, resulting in more reproducible results if different batches of detergents are used in the course of experiments or between diagnostic laboratories. In addition, it has been seen to have similar cell membrane effects across a range of cell types (e.g. peripheral blood cells, splenocytes and a number of tissue culture cell lines), reducing the likelihood of reagent induced changes within cells during immuno-flowFISH analysis.

In the exemplified protocol, the inventors use 0.1% Tween20. This creates pores in the cell membrane large enough for FISH probe to enter the cell without compromising cell membrane integrity as seen with other hybridisation studies. A 0.1% solution of Tween 20 is also well below the concentration that leads to cell membrane disruption and subsequent high cell loss during acid denaturation and hybridisation.

Following the above step cells are washed with PBS/2% FBS. They may also be centrifuged at 950 g for 3 min prior to acid denaturation (next step).

Optional: Samples may be resuspended in a phosphate buffered saline with foetal calf/bovine serum for storage at 4° C. for 3-5 days following fixation during which time they may be transported or "batched" with other samples prior to hybridisation and analysis.

DNA Denaturation and FISH Probe Hybridisation Conditions

In an illustrative form of the invention, the step of denaturing DNA and FISH probe hybridising comprises:
a. Denaturing DNA with 0.5M-1M (Preferably 0.5M HCl) hydrochloric acid (37% AnalaR, SG1.18, Normapur, VWR Sydney, Australia) for 20 min at RT;
b. Quenching in ice-cold PBS;
c. Centrifuging and resuspending cells in PBS/1% BSA to block non-specific probe binding;
d. Centrifuging cells again;
e. Resuspending cells in 0.1% Igepal CA-630 (Sigma-Aldrich, Sydney, Australia) in 2× standard sodium citrate (SSC) buffer (1:20 dilution in MilliQ water from 20×SSC stock of 3M sodium chloride and 0.3M sodium citrate in MilliQ water at pH7);
f. Transferring cells to 0.2 ml maximum recovery PCR tubes (Axygen, California, USA);
g. Centrifuging at 950 g;
h. Carefully removing all supernatant by pipette; and
i. Resuspending cells in hybridisation buffer (7 µL) with MilliQ water (2 µL) and 1 µL FISH probe for single FISH probe analysis, or, for dual FISH probe analysis, resuspending cells hybridisation buffer (7 µL) with MilliQ water (1 µL) and 1 µL of each FISH probe (2 µL total probe).

Figure 5:
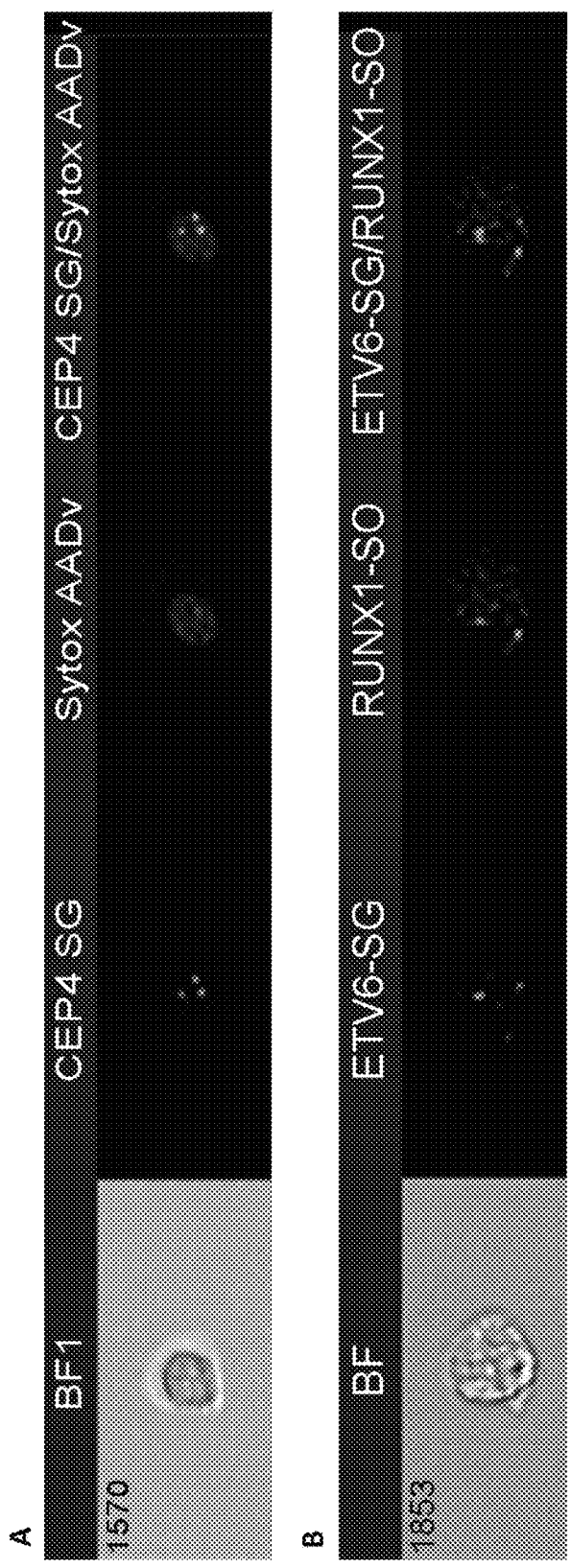
FIG. 5 demonstrating assessment of Acute Lymphoblastic Leukaemia (ALL) bone marrow samples using a method of cell analysis according to a suitable embodiment of the invention. (A) Cell 1570 has 3 copies of chromosome 4 or trisomy 4 (green spots). Trisomy is confirmed by co-localisation analysis with the SYTOX AADvanced nuclear stain.

Probes analysed may include Vysis CEP12-SpectrumOrange, Vysis CEP12-SpectrumGreen, Vysis CEP1-SpectrumOrange probes and Vysis CEP4-SpectrumGreen (Abbott Molecular, Sydney, Australia) or Vysis ETV6-RUNX1 translocation probe (Abbott Molecular) (FIG. 5) or SureFISH 17p12 PMP22-OrangeRed 458 kb locus specific probe (Agilent Technologies).

Suitable CEP probes are incubated with a Vysis CEP (VCEP) hybridisation buffer that is 55% formamide and 10% dextran sulphate in 1×SSC or an in-house FISH hybridisation buffer of 50% formamide, 10% dextran sulphate, 0.1% Tween20 in 2×SSC unless otherwise stated.

Pre-hybridisation treatments are sometimes required to enable the cell nucleus/chromatin labile for denaturation particularly in whole intact cells. Optimal denaturation and hybridisation conditions can vary by cell type due to differences in chromatin structure (e.g. granulocytes require higher temperatures than lymphocytes). Chemical (e.g. hydrochloric acid) or enzymatic treatment (e.g. pepsin or proteinase K) can be used for permeabilisation and the removal of histone proteins, which stabilise chromatin in the nucleus. Acids and bases also disrupt hydrogen bonds, which are involved in the base pairing of double stranded DNA similar to heating or solvent denaturation. Proteinase K is a highly active endopeptidase that activates endogenous nucleases and was not found to improve hybridisation in the example method due to reduced nuclease activity post fixation.

In the development of this protocol the inventors identified that acid treatment of peripheral blood nucleated cells with 0.5-1M HCl was optimal for subsequent FISH, in that most histones are soluble in 0.1N hydrochloric acid. Removal of histones with high ionic strength buffers (e.g. 2M NaCl) was not analysed as this type of extraction of histones causes extensive nuclear aggregation and poor FISH analysis.

The manufacturers recommend a minimum of 6-8 hours for the FISH probes to bind the target DNA, with some probes requiring overnight (16 hour) incubation. This protocol tested hybridisation times from 8-30 hours at 37° C. to determine the optimal range of incubation times that would be convenient in a diagnostic setting. Longer hybridisation times are preferably avoided as background non-specific probe binding increases and immunophenotypic staining fluorescence decreases. Inclusion of the non-ionic non-denaturing detergent such as Igepal CA-630, or the chemical equivalent Nonidet P-40, to stringency washes increases the subsequent probe spot enumeration. However Igepal is preferably used at low concentration ($0.3%) for less than 10 minutes as high concentration and extended incubations may disrupt membrane proteins such as the cell surface markers used for immunophenotyping (Amidzadeh Z, Behbahani AB, Erfani N, et al. Assessment of different permeabilization methods of minimizing damage to the adherent cells for detection of intracellular RNA by flow cytometry. Avicenna J Med Biotechnol. 2014; 6 (1): 38-46). NP-40 (Tergitol-type NP-40) is preferably not used as this detergent has a high hydrophilic-lipophilic balance (HLB) and will break down both the cytoplasmic and nuclear membranes. In addition to stringency wash buffers, hybridisation conditions such as reaction volume, concentration of formamide and dextran sulfate in the hybridisation buffer, and use of protein lo-bind reaction tubes are also critical. Thus, tubes and volumes are preferably used as described in the protocol.

Commercial FISH probes are produced with a range of fluorescent conjugates or "colours" to provide multiple probe analysis capability within a sample. Multiple probes may be used to determine cytogenetic status of a malignancy subtype e.g. the Vysis CLL FISH Probe Kit (Abbott Molecular) combines up to three probes conjugated with SpectrumOrange, SpectrumGreen and SpectrumAqua fluorophores to determine the 13q-, +12, or normal genotype CLL group versus the 11q- or 17p-poor prognosis group. Alternatively, a deletion probe (del17p) may be combined with a chromosome enumeration probe (CEP17) to confirm deletion of a specific locus on a chromosome as opposed to false positive "loss" where a whole chromosome is lost or inadequately probed due to processing error. This protocol has been shown to accurately enumerate both SpectrumOrange and SpectrumGreen conjugated probes as well as dual probed samples.

The variable chemistry of proprietary FISH fluorophores from commercial companies is both a strength and limitation of the protocol. Traditionally FISH probes are in the shorter wavelength high energy emission range of 450-550 nm such as Abbott Molecular Vysis SpectrumGreen, Agilent OrangeRed and Kreatech SpectrumBright 495 fluorophores. This provides benefit to the example method in that probe spot analysis in that wavelength range should result in sharp clearly defined spots ideal for enumeration. However, this is also the range where the majority of PBMC endogenous and treatment induced autofluorescence occurs. For large probes with resulting higher numbers of bound fluorophore (e.g. CEP probe) the spot fluorescence is still brighter than background however probes that are smaller than 200 kb in length, such as the locus specific deletion probes have lower fluorescence which may fall below the limit of detection of the analysis software. The AMNIS ISXmkII utilises time-delay integration to collect fluorescence measurements which essentially collects and accumulates all fluorescence emitted by the cells as they pass in front of the detection camera boosting dim signals (Ortyn W E, Hall B E, George T C, Frost K, Basiji D A, Perry D J, Zimmerman C A, Coder D, Morrissey P J. Sensitivity measurement and compensation in spectral imaging. Cytometry Part A 2006; 69 (8):

852-62). However there is still a signal resolution threshold below which some small locus specific probes may fall resulting in poor spot detection and enumeration. It is anticipated that improvements in hardware in the next generation of instruments currently under development will reduce the impact of this limitation. In the meantime the release of probe reporter amplification kits such as QuantiGene or PrimeFlow by Affymetrix that boost the fluorescent probe signal seen with small RNA probes could be explored for DNA probe compatibility if smaller probes are essential for the desired application.

In the illustrative example of the invention, SureFISH 17p12 PMP22 probe is incubated with SureFISH hybridisation buffer (SFHB) which is a 50-75% formamide in 5-10% sodium chloride solution provided by Agilent Technologies unless otherwise stated. According to this example probe hybridising comprises:
  a. Heating cells to 73° C. to 76° C. (preferably 73° C. to 74° C.) for 5 min to denature DNA and ensure specific probe annealing;
  b. Hybridising at 37° C. in an automated thermocycler for 16 to 30 hours (preferably 16 to 20 hours);
  c. Washing cells in a stringency solution composed of 0.1% Igepal in 2×SSC;
  d. Transferring cells into Clearview lo-bind microfuge tubes (Sigma, Sydney, Australia).
  e. Washing cells in a stringency solution composed of 0.3% Igepal 2-0.4×SSC (preferably 0.3% Igepal 0.4× SSC) for 5 min at 42° C.;
  f. Washing cells in PBS/2% FBS; and
  g. Resuspending and staining cells with SYTOX® AADvanced nuclear DNA stain (0.2 µM in PBS, Thermo Fisher Scientific) for 30 min at RT.

These steps preferably include acid denaturation as well as high temperature incubations for DNA hybridisation which are known to affect fluorophore performance. Initial immunophenotyping panel design included the large protein-based molecule allophycocyanin (APC), one of the brightest probes currently used in most immunofluorescence experiments and its analogue AF647 which has been chemically modified to enhance photostability. Surprisingly APC fluorescence was lost during hybridisation and whilst AF647 fluorescence was significantly reduced, positive cells were still distinguishable from the unstained population, possibly due to the chemical modification this molecule has undergone. The newer polymer dyes Brilliant Violet (BV) and Brilliant Blue (BB) were found to be the most stable throughout the protocol with a slight loss of fluorescence but still maintaining brighter fluorescence than APC and AF647. This finding was in keeping with published data on the thermal resistance and ability to maintain fluorescence in stringent conditions seen with BV and BB fluorophores in telomere flowFISH analysis. The BV and BB molecules, known as p-conjugated polymers (found in OLEDs and photovoltaics), have a synthetically tuneable network of p-orbitals that allows for electron delocalisation, a large absorption wavelength range, and efficient fluorescence. However, unlike organic dye molecules (e.g. phycoerythrin or PE), the backbone structure of conjugated polymers allows for delocalisation to occur over many repeat units in the polymer chain, leading to high molecular extinction coefficients, a high quantum efficiency and presumably results in the stable fluorescence seen during FISH. These fluorophores have also been found to be stable in antibody "cocktail" mixtures in diagnostic laboratories when stored for extended time periods at 4° C. as well as co-culture assays, in which the conjugated antibody is cultured with cells for 3-24 hours and exposed to potential enzymatic cleavage. Another fluorophore that performed well in the example method was the coumarin dye V500 and the V500c conjugation which showed a reduction but still maintained fluorescence intensity during the example method analysis. This is in keeping with previously published studies on the stability of V500 that found fluorescence intensity decreases as acidity increases but was maintained during cell stimulation, fixation and permeabilisation. Although the quantum efficiency of V500 is significantly lower than PE or the Brilliant polymer dyes, their smaller size results in 50 times more molecules conjugating to immunophenotyping antibodies than PE, which may offset the loss of some fluorescence during processing. Cross-linking of cell surface proteins is commonly used to stabilise protein: protein complexes. Using a similar principle we analysed BS3, a membrane-impermeable N-hydroxysuccinimide (NHS) ester that cross-links the primary amines usually found on the outwardly facing surface of proteins without denaturing the protein. It is critical to perform immunophenotyping at the start of the protocol as staining after acid denaturation or hybridisation has been shown to result in high levels of non-specific antibody binding.

Imaging Flow Cytometry

Following the DNA and FISH probe hybridisation, the samples are analysed using imaging flow cytometry. Preferably this involves:
  a. Performing imaging flow cytometry on the cell suspension using an Amnis ImageStreamX markII ISXmkII, with INSPIRE v4.1 acquisition software (Amnis, Seattle, USA).

Excitation lasers suitable for analysis may include 100 mW 405 nm, 50 mW 488 nm, 150 mW 561 nm, 150 mW 592 nm and 120 mW 642 nm.

In an illustrative form of the invention, the imaging flow cytometry on the cell suspension comprises:
  a. Using a 1.5 mW 785 nm laser to provide a scatter signal and measurement of SpeedBeads for internal calibration;
  b. Exciting BD Horizon BV480 by the 405 nm laser, and capturing emission in the wavelength range 430-505 nm (Ch07);
  c. Exciting BD Horizon BB515 and SpectrumGreen by the 488 nm laser, and capturing emission in the range 480-560 nm (Ch02);
  d. Exciting SYTOX AADvanced DNA stain by the 488 nm laser, and capturing emission in the range 660-740 nm (Ch05);
  e. Exciting Biolegend AF647 by the 642 nm laser, and capturing emission in the wavelength range 640-745 nm (Ch11); and
  f. Exciting Vysis SpectrumOrange conjugated chromosome 12 enumeration probe and SureFISH del17p PMP-OrangeRed probe by the 561 nm or 592 nm laser, and capturing emission in the range 560-595 nm (Ch03).

All images are captured with the 60× objective using extended depth of field (EDF) imaging which uses specialised optics and image processing to extend the in-focus range from 4-16 microns.

In an illustrative form of the invention, data are acquired using imaging flow cytometry that further comprises the steps of:
  a. Identifying cells in a scatter plot of the Aspect Ratio versus brightfield Area (Ch01), and recording approximately 10,000-20,000 cells per sample; and b. Analysing single stained compensation standard controls (e.g. Simply Cellular anti-mouse compensation standard controls, Bangs Laboratories Inc., Indiana, USA) and SYTOX AADvanced stained cells using identical laser settings in the absence of brightfield and 785 nm laser illumination, and calculating a compensation matrix using INSPIRE v4.1 software (Amnis).

Ideally, a minimum of 1,000 compensation particles or SYTOX AADvanced stained cells are recorded per control sample.

IDEAS Analysis

Preferably the example step of analysing data involves performing Immuno-flowFISH data analysis using IDEAS v6.0 image analysis software (Amnis) using compensated data. Analysing data comprises:

a. Selecting focused images using the Gradient RMS feature which measures the sharpness quality of an image by detecting large changes of pixel values in the image, the Gradient RMS feature being computed using the average gradient of a pixel normalised for variations in intensity levels where cells with better focus have higher Gradient RMS values;

b. Identifying single cells in a scatter plot of the Aspect Ratio versus brightfield Area, the Aspect Ratio being the Minor Axis of the object or cell divided by the Major Axis and describing how round or oblong an object is, with single nucleated cells having a high Aspect Ratio and low Area value;

c. Identifying nucleated non-dividing cells in a SYTOX AADvanced fluorescence intensity histogram by excluding cells with high fluorescence intensity (dividing cells);

d. Gating populations of interest based on the fluorescence intensity of CD19-BV480 (normal and neoplastic B-lymphocytes), CD5-BB515 (neoplastic B- and normal T-lymphocytes) and CD3-AF647 (normal T-Lymphocytes);

e. Determining co-localisation of CEP12 FISH probe signal (SpectrumOrange fluorescence) with the nuclear stain (SYTOX AADvanced fluorescence) using the Similarity Feature, this feature being a measure of the degree to which two images are linearly correlated within a masked region, whereby FISH probe signals within the nucleus have a high similarity score whilst non-specific probe hybridised to DNA from disrupted cells adhered to the cell membrane have a low similarity score;

f. Using the Spot Count Feature to count the number of CEP12 FISH probe (Ch03) spots per cell using a Peak, Spot or Intensity mask (Table 4), wherein the Spot Count Feature algorithm examines the connectivity of each pixel based on whether it is connected to a particular spot or the background, the bright Peak mask option obtains bright regions from an image regardless of the intensity differences from one spot to another, and the spot to cell background ratio is the spot pixel value divided by the mean background value in the bright detail image; and g. Further quantitatively verifying software generated spot counts by single parameter histograms comparing the measured fluorescence intensity of FISH signals for each of the spot count populations (i.e. 1-spot versus 2-spot versus 3-spot), wherein changes in measured fluorescence intensity correspond to the number of hybridised probes, allowing correcting of overlapping signals (i.e. 2-spots that appear as 1-spot) inherent in 2-dimensional image projections to determine the true number of specific FISH spots and reliable distinction of monosomy and disomy subpopulations (Minderman H, Humphrey K, Arcadi J K, et al. Image Cytometry-Based Detection of Aneuploidy by Fluorescence In Situ Hybridization in Suspension. Cytometry Part A 2012; 81A: 776-784).

h. Further calculating a spot count ratio from the mean spot counts per cell where the total number of spots is normalised to phenotypic subpopulation size. Spot count ratio=Mean spot count neoplastic cells/Mean spot count normal cells. e.g. CD19+ CD5+ CLL/CD3+ C5+ T-cells: del(17p)<2, trisomy 12>2 ratios.

TABLE 4

Validation of masks for use with Spot Count Feature to count the number of chromosome 17 (CEP17) FISH probe (Ch02) spots in a representative healthy blood sample.

| Mask | Spots (mean fluorescence intensity adjusted) | | |
| --- | --- | --- | --- |
| | 1 | 2 | 3 |
| Peak | 1% | 94% | 5% |
| Intensity | 1% | 94% | 5% |
| Spot | 0.5% | 98% | 2% |

In other suitable example methods:

a. Methanol fix buffer (70% methanol/4% formaldehyde/5% acetic acid) may be substituted for 4% formaldehyde with 0.1% Tween20 fixative in the above protocol.

b. Hybridisation variations may include pre-treatment with 0.1 ug/ml proteinase K and alternate DMSO, formamide or ethylene carbonate based hybridisation buffers: 15% DMSO, 35% formamide, 10% dextran sulphate, 0.1% Tween20, 2×SSC; 5% DMSO, 45% formamide, 10% dextran sulphate, 0.1% Tween20, 2×SSC; 5% DMSO, 10% dextran sulphate, 0.1% Tween20, 2×SSC; 10% DMSO, 10% dextran sulphate, 0.1% Tween20, 2×SSC; 15% DMSO, 10% dextran sulphate, 0.1% Tween20, 2×SSC; 15% formamide, 10% dextran, 0.1% Tween20, 2×SSC; 15% formamide, 20% dextran, 0.1% Tween20, 4×SSC; 50% formamide, 10% dextran, 0.1% Tween20, 2×SSC; or 15% ethylene carbonate, 20% dextran, 0.1% Tw20, 2×SSC.

c. An alternate post-hybridisation second stringency wash buffers of 0.3% Igepal in 0.1×SSC may be used.

d. To determine whether variation in positivity is due to epitope or fluorophore stability, one may analyse anti-CD3 antibody clone SK7 conjugated with either BD Horizon BB515 (BD Biosciences) or AF647 (Australian Biosearch), anti-CD5 antibody clone UCTHC2 conjugated with either BD Horizon BB515 (BD Biosciences) or AF647 (Australian Biosearch) and anti-CD19 antibody clone HIB19 conjugated with either BD Horizon BV480 (BD Biosciences), BD Horizon BB515 (BD Biosciences) or AF647 (BD Biosciences).

e. Alternative DNA markers may include Hoechst 33342 (BD Biosciences) and DRAQ7 (BioLegend).

The following results discuss development testing and performance of the example protocol. In particular the protocol was performed with chromosome 1 enumeration probe (CEP1), which hybridises to highly repetitive human satellite DNA sequences located near the centromere, on healthy donor peripheral blood nucleated cells.

The results serve to further illustrate the present invention, and should not be construed as limiting.

Example Results

The first fixative tested in the protocol was a methanol based buffer of 70% methanol/4% formaldehyde/5% acetic acid, which was a combination of the Carnoy's fixative used for traditional FISH and FISH-IS (as, for example, described in Minderman H, Humphrey K, Arcadi J K, et al. Image Cytometry-Based Detection of Aneuploidy by Fluorescence In Situ Hybridization in Suspension. Cytometry Part A 2012; 81A: 776-784) and the 4% formaldehyde fixative used in the immuno-S-FISH protocol (as, for example, described in K. Fuller, S. Bennett, H. Hui, A. Chakera and W. Erber. Development of a robust immuno-S-FISH protocol using imaging flow cytometry. Cytometry Part A. 2016; 89A: 720-730).

Experiments were performed with CD3-BB515 immuno-phenotyping (FIG. 6) and chromosome 1 or 12 enumeration probe (CEP1 or CEP12), which hybridise to highly repetitive human satellite DNA sequences located near the centromere of the chromosome, on healthy donor nucleated cells. FISH was expected to result in 1-2 probe spots per cell.

Methanol fix buffer was tested with a DNA denaturation temperature of 80° C. or 73° C. as recommended by the manufacturer (Abbott Molecular) resulting in 1-2 CEP1 FISH probe spot counts seen in 53% and 59% of cells respectively (Table 5). Higher levels of DNA degradation were seen at 80° C. as determined by an increase in the number of cells with 3 or more probe spots and visual inspection of the cell morphology (Brightfield channel, data not shown). Reducing the denaturation temperature to 66° C. similar to the immuno-S-FISH protocol resulted in nuclear Hoechst staining in only 50% of cells and FISH probe spots in 2% of cells.

TABLE 5

Development and optimisation of Carnoy's based FISH protocols for centromeric FISH probe immuno-flowFISH analysis.

| Fix | Perm | Denaturation | Probe/DNA denature temp (° C.) | Hybridisation buffer | Probe | 0 spot | 1^ spot | 2 spots | 3/3+ spots | Comment |
|---|---|---|---|---|---|---|---|---|---|---|
| 70% MeOH/4% FA/5% AA* | | | 80**** | VCEP | CEP1-SO | 4 | 19 | 34 | 43 | DNA degradation |
| 70% MeOH/4% FA/5% AA* | | | 73**** | VCEP | CEP1-SO | 9 | 23 | 36 | 32 | DNA degradation |
| 70% MeOH/4% FA/5% AA* | | | 66**** | VCEP | CEP1-SO | 98 | 2 | 0 | 0 | No Hoechst nuclear stain in 50% cells |
| 70% MeOH/4% FA/5% AA* | | | 73**** | 15% DMSO, 35% formamide, 10% dextran, 0.1% Tw20, 2 × SSC | CEP1-SO | 12.2 | 31 | 27 | 23 | DNA degradation |
| 70% MeOH/4% FA/5% AA* | | | 66**** | 15% DMSO, 35% formamide, 10% dextran, 0.1% Tw20, 2 × SSC | CEP1-SO | 42 | 26 | 22 | 8 | |
| 70% MeOH/4% FA/5% AA* | | | 73**** | 5% DMSO, 45% formamide, 10% dextran, 0.1% Tw20, 2 × SSC | CEP1-SO | 11 | 26 | 34 | 29 | DNA degradation |
| 70% MeOH/4% FA/5% AA* | | | 73**** | 5% DMSO, 10% dextran, 0.1% Tw20, 2 × SSC | CEP1-SO | 25 | 13 | 11 | 51 | No formamide in hybridisation buffer |
| 70% MeOH/4% FA/5% AA* | | | 66**** | 5% DMSO, 10% dextran, 0.1% Tw20, 2 × SSC | CEP1-SO | 36 | 18 | 10 | 25 | No formamide in hybridisation buffer |
| 70% MeOH/4% FA/5% AA* | | | 66**** | 10% DMSO, 10% DS, 0.1% Tw20, 2 × SSC | CEP1-SO | 56 | 17 | 9 | 18 | No formamide in hybridisation buffer, majority of cells without FISH signal |
| 70% MeOH/4% FA/5% AA* | | | 73**** | 15% DMSO, 10% DS, 0.1% Tw20, 2 × SSC | CEP1-SO | 59 | 16 | 9 | 16 | No formamide in hybridisation buffer, majority of cells without FISH signal |
| 70% MeOH/4% FA/5% AA* | | | 66**** | 15% DMSO, 10% DS, 0.1% Tw20, 2 × SSC | CEP1-SO | 63 | 13 | 7.3 | 16 | No formamide in hybridisation buffer, majority of cells without FISH signal |
| 70% MeOH/4% FA/5% AA* | | | 73**** | 15% FM, 10% DS, 0.1% Tw20, 2 × SSC | CEP1-SO | 98 | 2 | 0 | 0 | Reduced formamide in hybridisation buffer, majority of cells without FISH signal |
| 70% MeOH/4% FA/5% AA* | | | 73**** | 15% FM, 20% DS, 0.1% Tw20, 4 × SSC | CEP1-SO | 7 | 11 | 14 | 67 | High levels of non-specific FISH signals with increased dextran sulphate |
| 70% MeOH/4% FA/5% AA* | | | 73**** | 50% FM, 10% DS, 0.1% Tw20, 2 × SSC | CEP1-SO | 23 | 27 | 24 | 26 | FISH signals and spot counts stronger than 15% formamide |
| 70% MeOH/4% FA/5% AA* | 1M HCl** | | 73**** | 50% FM, 10% DS, 0.1% Tw20, 2 × SSC | CEP1-SO | 0 | 20 | 74 | 5 1.3 | Bright Hoechst staining, clearly defined probe spots |
| 70% MeOH/4% FA/5% AA* | 0.1 ug/ml PK pre-treat*** 1M HCl** | | 73**** | 50% FM, 10% DS, 0.1% Tw20, 2 × SSC | CEP1-SO | 0 | 22 | 61 | 10 5 | High cell loss, clearly defined probe spots and FISH signals |

TABLE 5-continued

Development and optimisation of Carnoy's based FISH protocols for centromeric FISH probe immuno-flowFISH analysis.

| Fix | Perm | Denaturation | Probe/DNA denature temp (° C.) | Hybridisation buffer | Probe | 0 spot | 1^ spot | 2 spots | 3/3+ spots | Comment |
|---|---|---|---|---|---|---|---|---|---|---|
| 70% MeOH/4% FA/5% AA* | 1M HCl** | 73**** | 15% EC, 20% DS, 0.1% Tw20, 2 × SSC | CEP1-SO | 5 | 19 | 28 | 24 24 | 3 hr hybridisation, heterogeneous; sporadic; scattered (non-specific) signals |
| 70% MeOH/4% FA/5% AA* | 1M HCl** | 73**** | 15% EC, 20% DS, 0.1% Tw20, 2 × SSC | CEP1-SO | 7 | 22 | 32 | 23 16 | 24 hr hybridisation, heterogeneous; sporadic; scattered (non-specific) signals |

Abbreviations: AA—acetic acid, CEP—chromosome enumeration probe, DS—dextran sulphate, DMSO—Dimethyl sulfoxide, EC—ethylene carbonate, FA—formaldehyde, FM—formamide, HCl—hydrochloric acid, MeOH—Methanol, PK—Proteinase K, SSC—sodium citrate, SO—SpectrumOrange, VCEP—Vysis Chromosome Enumeration Probe hybridisation buffer
*10 mins at 4° C.
**20 mins at room temperature
***10 mins at 37° C.
****5 mins heat denaturation and 16-24 hrs hybridisation at 37° C.
^1 or 2 spot counts unverified by MFI calculation
AA—acetic acid, CEP—chromosome enumeration probe, DMSO—dimethyl sulfoxide, FA—formaldehyde, HCl—hydrochloric acid, M—Molar, MeOH—methanol, SO—SpectrumOrange, SSC—standard sodium citrate buffer, Tw20—Tween20, VCEP—Vysis CEP hybridisation buffer provided by Abbott Molecular with CEP probes AA—acetic acid, CEP—chromosome enumeration probe, DMSO—dimethyl sulfoxide, FA—formaldehyde, HCl—hydrochloric acid, M—Molar, MeOH-methanol, SO—SpectrumOrange, SSC—standard sodium citrate buffer, Tw20—Tween20, VCEP—Vysis CEP hybridisation buffer provided by Abbott Molecular with CEP probes The Vysis CEP1 and CEP12 probes were supplied and previously analysed with Vysis CEP (VCEP) hybridisation buffer. A number of hybridisation buffer variations were tested in order to increase hybridisation efficiency (cells with 1-2 probe spots) and reduce the number of cells with zero spots (insufficient DNA denaturation). First 15% DMSO was added to the hybridisation buffer and the formamide concentration reduced to 35% resulting in CEP1 probe counts of 1-2 spots per cell in 58% of cells when DNA was denatured at 73° C. and 48% of cells at 66° C. (Table 5). Hybridisation was improved at both temperatures and there was less DNA degradation than with VCEP buffer. Decreasing the DMSO concentration to 5% and increasing formamide to 45% resulted in 1-2 probe spots in 60% of cells at a DNA denaturation temperature of 73° C., however DNA degradation also increased to 29% of cells. Hybridisation efficiency was also tested with only DMSO (no formamide) in the hybridisation buffer (X % DMSO, 10% dextran, 0.1% Tw20, 2×SSC) at DNA denaturation temperatures of 73° C. and 66° C. Hybridisation buffer with 5% DMSO resulted in 1-2 CEP1 spots in 24% of cells at 73° C. and 28% cells at 66° C., 26% cells with 10% DMSO at 66° C., or 26% cells with 15% DMSO at 73° C. and 20.3% of cells at 66° C. Addition of DMSO alone to the buffer did not sufficiently improve hybridisation. FISH probe spot counts were consistently higher at a denaturation temperature of 73° C. so this DNA temperature was used for subsequent chromosome enumeration probe (CEP) experiments. Analysis of the effect of dextran concentration on hybridisation found that a reduced concentration of formamide (15%) with the standard concentration of 10% dextran sulphate, did not sufficiently denature DNA resulting in probe spots in only 2% of cells. Increasing the concentration of dextran sulphate to 20% and 4×SSC resulted in only 1-2 CEP1 probe spots in 24% of cells. Addition of a 1M hydrochloric acid (HCl) incubation for 5 min at room temperature prior to hybridisation with in-house 50% formamide, 10% dextran sulphate, 0.1% Tween20 in 2×SSC hybridisation buffer increased the number of cells with 1-2 CEP1 probe spots to 94% of cells. Inclusion of a proteinase K (0.1 µg/ml) pre-digestion step for 5 min at 37° C. before 1M HCl denaturation and hybridisation with the in-house 50% formamide, 10% dextran sulphate, 0.1% Tween20 in 2×SSC hybridisation buffer resulted in a slight reduction in 1-2 CEP1 probe spots to 83% of cells (Table 5) however there was considerable cell loss in the samples (data not shown). The final adjustment to the hybridisation buffer was the inclusion of ethylene carbonate which has previously been found to significantly reduce hybridisation time for FISH on slides. Samples were denatured with 1M HCL then co-denatured with CEP1 FISH probe in an ethylene carbonate based buffer at 73° C. for 5 min followed by hybridisation at 37° C. for 3 or 24 hours. After 3 hours 1-2 probe spots were visible in 47% of cells, increasing to 54% of cells at 24 hours. An ethylene carbonate based buffer did not improve hybridisation compared to the in-house 50% formamide, 10% dextran sulphate, 0.1% Tween20 in 2×SSC hybridisation buffer so was not used in further experiments.

The protocol was tested with a 4% formaldehyde in 0.1% Tween20 buffer based on the separate fixative and permeabilising buffers used in the immuno-S-FISH protocol (described in K. Fuller, S. Bennett, H. Hui, A. Chakera and W. Erber. Development of a robust immuno-S-FISH protocol using imaging flow cytometry. Cytometry Part A. 2016; 89A: 720-730). The 4% formaldehyde/0.1% Tween20 buffer permeabilised the cells well as evidenced by bright DRAQ7 staining of the nuclei (data not shown) without compromising the cell membrane resulting in cell loss during subsequent processing (FIG. 7). A 20 min incubation with 1M hydrochloric acid was required with the 4% formaldehyde/0.1% Tween20 buffer to sufficiently denature the DNA for FISH, resulting in 1-2 CEP1 probe spots in 82% of cells and reduced DNA degradation (Table 6). Reducing the denaturation temperature from the manufacturer's recommendation of around 73° C. to 66° C. (similar to the immuno-S-FISH protocol) resulted in a loss of probe hybridisation indicating that 1M HCl treatment alone is insufficient to adequately denature DNA for FISH analysis. Formaldehyde fixation and Tween20 permeabilisation were tested as separate and combined steps to determine the effect on hybridisation efficiency. Samples incubated with 4% formaldehyde for 5 min followed by a 10 min incubation with 0.1% Tween20 demonstrated 1-2 CEP1 probe spots in 87% of cells, combining the 4% formaldehyde and 0.1% Tween20 solutions and incubating for 10 min increased the 1-2 probe spot count to 90% of cells (Table 6). Fixation with 4% formaldehyde with no Tween20 permeabilisation reduced the 1-2 probe spots to 82% of cells. The combined 4% formaldehyde with 0.1% Tween20 buffer was considered optimal for "1 step" fixation/permeabilisation and used for subsequent experiments.

addition, cells were dual probed with CEP1-SO and CEP12-SG probes to confirm that the protocol can be used for multiple probe analysis (FIG. 9).

In addition to enumeration, FISH probes are often designed to detect loss of important genes such as tumour suppressor gene p53 found on the short arm of chromosome 17. These locus specific probes are usually smaller than centromeric probes that results in a "dimmer" signal as there is less fluorescent conjugate present. CLL samples were analysed with SureFISH (SF) del17p PMP locus specific (458 kb) probe to confirm accurate enumeration with smaller FISH probes (Table 7). In healthy control samples denatured at 73° C. with SF del17p probe prepared with the protocol optimised for the CEP probes 59% of cells demonstrated 1-2 probe spots however 24% had no probe spots which may be due to inefficient hybridisation (incorrect denaturation temperature) or small probe dim signals. Increasing the denaturation temperature to 74, 76 or 78° C. reduced the number

TABLE 6

Variations in formaldehyde fixation and Tween 20 permeabilisation during development of the immuno-flowFISH protocol.

| Fixation/permeabilisation (time) | Denature solution | Probe/DNA denature temp (° C.) | Hybridisation buffer | Probe | 0 spot | 1* spot | 2 spots | 3 spots | 3+ spots | Comment |
|---|---|---|---|---|---|---|---|---|---|---|
| 4% FA + 0.1% Tw20 | 1M HCl | 73 | VCEP | CEP1-SO | 0 | 19 | 63 | 9 | 9 | Reduced DNA degradation |
| 4% FA + 0.1% Tw20 | 1M HCl | 66 | VCEP | CEP1-SO | 100 | 0 | 0 | 0 | 0 | |
| 4% FA (5 min), 0.1% Tw20 (10 min) | 1M HCl | 73 | VCEP | CEP1-SO | 1 | 24 | 63 | 9 | 3 | 2 step: fix then permeabilise |
| 4% FA + 0.1% Tw20 (10 min) | 1M HCl | 73 | VCEP | CEP1-SO | 1 | 21 | 69 | 6 | 3 | 1 step: fix and permeabilise |
| 4% FA (10 min) | 1M HCl | 73 | VCEP | CEP1-SO | 2 | 19 | 63 | 8 | 8 | 1 step: fix only |
| 4% FA + 0.1% Tw20 | 4M HCl | 73 | VCEP | CEP1-SO | 20 | 1 | 2 | 4 | 72 | High cell loss |
| 4% FA + 0.1% Tw20 | 2M HCl | 73 | VCEP | CEP1-SO | 32 | 49 | 18 | 1 | 0 | High cell loss |
| 4% FA + 0.1% Tw20 | 1M HCl | 73 | VCEP | CEP1-SO | 0 | 19 | 63 | 9 | 9 | |
| 4% FA + 0.1% Tw20 | 0.5M HCl | 73 | VCEP | CEP1-SO | 0 | 14 | 65 | 19 | 1.7 | Cell loss reduced |
| 4% FA + 0.1% Tw20 | 0.5M HCl | 73 | VCEP | CEP12-SO | 1 | 30 | 60 | 7.5 | 1 | |
| 4% FA + 0.1% Tw20 | 0.5M HCl | 73 | VCEP | CEP12-SG | 1 | 27 | 57 | 13 | 1 | |

*1-spot count not adjusted by MFI to 1 or 2 spots
CEP—chromosome enumeration probe, FA—formaldehyde, HCl—hydrochloric acid, M—Molar, SG—SpectrumGreen, SO—SpectrumOrange, Tw20—Tween20, VCEP—Vysis CEP hybridisation buffer provided by Abbott Molecular with CEP probes Since addition of a 1M HCl incubation increased DNA denaturation and subsequent FISH spot counts varying concentrations of HCl were also tested in the protocol. Increasing the concentration to 2M or 4M resulted in a reduction in cells with 1-2 CEP1 probe spots to 67% and 3% respectively. In addition, the total number of cells in the sample was decreased (data not shown) and the number of cells with 0-1 or 3+ spots increased indicating a higher degree of DNA degradation and cell free DNA from lysed/damaged cells in the samples (Table 6). Reducing the HCL acid concentration to 0.5M did significantly affect the 1-2 probe spot count (79%) compared to a 1M solution (82%) however overall cell loss in the samples was reduced (data not shown). The 0.5M HCl acid denaturation was considered optimal for fixation and used for subsequent experiments.

Commercial FISH probes were produced with a range of fluorescent conjugates. Donor and CLL patient cells were split into two aliquots and hybridised with Vysis CEP12 probe conjugated with SpectrumOrange (SO) or SpectrumGreen (SG) to confirm that the spot count within each paired sample set was comparable (FIG. 8, Table 6). In of cells with no probe spots to less than 2% but also increased the number of cells with 3 or more spots to 63-66%. A denaturation temperature of 74° C. was used for subsequent experiments. Increasing the second post-hybridisation wash stringency to 0.3% Igepal in 0.1×SSC buffer reduced the number of cells with 3 or more spots to 40% (Table 7). The number of cells with 1-2 probe spots was still only 49% so the hybridisation time was increased to 30 hours which slightly increased the number of cells with 1-2 probe spots to 56% and decreased the number of cells with zero spots to 12% and cells with 3 or more spots to 32% (FIG. 10). Although not as efficient as CEP probe enumeration analysis of a patient with confirmed deletion of 17p with the SF del17p probe was able to determine differences in the B CLL cells versus the normal T cell population (FIG. 10, Table 6). Further adjustments to the hybridisation and stringency buffers may reduce the number of cells with 3 or more probe spots however visual analysis of the cells with zero or single probes spots found that the enumeration software was not sufficiently robust enough to resolve these accurately due to dim probe signals (data not shown).

TABLE 7

Variations in hybridisation temperature and stringency buffer within the immuno-flowFISH protocol for SureFISH deletion 17p PMP FISH probe analysis.

| Fixation and permeabilisation | Denature solution | Probe/DNA denature temp (° C.) | Hybridisation buffer (HB) | Second stringency wash | 0 spot | 1* spot | 2 spots | 3 spots | 3+ spots | Comment |
|---|---|---|---|---|---|---|---|---|---|---|
| 4% FA + 0.1% Tw20 | 0.5M HCl | 73 | SFHB | 0.3% Igepal in 0.4 × SSC | 24 | 37 | 22 | 8 | 10 | |
| 4% FA + 0.1% Tw20 | 0.5M HCl | 74 | SFHB | 0.3% Igepal in 0.4 × SSC | 2 | 10 | 23 | 15 | 48 | |
| 4% FA + 0.1% Tw20 | 0.5M HCl | 76 | SFHB | 0.3% Igepal in 0.4 × SSC | 2 | 10 | 21 | 14 | 52 | |
| 4% FA + 0.1% Tw20 | 0.5M HCl | 78 | SFHB | 0.3% Igepal in 0.4 × SSC | 2 | 10 | 20 | 17 | 49 | |
| 4% FA + 0.1% Tw20 | 0.5M HCl | 74 | SFHB | 0.3% Igepal in 0.1 × SSC | 8 | 23 | 29 | 18 | 22 | Increased stringency |
| 4% FA + 0.1% Tw20 (all nucleated cells) | 0.5M HCl | 74 | SFHB | 0.3% Igepal in 0.4 × SSC | 12 | 32 | 24 | 14 | 18 | 30 h hybridisation |
| 4% FA + 0.1% Tw20 (B cell population) | 0.5M HCl | 74 | SFHB | | 12 | 33 | 23 | 14 | 18 | CD19+ CD5+ CLL cells in del17pcase |
| 4% FA + 0.1% Tw20 (T cell population) | 0.5M HCl | 74 | SFHB | | 18 | 25 | 29 | 17 | 11 | CD3+ CD5+ T cells from same del17p case |

*1-spot count not adjusted by MFI to 1 or 2 spots

FA—formaldehyde, HCl—hydrochloric acid, Igepal—Igepal CA-630, M—Molar, Tw20—Tween20, SFHB—SureFISH hybridisation buffer provided by Agilent Technologies with the 17p deletion probe, SSC—standard sodium citrate buffer Regardless of post-hybridisation stringency and SYTOX AADvanced co-localisation the Spot Count Feature still reported a proportion of cells (15-20%) with a "spot" count of 1 (FIG. 11). Analysis of the fluorescence intensity for the 1-spot population as per Minderman et al. found that for CEP1 and CEP12 probes the MFI of 1-spot counts was identical to the 2-spot population, indicating that the two spots were overlapping as the MFI of a true single spot would be half that of a dual spot (FIG. 12). Exclusion of cells with 3+ spots based on SYTOX AADvanced co-localisation criteria (FIG. 11) and analysis of 1-spot fluorescence intensity to determine the number of cells with overlapping probe spots resulted in an adjusted 2-spot count in >95% of cells of healthy donor cells.

To determine the effect of the acid denaturation and high temperature (73° C.) on immunophenotyping fluorophores, healthy donor and CLL patient nucleated cell samples were processed as per the optimised protocol and aliquots were removed for analysis on the AMNIS ISXmkII after cellular antibody staining, fixation and permeabilisation, acid denaturation and hybridisation. These included CD3 (clone: SK7), CD4 (clone SK3), CD5 (clone: UCHTC2) and CD19 (clone: HIB19) conjugated with a range of fluorophores (Table 8).

TABLE 8

Analysis of fluorophore performance in the immuno-flowFISH protocol. Fluorophores conjugated with anti-human CD3, CD4, CD5 or CD19 antibodies and analysed with nucleated blood cells. Aliquots were removed and analysed to determine BS3 cross-link preservation of fluorescence (Yes) or loss of fluorescence (No) after: fixation with 4% formaldehyde and permeabilisation with 0.1% Tween20; acid DNA denaturation with 0.5M HCl; and FISH (hybridisation) consisting of probe/cellular DNA heat denaturation at 73° C. followed by hybridisation at 37° C. for 16-24 hours.

| Fluorophore-antibody | Post fixation and permeabilisation | Post DNA denaturation | Post FISH hybridisation |
|---|---|---|---|
| FITC-CD3^ | Yes | Yes* | No |
| FITC-CD4 | Yes | No | No |
| BB515-CD3 | Yes | Yes | Yes |
| BB515-CD4 | Yes | Yes | Yes |
| BB515-CD5^ | Yes | Yes | Yes |
| BB515-CD19^ | Yes | Yes | Yes |
| BB700-CD4 | Yes | Yes | Yes |
| PE-CD3 | Yes | No | No |
| PE-CD4^ | Yes | No | No |
| PECy5-CD4 | Yes | No | No |
| PECF594-CD4 | Yes | No | No |
| PECy7-CD4 | Yes | No | No |
| PECy7-CD19 | No | No | No |
| PerCPCy5.5-CD4 | Yes | No | No |
| BV421-CD4 | Yes | Yes | Yes |
| BV480-CD3 | Yes | Yes | Yes |
| BV480-CD4 | Yes | Yes | Yes |
| BV480-CD5 | Yes | Yes | Yes |
| BV480-CD19 | Yes | Yes | Yes (with BS3) |
| BV510-CD4 | Yes | Yes | Yes |

TABLE 8-continued

Analysis of fluorophore performance in the immuno-flowFISH protocol. Fluorophores conjugated with anti-human CD3, CD4, CD5 or CD19 antibodies and analysed with nucleated blood cells. Aliquots were removed and analysed to determine BS3 cross-link preservation of fluorescence (Yes) or loss of fluorescence (No) after: fixation with 4% formaldehyde and permeabilisation with 0.1% Tween20; acid DNA denaturation with 0.5M HCl; and FISH (hybridisation) consisting of probe/cellular DNA heat denaturation at 73° C. followed by hybridisation at 37° C. for 16-24 hours.

| Fluorophore-antibody | Post fixation and permeabilisation | Post DNA denaturation | Post FISH hybridisation |
|---|---|---|---|
| V500c-CD3 | Yes | Yes | Yes (with BS3) |
| BV605-CD4 | Yes | Yes | Yes |
| BV650-CD4 | Yes | Yes | No |
| BV650-CD19 | Yes | Yes | No |
| BV711-CD3 | Yes | Yes | No |
| APC-CD3 | Yes | Yes | No |
| APC-CD4 | Yes | Yes | No |
| APC-CD19 | Yes | Yes* | No |
| AF647-CD3 | Yes | Yes | Yes |
| AF647-CD5 | Yes | Yes | Yes (with BS3) |
| AF647-CD19 | Yes | Yes | No |
| APCCy7-CD4 | Yes | Yes | No |
| APCH7-CD3 | No | No | No |
| APCH7-CD19 | No | No | No |
| AF700-CD3 | Yes | Yes | No |
| AF700-CD4 | Yes | Yes | Yes |
| APCR700-CD4 | Yes | Yes | Yes |
| APCeFlour780-CD3 | Yes | No | No |
| APCeFlour780-CD19 | Yes | No | No |
| APCFire750-CD3 | Yes | No | No |

*Fluorescence intensity decreased however positive cells could still be differentiated from the unstained population.
^CD3 clone SK7, CD4 clone SK3, CD5 clone UCTHC2, CD19 clones HIB19 and SJ25C.
Abbreviations: AF—Alexa Fluor, APC—Allophycocyanin, BB—Brilliant Blue, BV—Brilliant Violet, FITC—Fluorescein isothiocyanate, PE—Phycoerythrin fluorophore.

Antibody binding was preserved for BB515, BB700, BV421, BV480, BV510, V500c, AF647 and AF700 however, the fluorescence intensity of the fluorophores decreased after overnight hybridisation at 37° C. (FIG. 13). Antibodies conjugated with PE, APC or their tandem conjugates lost fluorescence during processing (FIG. 14). Fluorescence intensity of the fluorophores, as determined by "brightness" and resolution of positively stained versus negatively stained populations, was preserved by cross-linking with Bis(sulfosuccinimidyl)suberate (BS3) a non-cleavable, membrane-impermeable, water-soluble cross-linking agent for amines (FIG. 15). Two immunophenotyping panels were analysed to provide flexibility in panel design and subsequent probe selection for other haematological malignancies. Normal blood cells and CLL cells were analysed with both panels and the staining profiles for CD3, CD5 and CD19 populations were found to be comparable (FIG. 16).

Example 2: Immuno-flowFISH Compared to Earlier Prior Art Technology

The following example presented in Table 9 compares Immuno-flowFISH technology against Immuno-S-FISH Technology. While Table 10, provides the broad working ranges for analysis of a peripheral blood mononuclear cell (PBMC) preparation and the highly preferred optimum conditions for that methodology.

| Protocol | immuno-S-FISH (Fuller et al., CPA 2016) | Immuno-flowFISH 2018 | Comparative variations in the protocols |
|---|---|---|---|
| Peripheral blood mononuclear cell (PBMC) preparation | 1. Ficoll-paque density centrifugation (this limits usefulness of the protocol for minimal residual disease detection) on fresh peripheral blood only | 1. RBC lyse with BD PharmLyse a buffered ammonium chloride-based lysing reagent at pH 7.1-7.4<br>2. Wash cells in PBS (no FBS or BSA)<br>Bone marrow and biobank thawed samples (optional):<br>1. Thaw and wash cryopreserved samples in RPMI/5 mM MgCl$_2$/ 10 U/mL DNaseI buffer<br>2. Wash in PBS/1 mM EDTA | The RBC lyse step is preferable to density gradient purification for diagnostic applications as there is less cell loss which is essential for minimal residual disease detection. RBC is commonly used in flow cytometry.<br>Protocol applicable to peripheral blood and bone marrow samples<br>Protocol applicable to pre-isolated cryopreserved cells or biobanked samples (optional): thaw procedure includes single cell suspension buffers (i.e. DNAse1 in RPMI and EDTA in PBS) |
| Stain surface antigens (immunophenotyping) | 2. Incubate cells with fluorescently conjugated antibody as per manufacturer's instructions for 30 min at 4° C.<br>3. Wash cells in PBS/2% FBS | 3. Incubate cells with fluorescently conjugated antibody as per manufacturer's instructions for 30 min at 4° C.<br>4. Wash cells in PBS/2% FBS | 4 or more immunophenotyping parameters in one test<br>Antibody combinations include CLL (×4), MM (×4) and ALL (×1) panels |
| Cross-link antigen-antibody complex | 4. Incubate in 1 mM BS3 for 30 min at 4° C. (do not wash cells) | 5. Incubate in 1 mM BS3 for 30 min at 4° C. (do not wash cells) | |
| Quench cross-link reaction | 5. Incubate with 100 mM Tris-HCL pH 7.4/150 mM NaCl for 20 min at 4° C.<br>6. Wash cells in PBS/2% FBS | 6. Incubate with 100 mM Tris-HCL pH 7.4/150 mM NaCl and quench 20 min at 4° C. (do not aspirate) | Removal of the wash step at this point in the protocol is important to reduce to cell damage and loss. |
| Fix cells | 7. Incubate in fresh 4% Formaldehyde for 5 min at RT | 7. Add 4% formaldehyde with 0.1% Tween20, gently aspirate to mix and | Formaldehyde fixation and Tween20 permeabilisation are performed separately for standard flow |

-continued

| Protocol | immuno-S-FISH (Fuller et al., CPA 2016) | Immuno-flowFISH 2018 | Comparative variations in the protocols |
|---|---|---|---|
| | 8. Wash cells in PBS/2% FBS | incubate for 10 min RT<br>8. Wash cells in PBS/2% FBS<br>Post-fix long store (optional):<br>9. Resuspend fixed cells in PBS/2% FBS for storage/transport/batch testing for up to 3-5 days (at 4° C.)<br>10. Normal procession to stage 11 (denature DNA) after storage and PBS/2% FBS wash | cytometry applications.<br>A 4% formaldehyde with 0.1% tween20 solution has been used as a pre-hybridisation wash for whole mount in situ hybridisation and genotyping of embryos/embedded tissue processed on slides (54). The protocol uses a different primary fix/perm buffer and enzymatic pre-hyb treatment. There are no flow cytometry based protocols that use this formulation or in the detection of whole cells in suspension and respective immunophenotype. Methanol free formaldehyde formulation improves hybridisation efficiency (i.e. signal resolution) Fix/perm solution is currently validated for sample storage, transport or batch analysis for up 5 days for immunophenotyping or 3 days for FISH detection (in PBS/2% FBS buffer at 4° C.) |
| Permeabilise cells | 9. Incubate with 0.05% Tween20 for 10 min at RT<br>10. Wash cells in PBS (no FBS) | 11. N/A (combined with previous step) | See above |
| Denature DNA | 11. Incubate in 4M HCl acid solution for 20 min at RT (do not wash) | 12. Incubate in 0.5M HCl acid solution for 20 min a RT (do not wash) | Reduced acid concentration in the new protocol significantly improves cell yield at end of protocol which was a limitation in the immuno-S-FISH protocol. |
| Quench DNA denaturation | 12. Add ice-cold PBS, centrifuge at 600 g for 10 min<br>13. Wash cells in PBS/2% FBS and transfer cells to a Clearview lo-bind microfuge tube | 13. Add ice-cold PBS, centrifuge at 600 × g for 10 min and remove supernatant | FBS/FCS is the blood fraction that remains after coagulation and does not contain cells or antibodies but will contain growth factors and proteins such as BSA. It is included in flow cytometry buffers to reduce non-specific binding, cell-to-cell and cell-to-tube adhesion |
| Block non-specific probe DNA binding | 14. N/A | 14. Block sample in PBS/1% BSA<br>15. Wash and remove supernatant | Purified BSA is a small non-reactive protein used to block non-specific binding, cell-to-cell and cell-to-tube adhesion. Use of BSA to block reduces non-specific binding better than FBS at this step of the new protocol. |
| Add FISH probe, co-denature probe and DNA | 15. Remove all excess buffer<br>16. Gently resuspend cells in 9 μL VCEP hybridisation buffer with 1 μL FISH probe<br>17. Anneal at 65° C. for 5 min | 16. Resuspend in 0.1% Igepal in 2 × SSC and transfer cells to 0.2 ml Eppendorf tube<br>17. Centrifuge at 950 × g for 3 min and remove all excess buffer<br>18. Resuspend in 7 μL VCEP or VLSI hybridisation buffer, 2 μL MilliQ water and 1 μL FISH probe (1 μL MilliQ water, 1 μL CEP/LSI probe and 1 μL CEP/LSI probe for dual probe analysis) or resuspend in 10 uL of Cytocell ready to FISH hybridisation mixture format (includes MM translocation probes with proprietary hybridisation solution/buffer)<br>19. Denature probe and DNA at 73 or 74° C. for 5 min | Hybridisation buffer volume reduced and MilliQ water added as per manufacturers recommendations. This adjusts the concentration of the reagents and improves hybridisation efficiency.<br>Hybridisation buffer: Unique sequence locus specific probes (i.e. 118-732 kb targets) require VLSI buffer, which is less stringent and higher DNA denaturation temp of 74° C. for 5 min<br>Expanded probe range for clinical application (including dual probe analysis): centromeric (CEP) probes, locus specific copy number probes (i.e. 17p12) or translocation dual fusion probes (e.g. IGH/MYEOV); conjugated to different fluorophores (e.g. Texas Red)<br>Dual probe analysis: CEP + LSI probes possible (e.g. CEP17 + 17p12)<br>Total of ×12 probe combinations validated for CLL, MM and ALL Probe manufacturers: Abbott Molecular, Agilent (Dako) and Cytocell |

-continued

| Protocol | immuno-S-FISH (Fuller et al., CPA 2016) | Immuno-flowFISH 2018 | Comparative variations in the protocols |
|---|---|---|---|
| Hybridise with FISH probe | 18. Hybridise overnight in a heat block at 37° C. | 20. Hybridise at 37° C. for 16-30 hours in a thermal cycler | Abbott Molecular (CEP) recommends 42° C. for up to 16 hours. Agilent (i.e. SureFISH 17p12) validated for 42° C. at 20-30 hours Abbott Molecular and Cytocell (translocation probes) validated for 42° C. at 30 hours |
| Stringency wash to remove excess FISH probe | 19. Wash cells with 2 × SSC to remove excess probe and hybridisation buffer<br>20. Incubate with 2 × SSC for 5 min at 37° C. to remove non-specifically bound probe<br>21. Wash cells in PBS/2% FBS | 21. Wash with 0.1% Igepal in 2 × SSC and remove supernatant<br>22. Resuspend in 0.3% Igepal in 0.4 × SSC (pre-warmed to 42° C.) and incubate for 5 min at 42° C.<br>23. Wash cells in PBS/2% FBS | Abbott Molecular (CEP12 manufacturer) recommends washing in reverse and at a higher temperature, i.e. 0.3% NP-40 in 0.4 × SSC (pre-warmed to 42° C.) for 2 min, then 0.1% NP-40 in 2 × SSC at room temperature for 1 min. |
| Stain DNA to visualise the nucleus | 22. Incubate with Hoechst for 30 min at RT<br>23. Wash cells in PBS/2% FBS | 24. Resuspend in DNA stain such as 7AAD or SYTOX AADvanced (1:5 in PBS) and incubate for 30 min at RT | CEP probe manufacturer recommends DAPI for nuclear counterstain. Alternate nuclear stains could be used provided they do not fluoresce at the same wavelength as the probe or immunophenotyping fluorophores - e.g. Sytox AADvanced, 7AAD, RedDot1, RedDot2 and DRAQ7 |
| Analyse on ImageStreamX | 24. Resuspend in PBS/2% FBS<br>25. Analyse on an AMNIS ImageStreamX using 60× magnification and EDF, record 20,000-200,000 cells | 25. Analyse on an AMNIS ImageStreamX using 60× magnification and EDF, record 20,000-200,000 cells | AMNIS analysis was performed as per published protocols for imaging cell cytometry. Data has been collected on 40× and compared to 60× magnification Limit of detection: 1 abnormal cell in 1000 normal cells (0.1%) per 10,000 events acquired and analysed as per below, more sensitive than immuno-S-FISH protocol |
| Data analysis | 26. Open data file with IDEAS image analysis software | 26. Open data file with IDEAS image analysis software | IDEAS software is provided by AMNIS for analysis of data file acquired on the AMNIS ImageStreamX. |
| Select images with cells in focus | 27. Graph brightfield image (Ch1) Gradient RMS in a histogram and select images in focus | 27. Graph brightfield image (Ch1) Gradient RMS in a histogram and select images in focus | Standard AMNIS Begin Analysis wizard template. |
| Select single cells | 28. Graph focused cells in a brightfield (Ch1) area v aspect ratio dotplot and select single cells (exclude doublets and cell clumps) | 28. Graph focused cells in a brightfield (Ch1) area v aspect ratio dotplot and select single cells (exclude doublets and cell clumps) | Standard AMNIS Begin Analysis wizard template. |
| Select cells in G0/G1 using DNA fluorescence intensity | 29. Graph single cells in a DNA fluorescence intensity histogram | 29. Graph single cells in a DNA fluorescence intensity histogram | Extremely important to exclude brightly fluorescent populations as these are likely to be dividing cells, doublets or cell clumps and reduce accuracy of spot count. This analysis step is not used in the AMNIS automated spot count analysis template. |
| Gate population of interest using fluorescence intensity of cell surface markers | 30. Graph single G1 cells in bi-colour fluorescence intensity dotplots and gate the populations of interest eg in a CD19− BV480 v CD3− AF647 dotplot gate the CD3+ CD19− T cells and the CD3− CD19+ B cells | 30. Graph single G1 cells in bi-colour fluorescence intensity dotplots and gate the populations of interest eg in a CD19− BV480 v CD3− AF647 dotplot gate the CD3+ CD19− T cells and the CD3− CD19+ B cells | Standard AMNIS Begin Analysis wizard template. Gating strategy demonstrated: CLL cells: CD19+, CD5+ and CD3− T-cells: CD19−, CD5+ and CD3+ MM cells: CD19−, CD45+ (dim), CD38+ and CD138+ ALL cells: CD19+, CD10+ and CD34+ |
| Gate cells with FISH hybridisation "spots" in nucleus | 31. Use Similarity Feature Calculation to determine co-localisation of FISH probe spots with DNA fluorescence | 31. Use Similarity Feature Calculation to determine co-localisation of FISH probe spots with DNA fluorescence | Extremely important to ensure accuracy of spot count. This feature calculation is not used in the AMNIS automated spot count analysis template (also tested colocalisation and internalisation features). |

| Protocol | immuno-S-FISH (Fuller et al., CPA 2016) | Immuno-flowFISH 2018 | Comparative variations in the protocols |
|---|---|---|---|
| Calculate spot count for each population in sample | 32. Use Spot Count Feature Calculation to count the number of FISH spots in each population | 32. Use Spot Count Feature Calculation to count the number of FISH spots in each population | Standard AMNIS Spot Count wizard template. Tested spot, peak and intensity masks to optimise spot counting algorithm |
| Correct for overlapping spot count | 33. Graph 2-spot count population in a probe fluorescence intensity histogram and gate the fluorescence peak, apply this gate to the 1-spot population to confirm monosomy or disomy where spots are overlapping Immuno-S-FISH protocol best analysis is limited to 60-80% cells with 2 probe spots (in normal) | 33. Graph 2-spot count population in a probe fluorescence intensity histogram and gate the fluorescence peak, apply this gate to the 1-spot population to confirm monosomy or disomy where spots are overlapping | Described by Mindermann et al 2013. This analysis step is not used in the AMNIS automated spot count analysis template. Immuno-flowFISH protocol best analysis has >95% cells with 2 probe spots (in normal) which is a vast improvement and essential for detection of small subpopulations such as minimal residual disease detection or trisomy 21 analysis of fetal cells in maternal blood. |
| Visually confirm all gated parameters and events | 34. Inspect image galleries collated by the IDEAS software of each defined parameter to confirm accuracy and precision of analysis strategy outlined above (gating). Visual verification of up to 4 parameters overlaid as imagery (Brightfield, DNA stain, 2 antibodies and 1 probe) | 34. Inspect image galleries collated by the IDEAS software of each defined parameter to confirm accuracy and precision of analysis strategy outlined above (gating). Visual verification of up to 8 parameters overlaid as imagery (Brightfield, DNA stain, 4 antibodies and 2 probes) | Standard AMNIS Begin Analysis wizard template Visual inspection and verification of AMNIS software quantified cellular parameters (i.e. disease associated immunophenotype and FISH signal analysis) to precisely define true-positive events (stratify cells of interest) and eliminate false positive events. |
| Calculate normalised spot count ratio of neoplastic cells versus normal cells identified by immunophenotype | 35. Not applicable to healthy control samples | 35. Calculate absolute true-spot counts; mean spot counts per cell (total number of spots normalised to phenotypic subpopulation size) and resulting spot count ratios. Spot count ratio = Mean spot count neoplastic cells/Mean spot count normal cells e.g. CD19+ CD5+ CLL/CD3+ C5+ T-cells: del(17p) <2, trisomy 12 >2 ratios | This approach incorporates operator visualised FISH signals detected by AMNIS software automated spot counting (as per above) in the calculation of spot count ratios. This provides statistical normalisation of true-positive spot counts based on cell type and sub-population size. This provides further statistical standardisation for the analysis and comparison of spot count differences between phenotypically identified subpopulations, to differentiate true-positive neoplastic cells from background of normal cells (e.g. CLL versus T-cells). |

Abbreviations: ALL—Acute lymphocytic leukaemia, BS3—Bis(sulfosuccinimidyl)suberate, BSA—Bovine serum albumin, Ch—Channel, CEP—Chromosome enumeration probe, CLL—Chronic lymphocytic leukaemia, del(17p)—Deletion of short arm of chromosome 17, DMSO—Dimethyl sulfoxide, DRAQ7—Deep red anthraquinone 7, EDF—Extended depth of field, FISH—Fluorescence in situ hybridisation, FBS—Foetal bovine serum, HCl—Hydrochloric acid, hrs—hours, IFC—Imaging flow cytometry, ISX MKII—ImageStreamX MarkII, mins—minutes, MM—Multiple Myeloma, OR—OrangeRed, PBS—Phosphate buffered saline, PMP—Peripheral myelin protein, RBC—Red blood cell, RMS—Root mean square, RT—Room temperature, SFHB—SureFISH hybridisation buffer, SG—SpectrumGreen, SO—SpectrumOrange, SSC—Standard Sodium Citrate, VCEP—Vysis chromosome enumeration, VLSI—Vysis locus specific identifier, 7-AAD—7-Aminoactinomycin D.
N.B. Samples should be protected from light throughout protocol.

TABLE 10

| Protocol step | Immuno-flowFISH 2018 | Working range or reagents | Optimum |
|---|---|---|---|
| Peripheral blood mononuclear cell (PBMC) preparation | 1. RBC lyse with BD PharmLyse a buffered ammonium chloride-based lysing reagent at pH 7.1-7.4 2. Wash cells in PBS (no FBS or BSA) Bone marrow and biobank thawed samples (optional): 1. Thaw and wash cryopreserved samples in RPMI/5 mM MgCl$_2$/10 U/mL DNaseI buffer 2. Wash in PBS/1 mM EDTA | Wash buffer (throughout protocol): PBS/2-6% FBS, PBS/0.5-1% BSA, RPMI/5 mM MgCl$_2$/10 U/mL DNaseI, PBS/1-5 mM EDTA | PBS/2% FBS for fresh cell suspensions Bone marrow and biobank thawed samples (optional): RPMI/5 mM MgCl$_2$/10 U/mL DNaseI PBS/1 mM EDTA |
| Stain surface antigens (immunophenotyping) | 3. Incubate cells with fluorescently conjugated antibody as per manufacturer's instructions for 30 min at 4° C. | CD3, CD19 and CD4 evaluated conjugated to various fluorophores | Antibody panel development: Expanded compatible fluorophores from 4 to 10 |

TABLE 10-continued

| Protocol step | Immuno-flowFISH 2018 | Working range or reagents | Optimum |
|---|---|---|---|
| | 4. Wash cells in PBS/2% FBS | 3-4 immunophenotyping parameters (antibodies) in each panel | Examples for CLL, MM, and ALL panels provided |
| Cross-link antigen-antibody complex | 5. Incubate in 1 mM BS3 for 30 min at 4° C. (do not wash cells) | N/A | |
| Quench cross-link reaction | 6. Incubate with 100 mM Tris-HCL pH 7.4/150 mM NaCl and quench 20 min at 4° C. (do not aspirate) | N/A | |
| Fix cells | 7. Add 4% formaldehyde with 0.1% Tween20, gently aspirate to mix and incubate for 10 min RT<br>8. Wash cells in PBS/2% FBS | Fix: 1-4.2% formaldehyde fixation<br>Perm: 0.05-2.5% Tween 20<br>Post-fix long store (optional):<br>Sample storage/transport/batch testing after this stage: 0-5 days in PBS/2% FBS for immunophenotyping or 0-3 days in PBS/2% FBS at 4° C. for FISH analysis before proceeding to stage 9 or rest of the protocol | 4% formaldehyde 0.05-0.1% Tween 20<br>Post-fix long store (optional):<br>Sample storage/transport/batch testing for full IFF after this stage: 0-3 days in PBS/2% FBS at 4° C. |
| Denature DNA | 9. Incubate in 0.5M HCl acid solution for 20 min a RT (do not wash) | 0.5-1M HCl | 0.5M HCl |
| Quench DNA denaturation | 10. Add ice-cold PBS, centrifuge at 600 × g for 10 min and remove supernatant | N/A | |
| Block non-specific probe DNA binding | 11. Block sample in PBS/1% BSA<br>12. Wash and remove supernatant | N/A | |
| Add FISH probe, co-denature probe and DNA | 13. Resuspend in 0.1% Igepal in 2 × SSC and transfer cells to 0.2 ml Eppendorf tube<br>14. Centrifuge at 950 × g for 3 min and remove all excess buffer<br>15. Resuspend in 7 µL VCEP or VLSI hybridisation buffer, 2 µL MilliQ water and 1 µL FISH probe (1 µL MilliQ water, 1 µL CEP/LSI probe and 1 µL CEP/LSI probe for dual probe analysis) or resuspend in 10 uL of Cytocell ready to FISH hybridisation mixture format (includes MM translocation probes with proprietary hybridisation solution/buffer)<br>16. Denature probe and DNA at 73 or 74° C. for 5 min | VCEP or VLSI hybridisation or Cytocell ready to use hybridisation solution/mixture<br>1-2 probes per test<br>Denature temp: 73-76° C.<br>Probes (118-732 kb):<br>Abbott Molecular - Vysis CEP12-SO and SG, Vysis CEP17-SG, Vysis CEP4-SG, ETV6-SG (347 kb) and RUNX1-SO (732 kb)<br>Agilent (Dako) - SureFISH CEP12 (Green, Red and Blue), SureFISH 17p12-OR (458 kb) and SureFISH CEP21-Red (653 kb)<br>Cytocell - dual fusion translocation probes: IGH-Green (359/617 kb) with FGFR-Texas Red (118/126 kb) and IGH-Green (124/617 kb) with MYEOV-Texas Red (155/162 kb). CEP12 probe: Alpha Satellite 12 Plus-Texas Red. | VCEP or VLSI hybridisation (less stringent) or Cytocell ready to use hybridisation solution/mixture<br>1-2 probes per test<br>Denature temps: 73 or 74° C. (with locus specific probes) |
| Hybridise with FISH probe | 17. Hybridise at 37° C. for 16-20 hours in a thermal cycler | 3-30 hours | 16-20 hours for CEP probes<br>20-30 hours locus specific probes (i.e. SureFISH 17p12-OR)<br>30 hours for locus specific dual fusion translocation probes (Cytocell) |
| Stringency wash to remove excess FISH probe | 18. Wash with 0.1% Igepal in 2 × SSC and remove supernatant<br>19. Resuspend in 0.3% Igepal in 0.4 × SSC (pre-warmed to 42° C.) and incubate for 5 min at 42° C.<br>20. Wash cells in PBS/2% FBS | Second wash:<br>0.3% Igepal in 2-0.4 × SSC for 5 mins at 42-73° C. | Second wash:<br>0.3% Igepal in 0.4 × SSC |
| Stain DNA to visualise the nucleus | 21. Resuspend in DNA stain such as 7AAD or SYTOX AADvanced (1:5 in PBS) and incubate for 30 min at RT | 7AAD, RedDot1, RedDot2 and DRAQ7 | |

TABLE 10-continued

| Protocol step | Immuno-flowFISH 2018 | Working range or reagents | Optimum |
|---|---|---|---|
| Analyse on ImageStreamX | 22. Analyse on an AMNIS ImageStreamX using 60× magnification and EDF, record 20,000-200,000 cells | 40× | 60× |

Abbreviations: ALL—Acute lymphocytic leukaemia, BS3—Bis(sulfosuccinimidyl)suberate, BSA—Bovine serum albumin, Ch—Channel, CEP—Chromosome enumeration probe, CLL—Chronic lymphocytic leukaemia, del(17p)—Deletion of short arm of chromosome 17, DMSO—Dimethyl sulfoxide, DRAQ7—Deep red anthraquinone 7, EDF—Extended depth of field, FISH—Fluorescence in situ hybridisation, FBS—Foetal bovine serum, HCl—Hydrochloric acid, hrs—hours, IFC—Imaging flow cytometry, ISX MKII—ImageStreamX MarkII, mins—minutes, MM—Multiple Myeloma, OR—OrangeRed, PBS—Phosphate buffered saline, PMP—Peripheral myelin protein, RBC—Red blood cell, RMS—Root mean square, RT—Room temperature, SFHB—SureFISH hybridisation buffer, SG—SpectrumGreen, SO—SpectrumOrange, SSC—Standard Sodium Citrate, VCEP—Vysis chromosome enumeration, VLSI—Vysis locus specific identifier, 7-AAD—7-Aminoactinomycin D.
N.B. Samples should be protected from light throughout protocol.

The invention claimed is:

1. A method for human cell or non-human animal cell analysis, comprising:
    a) preparing a single cell suspension from a human sample or a non-human animal sample, wherein the single cell suspension comprises nucleated cells having one or more cell markers or antigens;
    b) staining the one or more cell markers or antigens with one or more antibodies;
    c) fixing and permeabilising the cells concurrently in the same step;
    d) performing a cytogenetic technique on the cells to detect one or more chromosomal features of interest, wherein the cytogenetic technique includes:
        i) incubating the cells with 0.5M-1M hydrochloric acid or 5-25% acetic acid to denature DNA of the cells at an acidic pH; and
        ii) adding at least one probe to the cells and heating the cells with the at least one probe at a temperature of about 74-78° C. to further denature the DNA and to denature the at least one probe; and
    e) performing imaging flow cytometry on the cells to detect, measure, quantify and/or identify the presence of the one or more antibodies in step (b) and the one or more chromosomal features of interest in step (d).

2. The method according to claim 1, wherein preparing a single cell suspension of the nucleated cells comprises lysing red blood cells in a blood or bone marrow sample or enzymatic digestion of extracellular matrix and cell-cell adhesions in a tissue sample.

3. The method according to claim 2, wherein lysing red blood cells or digesting extracellular matrix comprises the step of: incubating the sample under conditions to permit lysis or digestion to occur.

4. The method according to claim 1, wherein preparing the single cell suspension comprises at least one of: (a) centrifuging the sample and removing the supernatant, or (b) washing the cells under suitable conditions to remove extra cellular matrix materials.

5. The method according to claim 1, wherein the staining with the one or more antibodies of the one or more cell markers or antigens comprises staining the cells with an immunophenotyping antibody preparation comprising the one or more antibodies.

6. The method according to claim 1, wherein fixing and permeabilising the cells concurrently in the same step comprises adding formaldehyde and a non-ionic detergent to the cells.

7. The method according to claim 1, wherein the cytogenetic technique at step (d) further includes quenching the cells of step (i) in phosphate buffered saline and/or staining nuclear DNA of the cells.

8. The method according to claim 1, wherein performing the cytogenetic technique includes the steps of: centrifuging the cells, removing the supernatant, and resuspending the cells.

9. The method according to claim 1, wherein the cytogenetic technique of step (d) further comprises (iii) hybridising the DNA of the cells with a probe or a FISH probe.

10. The method according to claim 9, wherein the hybridising further comprises washing the DNA of the cells in a stringency solution to remove unbound probe or unbound FISH probe.

11. The method according to claim 1, wherein the imaging flow cytometry is carried out using excitation lasers and capturing emissions, with lasers appropriate to measure the results of step (b) or (d).

12. The method according to claim 1, wherein the imaging flow cytometry is carried out by recording at least 10,000 cells in the sample.

13. The method according to claim 1, further comprising analysing data obtained from the imaging flow cytometry, and optionally wherein analysing data comprises identifying nucleated non-dividing cells in a fluorescence intensity histogram by excluding cells with high fluorescence intensity.

14. The method according to claim 1, comprising diagnosing, prognosing or monitoring a medical condition based on analysis of data obtained from the imaging flow cytometry.

15. The method according to claim 1, wherein the one or more cell markers or antigens are cell surface, cytoplasmic, or nuclear markers or antigens.

16. The method according to claim 9, wherein the hybridising further comprises blocking non-specific probe DNA binding with nuclear material in the cells.

17. The method according to claim 1, wherein the step of performing imaging flow cytometry on the cells further comprises acquiring data including brightfield images, fluorescence images and intensity measurements of immunophenotyping markers and FISH probes.

18. A method for analysing a cell population comprising performing the method according to claim 1, wherein the method further comprises:
    a) selecting a cell population to be analysed and analysing the cell population's antigenic profile by immunophenotyping the population using flow cytometry to detect the presence or absence of one or more biological markers or parameters associated with a condition to be measured or assessed, and
    b) subjecting the cell population to hybridization with at least a FISH probe that allows the cells to be visualised and counted permitting specific cells to be identified by their precise phenotype and permitting the identification of genomic aberrations in cells identified by phenotype.

19. The method according to claim 7, wherein the cells are not washed prior to quenching and wherein the incubating step (d)(i) is carried out at an acidic pH.

20. The method according to claim 1, wherein the incubating step (d)(i) with the acid is carried out for about 20-40 min at room temperature.

21. The method according to claim 1, wherein heating the cells with the at least one probe in step (d)(ii) is at a temperature of 78° C. and/or the incubating step (d)(i) with the acid is carried out for about 20 min at room temperature.

22. The method according to claim 1, wherein the method is for human cell analysis, and wherein the method comprises preparing a single cell suspension from the human sample.

\* \* \* \* \*